US009823745B1

(12) United States Patent
Fateh

(10) Patent No.: US 9,823,745 B1
(45) Date of Patent: *Nov. 21, 2017

(54) METHOD AND APPARATUS FOR SELECTIVELY PRESENTING CONTENT

(71) Applicant: Atheer, Inc., Mountain View, CA (US)

(72) Inventor: Sina Fateh, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/092,901

(22) Filed: Apr. 7, 2016

Related U.S. Application Data

(63) Continuation-in-part of application No. 14/014,111, filed on Aug. 29, 2013.

(60) Provisional application No. 61/695,261, filed on Aug. 30, 2012.

(51) Int. Cl.
| | | |
|---|---|---|
| *G09G 5/00* | (2006.01) | |
| *G06F 3/01* | (2006.01) | |
| *G09G 5/14* | (2006.01) | |
| *G09G 5/38* | (2006.01) | |

(52) U.S. Cl.
CPC .............. *G06F 3/013* (2013.01); *G06F 3/017* (2013.01); *G09G 5/14* (2013.01); *G09G 5/38* (2013.01); *G09G 2320/10* (2013.01); *G09G 2340/0464* (2013.01); *G09G 2340/14* (2013.01); *G09G 2354/00* (2013.01)

(58) Field of Classification Search
CPC .......... G02B 2027/0187; G02B 27/017; G02B 2027/0118; G02B 26/026; G02B 27/0093; A63F 13/00; A63F 2300/1012; A63F 2300/1093; A63F 2300/6045; G06F 3/011; G06F 3/013; G06F 3/017; G06F 3/033; G06F 3/04883; G06T 19/006
See application file for complete search history.

(56) References Cited

U.S. PATENT DOCUMENTS

| | | |
|---|---|---|
| 6,144,755 A | 11/2000 | Niyogi et al. |
| 7,940,285 B2 | 5/2011 | Would et al. |
| 9,142,185 B2 | 9/2015 | Fateh |
| 2002/0044152 A1 | 4/2002 | Abbott, III et al. |
| 2002/0167461 A1 | 11/2002 | Bronson |
| 2004/0240709 A1 | 12/2004 | Shoemaker |

(Continued)

OTHER PUBLICATIONS

Advisory dated Aug. 20, 2015, in U.S. Appl. No. 14/014,111 of Fateh, S. filed Aug. 29, 2013.

(Continued)

*Primary Examiner* — Sultana M Zalalee
(74) *Attorney, Agent, or Firm* — Mohr Intellectual Property Law Solutions, P.C.

(57) ABSTRACT

Input data is obtained. A viewer's eye disposition is determined, and the viewer's field of view determined therefrom. First and second portions of the field of view are defined considering a contextual factor, and visual output data is generated from the input data considering the contextual factor. The output data is displayed on a first region of a see-through near-eye display so as to appear in the first portion of said field of view. The output data is excluded from a second region of the display so as not to obstruct the second portion of the field of view. Shifts in eye disposition and field of view are determined. The first and second display regions are updated to maintain the correspondence, such that the output data does not perceptibly change responsive to the shift in the field of view of the viewer.

29 Claims, 34 Drawing Sheets

(56) References Cited

U.S. PATENT DOCUMENTS

| | | | |
|---|---|---|---|
| 2007/0057911 | A1 | 3/2007 | Fateh |
| 2008/0267447 | A1 | 10/2008 | Kelusky et al. |
| 2008/0297588 | A1 | 12/2008 | Kurtz et al. |
| 2009/0180071 | A1 | 7/2009 | Fateh |
| 2009/0189974 | A1* | 7/2009 | Deering .................. G09G 3/02 348/46 |
| 2010/0199230 | A1 | 8/2010 | Latta et al. |
| 2010/0214414 | A1 | 8/2010 | Spruck |
| 2011/0221656 | A1 | 9/2011 | Haddick et al. |
| 2012/0068913 | A1 | 3/2012 | Bar-Zeev et al. |
| 2012/0154277 | A1 | 6/2012 | Bar-Zeev et al. |
| 2012/0218312 | A1 | 8/2012 | Goldsmith et al. |
| 2013/0101157 | A1 | 4/2013 | Li et al. |
| 2013/0208014 | A1 | 8/2013 | Fleck et al. |
| 2014/0062865 | A1 | 3/2014 | Fateh et al. |
| 2017/0023793 | A1* | 1/2017 | Shtukater ........... G02B 27/0179 |
| 2017/0123215 | A1* | 5/2017 | Li ..................... G02B 27/0179 |

OTHER PUBLICATIONS

Final Office Action dated Feb. 17, 2015 in U.S. Appl. No. 14/014,111 of Fateh, S. filed Aug. 29, 2013.
Final Office Action dated Mar. 13, 2014 in U.S. Appl. No. 14/014,111 of Fateh, S. filed Aug. 29, 2013.
Final Office Action dated May 17, 2016 in U.S. Appl. No. 14/014,111 of Fateh, S. filed Aug. 29, 2013.
Non-Final Office Action dated Nov. 6, 2013, in U.S. Appl. No. 14/014,111 of Fateh, S. filed Aug. 29, 2013.
Non-Final Office Action dated Sep. 16, 2015 in U.S. Appl. No. 14/014,111 of Fateh, S. filed Aug. 29, 2013.
Non-Final Office Action dated Sep. 17, 2014 in U.S. Appl. No. 14/014,111 of Fateh, S. filed Aug. 29, 2013.
Final Office Action dated Aug. 27, 2015, U.S. Appl. No. 14/014,245 of Fateh, S. filed Aug. 29, 2013.
Final Office Action dated Sep. 15, 2014, U.S. Appl. No. 14/014,245 of Fateh, S. filed Aug. 29, 2013.
Non-Final Office Action dated Mar. 24, 2015, U.S. Appl. No. 14/014,245 of Fateh, S. filed Aug. 29, 2013.
Non-Final Office Action dated Mar. 28, 2014, U.S. Appl. No. 14/014,245 of Fateh, S. filed Aug. 29, 2013.
Non-Final Office Action dated Nov. 22, 2013, in U.S. Appl. No. 14/014,207 of Fateh, S. filed Aug. 29, 2013.
Final Office Action dated May 9, 2014, in U.S. Appl. No. 14/014,207 of Fateh, S. filed Aug. 29, 2013.
Non-Final Office Action dated Sep. 9, 2014, in U.S. Appl. No. 14/014,207 of Fateh, S. filed Aug. 29, 2013.
Final Office Action dated May 6, 2015, in U.S. Appl. No. 14/014,207 of Fateh, S. filed Aug. 29, 2013.
Notice of Allowance dated Aug. 6, 2015, in U.S. Appl. No. 14/014,207 of Fateh, S. filed Aug. 29, 2013.
Non-Final Office Action dated Mar. 16, 2016, for U.S. Appl. No. 14/855,036 of Fateh, S. filed Sep. 15, 2015.
U.S. Appl. No. 14/014,245 by Fateh, S. filed Aug. 29, 2013.
U.S. Appl. No. 14/014,111 of Fateh, S. filed Aug. 29, 2013.
U.S. Appl. No. 14/014,207 of Fateh, S. filed Aug. 29, 2013.
U.S. Appl. No. 14/855,036 of Fateh, S. filed Sep. 15, 2015.
Pretto, Paolo, et al. "Influence of the size of the field of view on motion perception," Computers & Graphics 33.2 (2009): 139-146.
Notice of Allowance dated Jan. 5, 2017, for U.S. Appl. No. 14/855,036, filed Sep. 15, 2015.

* cited by examiner

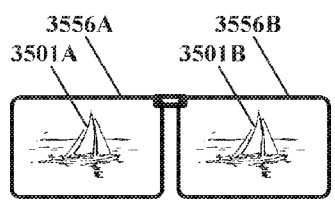
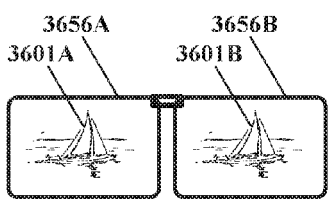
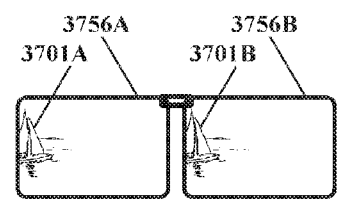
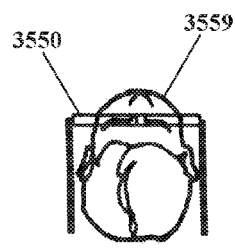
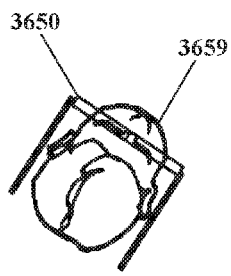
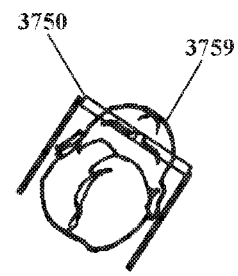
FIG. 35　　　　　　FIG. 36　　　　　　FIG. 37

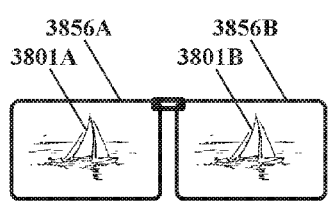 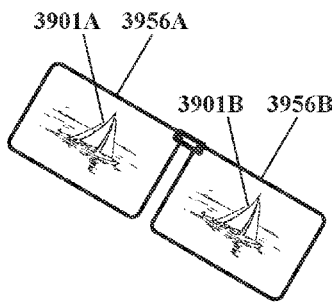 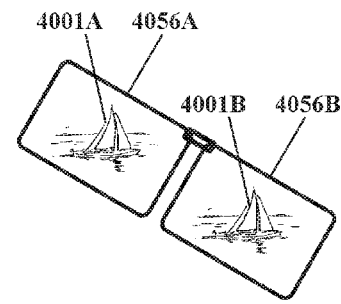
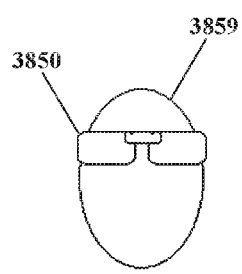 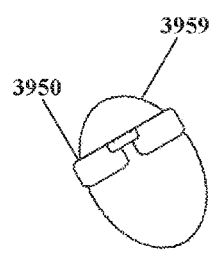 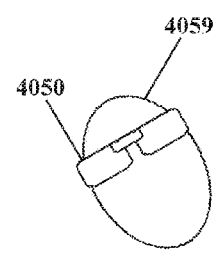
FIG. 38　　　　FIG. 39　　　　FIG. 40
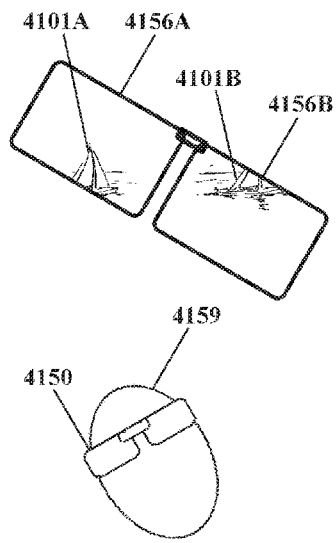
FIG. 41

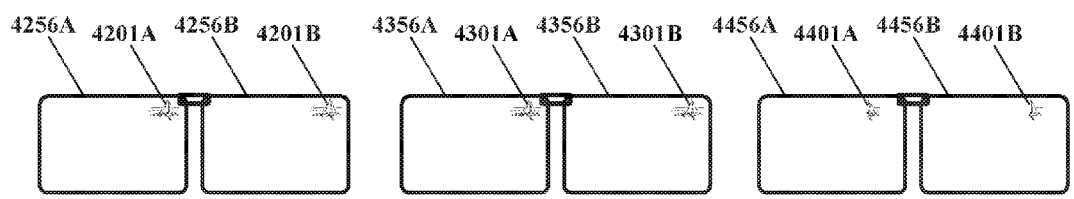
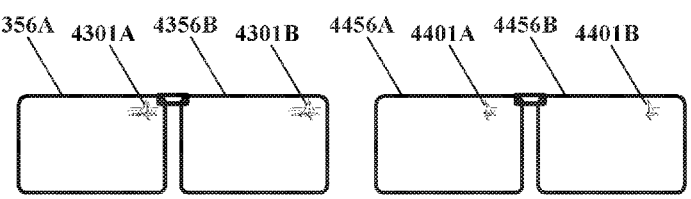
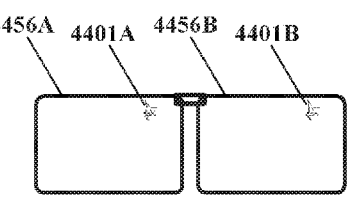
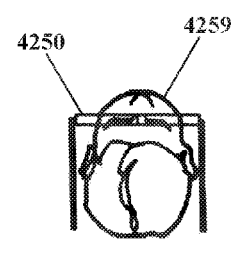
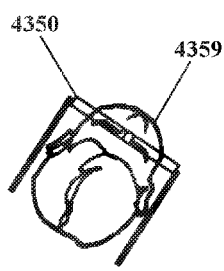
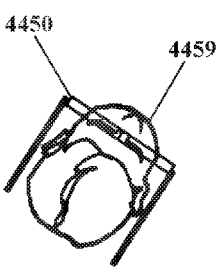
FIG. 42　　　　　FIG. 43　　　　　FIG. 44
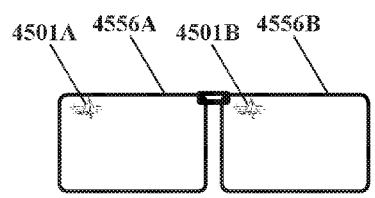
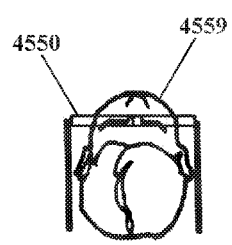
FIG. 45

METHOD AND APPARATUS FOR SELECTIVELY PRESENTING CONTENT

CLAIM OF PRIORITY

This application is a continuation-in-part application of U.S. patent application Ser. No. 14/014,111 filed on Aug. 29, 2013, and claiming priority from U.S. Provisional Application Ser. No. 61/695,261 filed on Aug. 30, 2012, the contents of which are incorporated by reference for all intents and purposes.

FIELD OF THE INVENTION

This invention relates to presentation of content. More particularly, the invention relates to selectively presenting content in a controlled fashion such as according to a visual map, in response to contextual factors.

DESCRIPTION OF RELATED ART

In some instances, it may prove useful to output media content and other information in a "bulk" fashion. That is, a computer monitor, television, smart phone display, etc. displays images, text, and so forth in an essentially continuous and uniform fashion. So long as such a device is on, the device delivers data as that data is sent to the screen.

However, such bulk delivery of content can be problematic. For example, for a head mounted display it may be desirable under some circumstances to output at least certain types of data to the central visual field of a person wearing the display, so as to take advantage of the high visual acuity of the wearer's central vision. Yet, there are also circumstances under which outputting data to the wearer's central vision may cause difficulty, such as when a wearer of such a device is walking along a crowded sidewalk; in such case it might prove more advantageous to minimize or prevent obstructions to the wearer's central vision, so that the wearer may safely navigate through their environment.

In particular, it may be useful under at least some circumstances to maintain such a display arrangement, so that data being displayed appears to the viewer to "stay in the same place", regardless of how the viewer turns his or her head, shifts his or her eyes, etc.

BRIEF SUMMARY OF THE INVENTION

The disclosure contemplates a variety of systems, apparatus, methods, and paradigms for selectively presenting content.

In one embodiment, a machine implemented method is provided that includes obtaining input data, determining an eye disposition of a viewer, and determining a field of view of the eye of a viewer therefrom. The method includes defining a first portion of the field of view based on a status of a contextual factor, defining a second portion of the field of view based on the status of the contextual factor, and generating visual output data from the input data based on the status of the contextual factor. The method also includes displaying the output data on a first region of a see-through near-eye display, the first region substantially corresponding with the first portion of the field of view such that the output data appears in the first portion of the field of view, and excluding the output data from a second region of the display, the second region substantially corresponding with the second portion of the field of view such that the output data does not obstruct the second portion of the field of view.

The method further includes determining a shift in the eye disposition and determining a shift in the field of view therefrom, and updating the first and second regions of the display so as to maintain the substantial correspondence between the first region and the first portion of the field of view and the substantial correspondence between the second region and the second portion of the field of view responsive to the shift in the field of view, such that the output data does not perceptibly change within the field of view responsive to the shift in the field of view of the viewer.

In another embodiment, a machine implemented method is provided that includes obtaining input data, defining a first portion of a field of view of an eye of a viewer based on a status of a contextual factor, defining a second portion of the field of view based on the status of the contextual factor, generating output data from the input data based on the status of the contextual factor, and directing the output data to the first portion of the field of view such that the second portion of the field of view is unobstructed by the output data. The method also includes updating directing the output data to the first portion of the field of view responsive to a change in disposition of the field of view, such that the output data does not perceptibly change as viewed by the viewer responsive to the change in disposition of the field of view.

Generating the output data from the input data may include applying a transformation to the input data. The method may include applying a first transformation to the output data if the contextual factor meets a standard, and applying a second transformation to the output data if the contextual factor does not meet the standard.

The contextual factor may include a posture of the viewer and/or a gesture of the viewer. The contextual factor may include a hand posture, an eye posture, a lip posture, a tongue posture, a jaw posture, a head posture, a body posture, a hand gesture, an eye gesture, a lip gesture, a tongue gesture, a jaw gesture, a head gesture, a body gesture, and/or a locomotion.

The contextual factor may include an environmental feature.

The contextual factor may include an action of said viewer. The action may include the viewer sleeping, sitting, standing, walking, running, conversing, exercising, operating a vehicle, and/or operating machinery.

The first portion of the field of view may substantially correspond to the foveolar region of the visual field of the viewer, the foveal region of the visual field of the viewer, the macular region of the visual field of the viewer, the central region of the visual field of the viewer, and/or the peripheral region of the visual field of the viewer.

The first portion of the field of view may include at least a portion the foveolar region of the visual field of the viewer, the foveal region of the visual field of the viewer, the macular region of the visual field of the viewer, the central region of the visual field of the viewer, and/or the peripheral region of the visual field of the viewer.

The second portion of the field of view may substantially correspond to the foveolar region of the visual field of the viewer, the foveal region of the visual field of the viewer, the macular region of the visual field of the viewer, the central region of the visual field of the viewer, and/or the peripheral region of the visual field of the viewer.

The second portion of the field of view may include at least a portion of the foveolar region of the visual field of the viewer, the foveal region of the visual field of the viewer, the macular region of the visual field of the viewer, the central region of the visual field of the viewer, and/or the peripheral region of the visual field of the viewer.

Directing the output data to the first portion of the field of view may include displaying the output data on a first region of a display substantially corresponding with the first portion of the field of view, and leaving the second portion of the field of view unobstructed by the output data may include excluding the output data from a second region of the display substantially corresponding with the second portion of the field of view.

Updating directing the output data may include updating the first and second regions of the display so as to maintain the substantial correspondence between the first region and the first portion of the field of view and the substantial correspondence between the second region and the second portion of the field of view responsive to a motion of the viewer, such that the output data does not perceptibly change as viewed by the viewer responsive said motion of the viewer.

The display may be a see-through near-eye display.

In another embodiment, a machine implemented method is provided that includes obtaining input data, generating output data from the input data, determining a status of a contextual factor, and determining whether the status of the contextual factor meets a standard. If the status of the contextual factor meets the standard, the method includes determining a disposition of an eye of a viewer, and applying a transformation to the output data. The transformation includes defining a first output region substantially corresponding with a first portion of a retina of the eye, defining a second output region substantially corresponding with a second portion of the retina of the eye, limiting output of the output data to the first output region, and excluding output of the output data from the second output region such that the second output region is unobstructed by the output data. The method includes outputting the output data, updating the determination of the disposition of said eye subsequent to a change in disposition of the eye, maintaining the substantial correspondence between the first output region and the first portion of the retina without perceptibly changing the output data responsive to the change in disposition of the eye, and maintaining the substantial correspondence between the second output region and the second portion of the retina.

The contextual factor may include a posture of the viewer and/or a gesture of the viewer. The contextual factor may include a hand posture, an eye posture, a lip posture, a tongue posture, a jaw posture, a head posture, a body posture, a hand gesture, an eye gesture, a lip gesture, a tongue gesture, a jaw gesture, a head gesture, a body gesture, and/or a locomotion.

The contextual factor may include an environmental feature.

The contextual factor may include an action of the viewer. The action may include the viewer sleeping, sitting, standing, walking, running, conversing, exercising, operating a vehicle, and/or operating machinery.

The first portion of the retina may substantially correspond to the foveolar region of the visual field of the viewer, the foveal region of the visual field of the viewer, the macular region of the visual field of the viewer, the central region of the visual field of the viewer, and/or the peripheral region of the visual field of the viewer.

The first portion of the retina may include at least a portion the foveolar region of the visual field of the viewer, the foveal region of the visual field of the viewer, the macular region of the visual field of the viewer, the central region of the visual field of the viewer, and/or the peripheral region of the visual field of the viewer.

The second portion of the retina may substantially correspond to the foveolar region of the visual field of the viewer, the foveal region of the visual field of the viewer, the macular region of the visual field of the viewer, the central region of the visual field of the viewer, and/or the peripheral region of the visual field of the viewer.

The second portion of the retina may include at least a portion of the foveolar region of the visual field of the viewer, the foveal region of the visual field of the viewer, the macular region of the visual field of the viewer, the central region of the visual field of the viewer, and/or the peripheral region of the visual field of the viewer.

The first region may be a first region of a see-through display, and the second region may be a second region of the see-through display. The see-through display may be a near-eye display.

The display may include a see-through near-eye display.

In another embodiment, a machine implemented method is provided that includes means for obtaining input data, means for generating output data from the input data, means for determining a status of a contextual factor, and means for determining whether the status of the contextual factor meets a standard. The apparatus includes means for determining a disposition of an eye of a viewer with respect to a see-through display if the contextual factor meets the standard, and means for applying a transformation to the output data if the contextual factor meets the standard. The transformation includes defining a first output region substantially corresponding with a first portion of a retina of the eye. defining a second output region substantially corresponding with a second portion of the retina of said eye, limiting output of the output data to the first output region, and excluding output of the output data from the second output region such that the second output region is unobstructed by the output data. The apparatus also includes means for outputting the output data to the see-through display, means for updating the determination of the disposition of the eye subsequent to a change in disposition of the eye, means for maintaining the substantial correspondence between the first output region and the first portion of the retina without perceptibly changing the output data responsive to the change in disposition of the eye, and means for maintaining the substantial correspondence between the second output region and the second portion of the retina.

BRIEF DESCRIPTION OF THE SEVERAL VIEWS OF THE DRAWINGS

Like reference numbers generally indicate corresponding elements in the figures.

FIG. 35 through FIG. 37 show example arrangements of content displayed to the center of a head mounted display, responsive to head turns by a viewer wearing the head mounted display.

FIG. 38 through FIG. 41 show example arrangements of content displayed to the center of a head mounted display, responsive to head inclinations by a viewer wearing the head mounted display.

FIG. 42 through FIG. 45 show example arrangements of content displayed to a corner of a head mounted display, responsive to head turns by a viewer wearing the head mounted display.

DETAILED DESCRIPTION OF THE INVENTION

Figure 1:
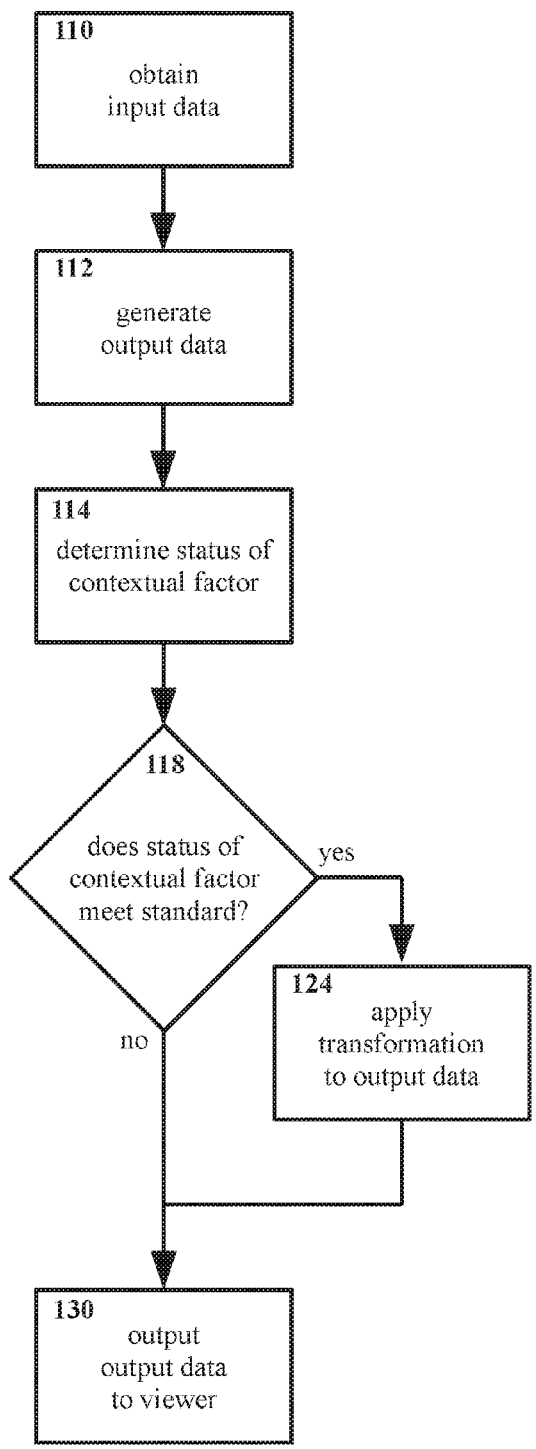
FIG. 1 shows an example a method for selectively outputting data to a viewer.

Referring to FIG. 1, an example embodiment of a method for selectively outputting data to a viewer is shown therein. In the method as shown in FIG. 1, input data is obtained 110.

A wide range of data may be suitable for utilization as input data, including but not limited to text, video, audio, and numerical data.

Output data is generated 112. Typically though not necessarily the output data is at least partially derived from and/or includes at least a portion of the input data. However, even when input data is a source for output data, information present in input data may be added, modified, and/or or removed when generating output data 112. A wide variety of approaches, algorithms, etc. may be used to generate output data 112. The approaches, algorithms, etc. used to generate output data 112 may depend at least in part on the desired form and/or content of the output data. That is, whether or not the output data is or includes (for example) video data may at least partially determine the manner by which the output data is generated 112. In addition, where output data is generated from input data, the approaches, algorithms, etc. used to generate output data 112 therefrom may depend at least in part on the form and/or content of the input data. To continue the example above, whether the input data includes video data may at least partially determine the manner by which the output data is generated 112 from the input data.

Moving on in FIG. 1, a status of a contextual factor is determined 114. As referenced herein, contextual factors may vary greatly. Although particular embodiments may preferentially utilize one or more specific contextual factors, in general substantially any event, object, feature, etc. that may be sensed or otherwise evaluated may be utilized as a contextual factor.

Consider a case wherein a person is viewing data on a processor-controlled head mounted display device wherein the processor is executing the method as described herein.

In such circumstance, one example of a contextual factor might be the locomotion (if any) of the viewer. Such a contextual might also be considered in a more detailed fashion, for example with regards to particular head motions and/or features thereof, which might be indicative of whether the viewer is walking, running, sitting, etc. Other contextual factors might include but are not limited to a viewer's body position, a location in real space (or an augmented space and/or a virtual space), conditions such as light level, the presence or absence of objects, persons, and/or phenomena, etc.

Determining the status of a contextual factor 114 thus might be expressed as a question, e.g. "does the viewer's head exhibit motions corresponding with the viewer walking?" A question addressing such a contextual factor also might be phrased more generally, e.g. "is the viewer walking?"

If determining the status of a contextual factor 114 may be considered as a question, the status itself of a contextual factor may be considered in the form of an answer to that question. For example, if the contextual factor is "viewer's locomotion", a status might be data regarding the motion of the viewer's head, the viewer's body as a whole, etc.

Embodiments are not limited with regard to the contextual factor, the status the contextual factor may have, or how that status is determined.

Returning to FIG. 1, a determination is made 118 as to whether the status of the contextual factor (as determined in step 114) meets a standard for that contextual factor. To continue the example above, if the contextual factor at issue is "viewer's locomotion", and the status of the contextual factor is in the form of data regarding the motion of the viewer's head and/or body, this standard might take the form of a series of guidelines representing motions that would be expected if the viewer were walking, running, etc. Standards may be simple, such as a fixed minimum value of acceleration or velocity, or relatively complex, such as a detailed set of criteria regarding directions of motion, amplitudes, patterns (if any), speeds and/or frequencies of motion, etc.

In addition, although a determination 118 may be binary as shown in FIG. 1—that is, the status of the contextual factor either meets or does not meet the standard—this is an example only. More nuanced determinations 118 may be made, using non-binary standards. For example, a standard might have several levels or degrees, such as an arrangement wherein a standard for acceleration has ranges for "no acceleration", "low acceleration", and "high acceleration", potentially with different transformations and/or other outcomes associated with each level. Other arrangements, including but not limited to standards that define continuous ranges as opposed to discrete levels also may be suitable.

Alternatively, multiple standards may be used in combination with multiple transformations. That is, a single contextual factor may be compared against two or more standards, with each standard potentially leading to a distinct transformation.

Moreover, a transformation may be based at least in part and/or otherwise take into consideration the status and/or value of the contextual factor. For example, a transformation relating to a minimum level of acceleration may include the value, direction, etc. as measured (or otherwise determined) for the acceleration as part of an algorithm used to carry out the transformation.

Briefly, then, a contextual factor is a feature to be evaluated; the status of the contextual factor is information describing some or all of the state of that feature; and the standard is a guideline (simple or complex) against which that information may be compared.

The contextual factor, the status thereof, the standard for comparison, and the manners by which the status is determined and compared, may all vary considerably from one embodiment to another. The particulars thereof may depend at least partly on the details of each specific embodiment. These matters are addressed in more detail subsequently herein.

If the determination 118 is negative—the status of the contextual factor does not meet the standard therefor—then the method proceeds to output the output data 130. In the head mounted display used as an example above, the output data might be displayed to the viewer on a screen or screens.

On the other hand, if the determination 118 is positive—the status of the contextual factor does meet the standard—then the method proceeds to apply a transformation to the output data 124. Embodiments are not limited with regard to the transformation. Transformations might include, but are not limited to, changes to and/or restrictions on where data is displayed, how much (if any) data is displayed, the form in which data is displayed (e.g. text, graphical icons, still images, video, audio, etc.), and the appearance of the data (color, size, resolution, frame rate of animation, etc.).

Subsequent to application of the transformation 124, the now-transformed output data is outputted to the viewer 130.

Figure 2:
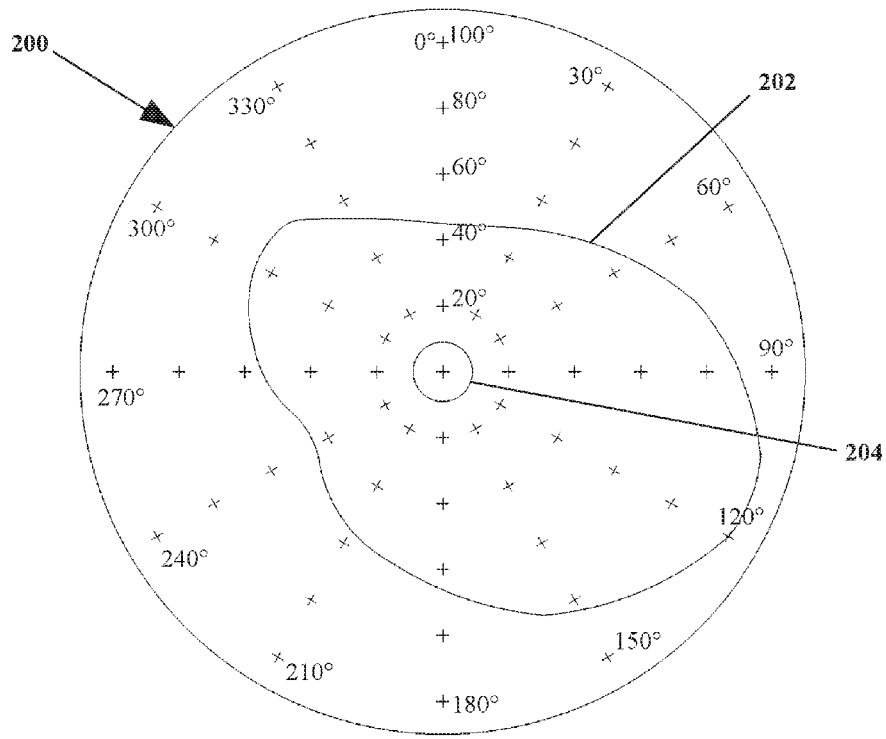
FIG. 2 shows an example visual map of a typical human eye including peripheral and central vision.
Figure 3:
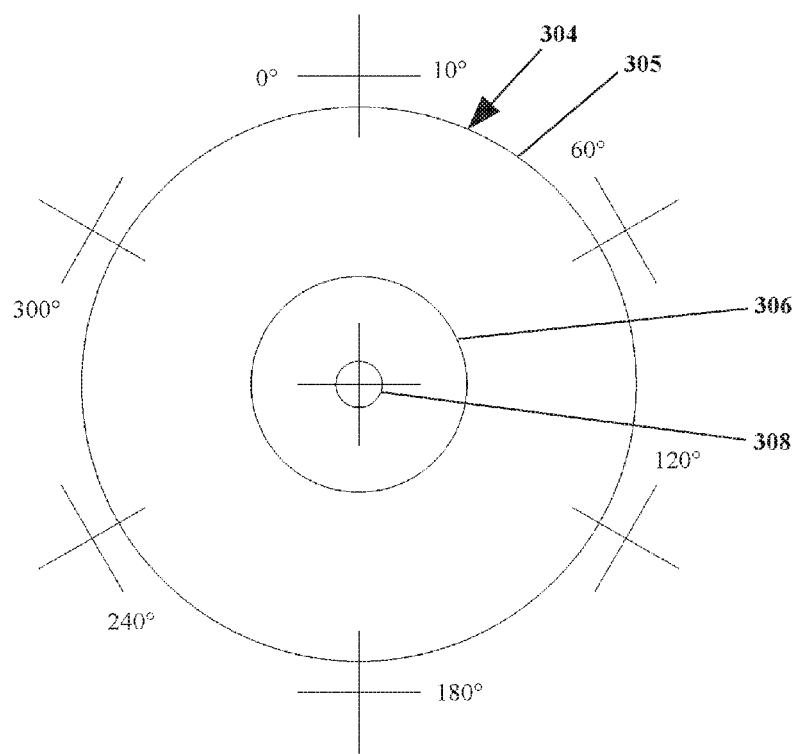
FIG. 3 shows an example partial visual map of a typical human eye including macular, foveal, and foveolar vision.
Figure 4:
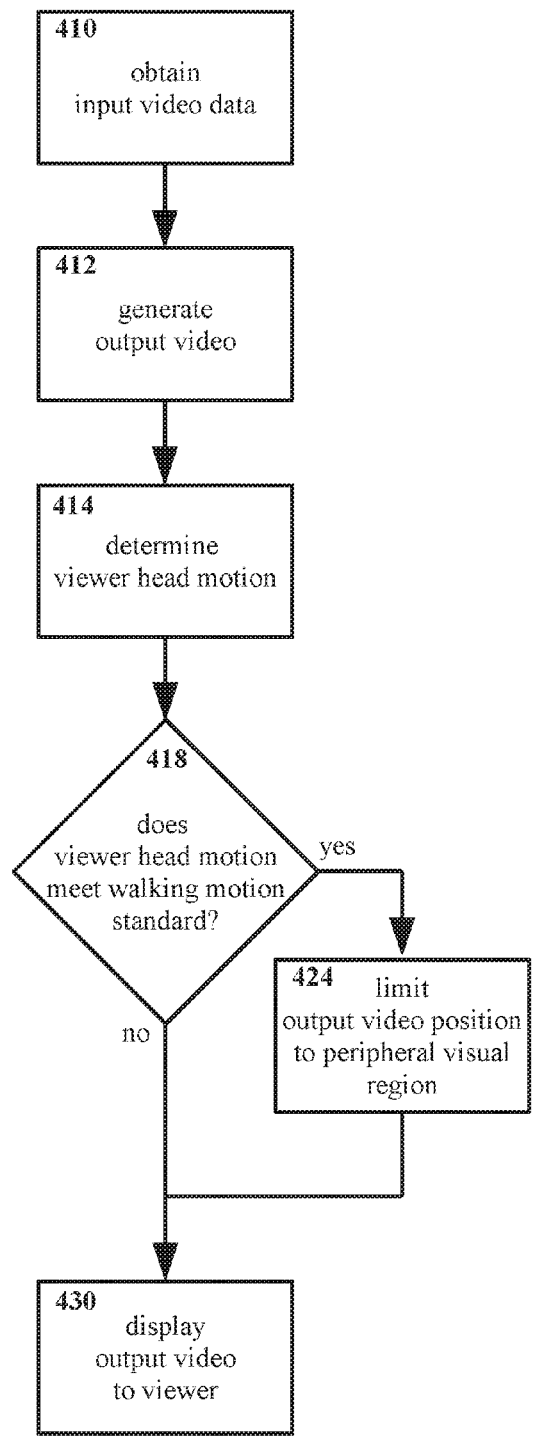
FIG. 4 shows another example method for selectively outputting data to a viewer.

Further and more detailed discussion follows regarding several of the aforementioned features. However, for the sake of clarity a more concrete example of a method first will be presented with reference to FIG. 2, FIG. 3, and FIG. 4. FIG. 2 and FIG. 3 illustrate portions of a human visual field, while FIG. 4 shows an example method for selectively outputting data to different portions of a human visual field.

With reference to FIG. 2, therein a visual map 200 is presented showing visual fields typical for the right eye of a human. Hash marks at different radial distances correspond to angles from the normal, e.g. 20 degrees offset, 40 degrees offset, etc. Hash marks around the periphery of FIG. 2 correspond to angles from the vertical.

The outline identified as 202 in FIG. 2 corresponds approximately to a human's peripheral visual field. The outline identified as 204 in FIG. 2 corresponds approximately to a human's central visual field.

The human peripheral visual field 202 is of uneven shape, and covers a relatively large area, with a radial extent of as much as 120 degrees or more in some areas as may be seen in FIG. 2. Within the area of the peripheral visual field 202, spatial resolution is low and color discrimination is poor or even nonexistent. However, vision at low light levels is good, and motion detection is excellent.

By contrast, the human central visual field 204 is roughly circular but has a radial extent of only about 9 degrees (or a diameter of about 18 degrees). In terms of physical dimensions within the eye, the region of the retina that generates the central visual field 204 is approximately 5 mm in diameter. Within the central visual field 204, spatial resolution is high and color resolution is good. However, as noted the total area of the central visual field is relatively small. While humans generally perceive their vision as having high resolution over a wide area, this is for the most part an illusion generated by the brain; in fact high resolution image data (and good color data) are available only in a small portion of the human visual field.

As may be seen in FIG. 3 the central visual field 304 may in turn be further subdivided. The outermost portion of the central visual field 304 is referred to as the macular vision 305; macular vision has a radial extent of about 9 degrees, and is generated by a region of the retina (the macula) approximately 5 mm across. Moving inward, the foveal visual field 306 has a radial extent of about 3.5 degrees, and is generated by a region of the retina (the fovea) approximately 1.5 mm across. Finally, the foveolar visual field 308 has a radial extent of only about 0.75 degrees, and is generated by a region of the retina (the foveola) approximately 0.35 mm across.

The macular visual region 305, foveal visual region 306, and foveolar visual region 308 respectively have progressively higher spatial resolution and improved color discrimination. That is, the highest level of spatial resolution and color discrimination in human vision is found in the foveolar visual region 308, corresponding to the centermost portion of the visual field.

Turning now to FIG. 4, an example method is shown therein for selectively outputting data to different portions of a human visual field. The method of FIG. 4 is at least somewhat similar to that shown in FIG. 1, however the method in FIG. 4 is more specific to a particular embodiment. Namely, the example method in FIG. 4 relates to displaying video in different areas of a viewer's visual field based on a determination of whether the viewer is walking. Such a method might be employed, for example, in conjunction with the use of a head mounted display worn by the viewer. However, it is emphasized that this is an example only, presented for illustrative purposes, and that embodiments are not limited to the specifics of the embodiment shown in FIG. 4.

In the method as shown in FIG. 4, input video data is obtained 410. This corresponds generally to the input data obtained in step 110 of FIG. 1, but for the example of FIG. 4 the input data is specifically data for displaying a video, i.e. video frames, video encoding information, audio tracks, etc.

Output video is generated 412 from the input video data. The generation of output video 412 from input video data is at least somewhat comparable to the generation of output data 112 in FIG. 1. Output video may be considered to be one possible example of output data (though output data is not limited only to video).

The viewer's head motion is determined 414. That is, some or all of the motions of the viewer's head are determined e.g. using gyroscopes and accelerometers or through some other approach. The determination of the status of the viewer's head motion 414 is at least somewhat comparable to the determination of the status of a contextual factor 114 in FIG. 1. Specifically, a viewer's head motion may be considered to be the status of a contextual factor (though by no means the only possible contextual factor or status thereof) for the particular example embodiment shown in FIG. 4.

Moving on in FIG. 4, a determination is made 418 as to whether the status of the viewer's head motion matches a walking motion standard. That is, is the viewer's head moving, and if so does that movement correspond with a standard representative of motions by a viewer walking? For example, a walking viewer might be expected to exhibit specific frequencies and amplitudes of head motion, and/or other recognizable patterns or properties of motion, which might be used to define a standard by which make the determination 418. The determination 418 as to whether the status of the viewer's head motion meets a standard is at least somewhat comparable to the determination 118 of whether the status of a contextual factor meets a standard in FIG. 1.

If the viewer's head motion is determined 418 not to match the standard therefor, the method proceeds display the output video to the viewer 430. This is at least somewhat comparable to outputting the output data 130 in FIG. 1, in that displaying output video 430 may be considered an example of outputting output data 130.

On the other hand, if the determination 418 is positive—if the viewer's head motion does meet the standard therefor—then the method limits the position in which the output video is displayed to the viewer to only the viewer's peripheral vision 424. This is at least somewhat similar to the step of applying a transformation to output data 124 in FIG. 1, in that limiting the position of output video may be considered as an example of a transformation applied to output data. However, embodiments are not limited only to spatial limits as transformations.

With the positioning limit applied 424, the output video is displayed to the viewer 430. More particularly, given the positioning limit of step 424 the output video, the output video is displayed 430 only to the peripheral visual region of the viewer.

In sum, in the example method shown in FIG. 4, if the viewer is walking, then video output is limited to the viewer's peripheral vision, leaving the viewer's central visual field clear to navigate, deal with obstacles, etc.

As noted earlier, additional discussion may be warranted with regard to several features as introduced in FIG. 1.

With reference in particular to step 110 in FIG. 1, further discussion is herein presented regarding input data.

A wide variety of input data may be suitable for use with the various embodiments, and embodiments are not limited with regard thereto. Input data may include, but are not limited to, text, graphics, images, videos, models and/or other constructs, metadata related to any of the preceding or to other data, executable instructions and/or programs composed thereof, and numerical data. In addition, nonvisual data may be suitable for use as input data for at least some embodiments, including but not limited to audio data.

Similarly, embodiments are not limited with regard to how and/or from what source(s) input data is acquired. Input data may, for example, be obtained from one or more sensors, e.g. sensors in communication with a processor that is executing the machine-controlled method of various embodiments. A wide range of sensors may be suitable. Where sensors are used to generate input data, the particular sensors used to generate the input data for a given embodiment may depend at least in part on the contextual factor(s) under consideration, i.e. the object, phenomenon, etc. on which the sensors gather information. For example, for an embodiment wherein the contextual factor is or relates to motion of a viewer's body, sensors for determining position, motion, and/or acceleration might be utilized. Other arrangements may be equally suitable.

As described in more detail elsewhere herein, sensors may also be used to determine the status of contextual factors. It is noted that sensors, when present, may obtain either or both input data and status information regarding contextual factors. Any particular sensor may, but is not required to, provide both types of data. For example, an imaging sensor might acquire images of a viewer's physical surroundings for use as input data, and also acquire information regarding the viewer's own motions if those motions are to be utilized as a contextual factor (e.g. by observing apparent motion of objects within the imager's field of view). However, this is an example only and is not required, and other arrangements also might be equally suitable.

Still with reference to step 110 in FIG. 1, in addition to or instead of obtaining input data from sensors, input data may be generated within a processor that is implementing the machine-controlled method. Input data might also be obtained from a data store in communication with the processor, or from an external system (e.g. by wired or wireless communication). Input data may come from alternative and/or additional sources, as well.

With reference now to step 112 in FIG. 1, further discussion is herein presented regarding output data.

Embodiments may generate a wide variety of output data, and embodiments are not limited with regard thereto. Output data may include, but are not limited to, text, graphics, images, videos, models and/or other constructs, metadata related to any of the preceding or to other data, executable instructions and/or programs composed thereof, and numerical data. In addition, nonvisual data may be suitable for use as output data for at least some embodiments, including but not limited to audio data.

Likewise, embodiments are not limited with regard to how output data is generated. A wide variety of algorithms, processing approaches, etc. may be suitable for use in generating output data according. The particular algorithms, processing approaches, etc. may depend at least to some degree on the contextual factor(s) and standards therefor; for a binary standard (e.g. yes/no) for example, a simple algorithm may be suitable, while for a standard that providing subtle and sophisticated guidelines regarding complex motions a relatively complicated algorithm might be suitable.

In addition, for some embodiments it may be sufficient to use the input data directly as the output data, without alteration. Processing to make changes to the input data to generate the output data, while not precluded, also are not required. Thus for some embodiments under at least some conditions, the input data and output data may be identical or substantially identical.

Similarly, embodiments are not limited with regard to how and/or to what destination(s) output data is outputted (with reference to step 130 in FIG. 1). Output data may be outputted to one or more visual displays, such as visual displays in head mounted displays and other wearable devices, but this is an example only and other arrangements may be equally suitable. A wide range of output devices may be suitable, and the particular form(s) and content of the output data for a given embodiment may depend at least in part on the output device(s) utilized therewith.

Furthermore, output data for is not necessarily static in nature. That is, it may be possible for at least some embodiments to generate output data with or without applying a transformation (depending on whether or not the status of any relevant contextual factors matches the appropriate standards therefor), and then, if the status of the relevant contextual factors is determined to change, to likewise apply different transformations to the output data. For example, consider an arrangement wherein a contextual factor relates to whether or not a viewer's line of sight is aligned with output data being outputted to that viewer. Initially, until output data is first outputted the viewer might not be looking in appropriate direction (since the output data would not yet be present). However, once the output data were outputted, and the viewer aligned his or her line of sight with the output data, the status of the contextual factor would change, which in turn could invoke a transformation to the output data. More particularly, in terms of the appearance to the viewer, output data might be displayed initially in an abbreviated form, with the output data then expanding to show more information when the viewer shifts his or her eyes to focus on the output data.

With reference now to steps 114 and 118 in FIG. 1, further discussion is herein presented regarding contextual factors, status of contextual factors, and standards therefor.

Contextual factors, the status thereof, and standards therefor are interrelated. In brief, a contextual factor is a parameter to be considered; the status of the contextual factor is information describing some or all of the state of that parameter; and the standard is a guideline against which that information may be compared. For example, a contextual factor might be "motion of a person viewing output from a head mounted display", with the status of that contextual factor being the actual motion exhibited by that viewer, and the standard being some description of motion against which the actual motion may be compared.

Contextual factors for various embodiments may vary greatly, and embodiments are not limited with regard thereto. Broadly speaking, a contextual factor may be substantially any feature that can be usefully sensed, measured or otherwise have a status thereof determined, and for which that status can be compared to a standard, so as to inform whether or not a transformation of output data is to be invoked.

Contextual factors, statuses, and standards may be simple or complex. For example, a contextual factor relating to light levels might be as simple as "light intensity", but might also more sophisticated, e.g. "cyclical variation in light intensity over time". In addition, contextual factors, statuses, and standards may consider multiple values, e.g. a contextual factor may consider both light level and light color, both light level and motion of a viewer, etc. with statuses and standards being similarly multi-value.

Contextual factors and standards may be viewer defined, may be processor defined, may be externally defined, and/or may be predefined. Contextual factors and standards may also be adaptive. That is, contextual factors, statuses, and standards may themselves vary, e.g. in response to viewer inputs, processor action, environmental cues, etc. Contextual statuses, by contrast, typically are measured, read from storage, or otherwise determined as factual information, rather than being defined.

Certain embodiments may include a minimum of one contextual factor, one status, and one standard. However, there is no upper limiting number of contextual factors, statuses, and/or standards. In practice the number considered for at least some embodiments may be extremely large. In addition, a single contextual factor, status, and/or standard may invoke one or more transformations, and a single transformation may conversely be invoked by more than one contextual factor, status, and/or standard. While one-to-one correspondence is not prohibited, neither is one-to-one correspondence required.

Still with reference to steps 114 and 118 in FIG. 1, the manner by which the contextual factors and/or standards are defined or otherwise determined is not limited. Likewise, the manner by which the status is measured or otherwise determined is not limited. Further, the manner by which the status is determined to match or not match the standard is not limited. Algorithms, approaches, etc. for the aforementioned actions may be simple or complex, may be viewer determined or otherwise determined, and may be fixed or adaptive. Specific algorithms, approaches, etc. for a particular embodiment may depend to at least some degree on the details of the contextual factors, statuses, and standards for that particular embodiment.

As previously noted with regard to input data, contextual feature status may be obtained as sensor data. In particular, for some embodiments some or all sensor data for input data and some or all sensor data for determining contextual status may come from one or more common sensors. That is, a single sensor may provide input data and/or contextual status data.

As has been described, contextual factors, statuses, and standards are interrelated. For purposes of simplicity in describing variations and permutations therein, the term "contextual factor" is used to collectively represent these related concepts. It should be understood that reference to a contextual factor related to, for example, biometric features and/or information, in turn implies a status that is likewise relevant to biometric information, and a standard that similarly relates to biometric features and/or information.

Contextual factors may vary greatly from one embodiment to another.

For at least some embodiments, it may be useful to utilize contextual factors that relate to a viewer of the output data, and/or that represent some feature of that viewer.

More particularly, for at least some embodiments it may be useful to utilize one or more postures and/or gestures of the viewer as a contextual factor. As used herein a posture is a substantially static position, orientation, configuration, etc. of a viewer or a portion thereof, while a gesture is a substantially active change in position, orientation, configuration, etc. of a viewer or a portion thereof.

For example, a contextual factor might be a hand posture and/or gesture by the viewer. As indicated previously, contextual factors may be simple or complex. Thus utilizing a hand posture or gesture as a contextual factor might constitute simply determining whether a viewer's hand is present (and in the case of a gesture, moving), e.g. in the field of view of a camera. However, the contextual factor could be more specific, such as determining whether a viewer's hand is present (and/or moving) at a certain location, with a certain orientation, a certain configuration (e.g. fingers bent, fingers spread, etc.).

Continuing with regard to steps 114 and 118 in FIG. 1, it is noted that embodiments do not necessarily require a distinction between contextual factors satisfied through a knowing and deliberate action on the part of a viewer and contextual factors satisfied without the viewer necessarily intending or even being aware of satisfying a contextual factor. To continue the example of hand postures and gestures, a deliberate hand posture or gesture might be executed by a viewer as a form of command or input (i.e. to the processor executing the method). By contrast, viewers may execute natural postures and/or gestures without consideration or even awareness of the use of those postures and/or gestures as contextual factors. Thus, while certain contextual factors may be selected so as to facilitate deliberate inputs or commands by a viewer (e.g. to execute a particular transformation), other contextual factors may be selected so as to invoke transformations that are, from the standpoint of the viewer, transparent and automatic.

Thus, while certain a contextual factor may for certain embodiments represent a command, contextual factors are not required to be commands. In particular, it is emphasized that the use of a viewer features and other viewer-controlled contextual factors is an example only, and that embodiments are not limited thereto. Contextual features are possible that do not involve viewers and/or that cannot be directly controlled by viewers, such as local temperature, light levels, time of day, etc.

Still with regard to steps 114 and 118 in FIG. 1, a variety of postures and gestures may be suitable for use as contextual factors. Suitable gestures and postures include, but are not limited to, eye postures and gestures, lip, jaw, and/or tongue postures and gestures, head postures and gestures, and overall body postures and gestures. In particular, postures and/or gestures indicative and/or suggestive of some other viewer action (perhaps one not immediately observed) may be utilized as contextual factors.

For example, lip, jaw, and/or tongue postures and gestures may be considered as contextual factors in their own right. However, certain lip, jaw, and/or tongue postures and gestures also may be considered to be indicative of a viewer conversing, and/or subvocalizing. For some embodiments it may be sufficient to sense and consider as contextual factors such lip, jaw, and/or tongue postures and gestures, without consideration as to whether speech etc. is occurring. However, for other embodiments it may be desirable to sense lip, jaw, and/or tongue postures and gestures so as to determine therefrom whether a viewer is speaking, and/or what he or she is saying if so. While such determination is not required, neither is such determination prohibited. Either or both of the postures and/or gestures themselves and/or the speech (if any) associated therewith may be utilized as contextual factors.

Other head postures and/or gestures suitable for use as contextual factors include, but are not limited to, nodding, shaking, and/or tilting of the head, and/or moving to, moving from, moving through, and/or being aligned with a directional facing. More particularly with regard to directional facings, directional facings may include but are not limited to head positions substantially corresponding with a near-distance reading position.

Similarly, eye alignment and/or eye movement may be considered as contextual factors. A viewer aligning his or her line of sight, and/or moving his or her line of sight, may be indicative of the viewer looking at some target within the viewer's visual field such as object, feature, etc. It may not be necessarily to verify directly that a viewer is indeed looking at a particular object; for at least certain arrangements it may be suitable to track the position and/or motion of the viewer's eyes, for example, and infer the viewing of a particular target based on the direction(s) in which the viewer is looking. However, otherwise determining or verifying that the viewer is indeed looking at a target (e.g. though sensing degree/distance of eye focus, monitoring brainwaves, imaging and recognizing objects within the viewer's field of view, etc.).

Suitable eye postures include, but are not limited to, the viewer's line of sight being aligned with the output data (or some portion thereof), the viewer's line of sight being aligned with a real-world target, the viewer's line of sight being aligned with a virtual reality target, and the viewer's line of sight being aligned with an augmented reality target. Similarly, suitable eye gestures include but are not limited to aligning the viewer's line of sight with the output data (or some portion thereof), aligning the viewer's line of sight with a real-world target, aligning the viewer's line of sight with a virtual reality target, and aligning the viewer's line of sight with an augmented reality target.

Likewise, postures and/or gestures using other body parts and/or a body as a whole may be utilized as contextual factors.

Continuing with regard to steps 114 and 118 in FIG. 1, although the preceding may refer (at least in places) to contextual factors on a level of individual gestures, it is noted that contextual factors, including but not limited to contextual factors associated with viewer features such as postures and gestures, may be considered at varying "levels". For example, a relatively low-level contextual factor might be represented by a characterization of certain specific acceleration and gyroscopic parameters for a viewer's head. A higher-level contextual factor might be represented by a determination of whether a viewer's head may be considered to be moving in such a fashion as to correspond with that viewer walking and/or running. A yet higher-level contextual factor might simply be a question of whether the viewer is walking/running or not. In practice, a contextual factor such as "viewer walking/running" may be implemented as one or more lower level contextual factors, e.g. gyroscope and accelerometer data. Nevertheless, in instances where contextual factors may be implemented at high levels, doing so is not prohibited. For purposes of clarity, contextual factors as discussed herein may be presented as only a single level. However, description of contextual factors at one level (whether high, low, or otherwise) should not be interpreted as a requirement to implement that contextual factor or any contextual factor at such a level, nor should such description be interpreted as a suggestion that either contextual factors generally or any particular contextual factor is limited to high levels, low levels, or otherwise.

Thus, while it may be suitable to consider specific motions and/or positions of arms, legs, head, etc. (and/or combinations thereof) as contextual factors, it may also be equally suitable to consider as contextual factors such higher-level notions as whether a viewer is sitting, standing, walking, running, conversing, exercising, operating a vehicle, operating machinery, etc.

Again with regard to steps 114 and 118 in FIG. 1, insofar as determining the status of a particular contextual factor, data may be, but is not required to be, relatively low-level in nature. In practice sensors available for obtaining status data tend to generate relatively low-level data. For example, even if the high-level contextual factor under consideration is "is the viewer walking?" the actual status data may not be of a form "yes/no", but rather may be of the form of visual data (e.g. from a camera, whether facing the viewer or otherwise), biometric data, accelerometer data, gyroscope data, compass data, GPS or differential GPS data, etc. To consider a slightly higher level, data might be in the form of position information, motion information, acceleration information, etc. The "yes/no" status may then be determined from such lower-level sensor data and/or such mid-level data, e.g. by analysis of the data using executable instructions instantiated on the processor that is executing the method. However, this is an example only, and obtaining high-level status information is not prohibited.

While processing of sensor and/or other data to determine the status of a contextual factor is not required, for at least certain embodiments such processing may be useful. For example, data from an imaging sensor, or image data obtained otherwise, may be evaluated in terms of recognizable content therein. For example, for a contextual factor along the lines of "is another person present?", evaluating an image using a facial recognition algorithm might prove useful in determining whether a face (and thus potentially a person) might be present. Likewise, object recognition might be utilized to assist in determining the presence of objects relevant to a contextual factor. Text recognition also may be useful in evaluating contextual factors for at least some embodiments, since textual cues are frequently widespread and may be informative either directly and/or indirectly. For example, a sign reading "East 46th Street" might be directly indicative of location (i.e. the viewer is at/near East 46th Street), while "artichokes 3 for $1" might indirectly (but still potentially usefully) suggest without necessarily directly identifying a location (i.e. at a grocery store or other location where artichokes might be for sale). Likewise, overall environmental identification might entail identification of multiple objects, entities, and/or individuals, patterns of landscapes or cityscapes, etc.

Further with regard to steps 114 and 118 in FIG. 1, just as embodiments are not limited with regard to the contextual factors that may be utilized, embodiments also are not limited with regard to the information that may be obtained and/or used to determine the status of contextual factors.

As already noted information regarding motion may be gathered; a range of such data may be gathered. Motion information regarding the viewer may, for example, be determined by sensing or otherwise obtaining data on position, velocity, acceleration, orientation, etc. Suitable instruments for gathering such data include but are not limited to accelerometers, gyroscopes, compasses, GPS sensors, and differential GPS sensors. In addition, motion data might be obtained in other ways, e.g. by considering image data and determining the motion of the viewer and/or other entities (such as people, objects, etc. in the images) based on position, real and/or apparent motion within the images, etc. In such instances images might be obtained either with or without the viewer therein. For example, to determine motion of a viewer's eyes, hands, mouth, etc. from images it may be useful for those images to include the viewer's eyes, hands, mouth, etc. within the images, e.g. using an inward-facing camera. Alternatively, to determine whether a viewer's head or body is moving might be accomplished e.g. with an outward facing camera so as to sense motion in the changes in the images over time as the viewer's head, body, etc. moves relative to the external world. These are examples only, and other arrangements may be equally suitable.

Likewise, a range of biometric information may be gathered for use as and/or in support of contextual factors. Biometric information that may be suitable includes but is not limited to heart rate, heartbeat waveform, blood pressure, electrical and/or magnetic signals in the heart, brain, individual muscles, and/or body as a whole, skin conductivity, pH, blood chemistry, exhalation chemistry, skin coloration (whether in visible light or otherwise), respiration rate, respiration waveform, oxygen saturation, electrocardiography, magnetocardiography, electroencephalography, magnetoencephalography, and pupil dilation. Data may be gathered with and/or without direct contact with an individual, and is not limited either to human subjects or to the viewer(s) (if any) to whom the data is outputted.

As previously noted, some or all phenomena considered as contextual factors may be evaluated by evaluating higher and/or lower level phenomena, e.g. determining whether a viewer is walking based on head acceleration, electrical signals in muscles, brainwaves, real/apparent motion in images, etc.

Similarly, a range of deliberate human activities may be considered as and/or in support of contextual factors. For example, activities executed by the viewer may be utilized as contextual factors (though activities by others also may be used in addition/instead). Activities that may be considered as contextual factors include, but are not limited to, sleeping, sitting, standing, walking, running, conversing, exercising, operating a vehicle, and operating machinery.

Continuing with regard to steps 114 and 118 in FIG. 1, it is noted that contextual factors are not limited with regard to the use of tools, implements, hardware, etc. In particular, the use of an input device may be utilized as a contextual factor. As has been previously noted contextual factors are not limited with regard to the presence or absence of intent to generate and/or transmit information. Thus although intent is not required for contextual factors to be utilized as input, deliberate efforts to send input such as using an input device also is permissible. Deliberate inputs that may be suitable for use as contextual factors include but are not limited to key inputs, mouse inputs, stylus inputs, joystick inputs, a touch inputs, virtual interface inputs (i.e. utilizing an interface that exists as a virtual construct but not necessarily as a physical construct), and brainwave sensor inputs.

Furthermore, phenomena that mimic but do not necessarily constitute other phenomena may themselves be used as contextual factors. For example, substantially silent positions and/or motions of lips, jaw, tongue etc. including but not limited to positions and motions substantially corresponding to speech may be considered as contextual factors. Similarly, hand gestures having the appearance of using a device such as typing on a non-existent keyboard (and/or a non-physical virtual keyboard), swinging a non-existent hammer, etc. may be utilized as contextual factors. For example, an embodiment of a method might use motions indicative of typing as a contextual factor, and limit display of other information in the viewer's central vision while the viewer is executing such motions.

Moreover, as noted briefly earlier herein, contextual factors are not required to include input (conscious or otherwise) from a viewer or viewer at all. For example, an environmental condition might be used as a contextual factor.

More particularly, levels of illumination might be utilized as a contextual factor, for example to determine whether to invoke a transformation of the brightness of displayed data (though other transformations might also be equally suitable). Other environment conditions suitable for use as contextual factors include, but are not limited to, color of illumination (and/or the bit depth of the color), the overall brightness and/or color of an area or background, sound levels, temperature, humidity, wind direction and speed (if any), and the presence of smoke, rain or other environmental phenomena.

In addition, for at least certain embodiments various abstract notions such location may be considered as contextual factors. Such factors may be considered in absolute terms such as (for location) latitude, longitude, elevation, etc., or in relative terms such as distance and direction from some reference point. Likewise, location that is indexed but not necessarily dimensional may be utilized, e.g. a street address may be sufficient in at least some instances to specify a location even without dimensional position information. Absolute or relative time (e.g. time measured from some reference), including but not limited to clock time, date, day of the week, year, etc. may also be used as a contextual factor. Other abstract factors also may be equally suitable.

Still with regard to steps 114 and 118 in FIG. 1, objects and entities other than a viewer and/or viewer may be utilized as contextual factors. That is, the presence, absence, position, condition, number, behavior, etc. of objects, animals, plants, etc. may be so utilized. For example, the presence, absence, etc. of a wrench might be utilized as a contextual factor. At a relatively low level, such a contextual factor might simply relate to "is such a tool present", but higher level considerations may also utilize a similar contextual factor, e.g. "where is the viewer/device/etc.?" In such circumstances, a contextual factor regarding the presence of a wrench might be considered in determining location, insofar as a wrench may reasonably be considered to correlate with a hardware store, construction site, etc., but may be considered less likely to correlate with a library or movie theater.

Even where contextual factors are concerned with the presence, arrangement, etc. of objects, persons, etc., contextual factors are not limited to only one object, person, etc. To continue the example above, a high-level contextual factor of "is the viewer in a hardware store" might be considered in terms of a lower-level contextual factor of "are there multiple wrenches in proximity to one another". More generally, arrangements, behaviors, etc. of many individual features may be considered collectively as contextual factors. Such collective combinations of arrangements, behaviors, etc. might be referred to as a "surrounding". Numerous possible surroundings may be suitable for use as contextual factors. To continue the previous example, a hardware store might be considered to be represented by surroundings that might be visible to a person therein, such as tools, other products, shelves, etc., perhaps with the additional qualification that such features are disposed in some particular arrangement (or in one of a range of possible arrangements). Potentially, very high-level and/or broad contextual factors such as "where is the viewer" might take into consideration a wide range of features, such as local objects nearby, overall coloring, geometries such as building layout or skyline, and/or other information. Such arrangements might enable determinations regarding contextual factors such as "is the viewer at work?", "is the viewer at home?", "is the viewer in a vehicle?", etc.

Continuing with regard to steps 114 and 118 in FIG. 1, as previously noted viewer actions, behavior, etc. may be considered as contextual factors. Likewise, actions, behavior, etc. of other persons, animals, etc. For example, the presence of a vehicle with a flashing emergency light (police car, fire truck, etc.) might be used as a contextual factor to invoke limiting or otherwise altering the output of a head mounted display or other device, e.g. so as to alert a viewer to a potential hazard or emergency, to enable the viewer to more effectively respond thereto (for example by leaving the viewer's central vision unobstructed), etc. Similarly, "another person speaking" might be utilized as a contextual factor, along with a wide range of actions, behaviors, etc. by others.

It will be understood that for a given contextual factor, the nature of the contextual factor will determine at least in part the type of data that is necessary to determine the status thereof, and thus will determine at least in part the type of sensors (if any) to be used for determining that status. Thus, a contextual factor depending on light levels might utilize optical sensors, a contextual factor depending on motion might utilize an accelerometer, etc. However, status information might also be retrieved from a data store, generated by a processor (including but not limited to a processor executing one or more embodiments of a method), acquired from an input, etc.

In addition and as previously noted, in determining the status of contextual factors it may be useful for at least some embodiments to utilize various recognition capabilities. The nature of recognition capabilities (if any) will be determined at least in part by the contextual factors in question. For example if the presence of an object is utilized as a contextual factor, then enabling some form of object recognition capable of identifying the relevant object may be useful (although perhaps not required, if the object can also/instead be identified by color, outline, etc.). Recognition capabilities supportive of determining the status of contextual factors may include but are not limited to position recognition, motion recognition, acceleration recognition, face recognition, object recognition, text recognition, and environmental recognition.

In addition, determining the status of contextual factors may include other approaches, such as detection of features that do not necessarily correspond directly with objects. For example, detecting a transition between a sky and a cityscape might not necessarily entail recognition of any particular object or feature, but may still be useful in terms of determining location at a particular city, within a city, etc. Transitions that may be identified in determining the status of contextual factors include but are not limited to color transitions, brightness transitions, distance transitions, and focus transitions.

It is emphasized that these are example only, and that embodiments are not limited only to recognition and transition detection in determining the status of contextual factors. Other approaches may be equally suitable.

With regard now to step 124 in FIG. 1, further discussion is herein presented regarding transformations to output data.

As previously described with respect to step 124 in FIG. 1, a transformation is applied therein to the output data (if the determination of step 118 in FIG. 1 is positive). Embodiments are is not limited with regard to the transformation.

One possible type of transformation of the output data is to limit the region of a viewer's visual field wherein the output data may be displayed. Such an arrangement may or may not alter the "screen content" of the output data (for cases where the data is then outputted to a video screen), but does alter the output data at least insofar as the transformation affects where and/or how the output data is outputted. Thus, transformations to the output data are not limited only to "screen content" or the substance of what data is displayed, but also to what might be referred to as "meta data", i.e. information regarding where the output data is displayed, the resolution at which the output data is displayed, the coloring, frame rate, etc. For purposes herein, such "meta data" may be considered to be part of the output data, and therefor may be subject to transformation.

A very large range of potential transformations may be made for various embodiments. Several examples regarding transformations limiting where in the viewer's visual field the output data may be outputted are presented below, so as to illustrate some possible transformations. However, it is emphasized that embodiments are not limited only to the specific position-related transformations presented as examples herein, nor are embodiments limited only to transformations affecting the positioning of output data.

Figure 5:
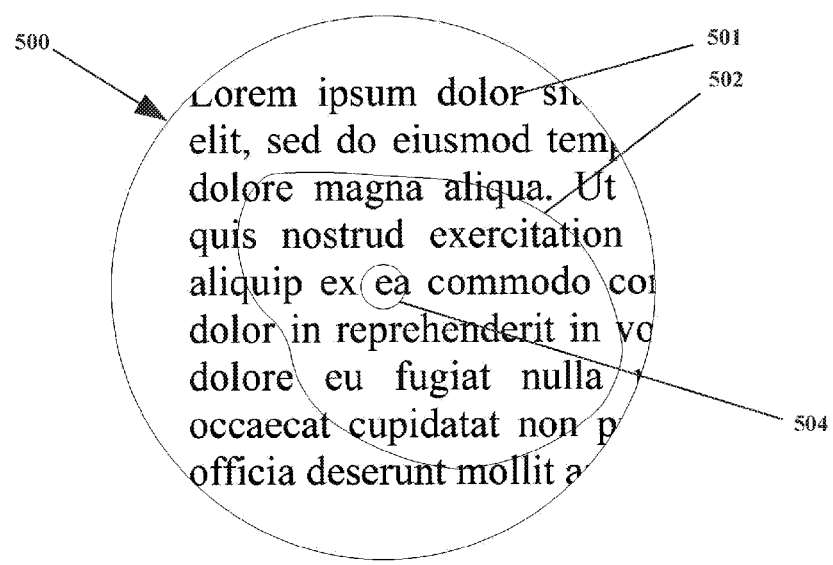
FIG. 5 shows an example arrangement of output data with respect to typical human visual fields.

Referring now to FIG. 5, therein a visual map 500 is presented. The visual map 500 is at least somewhat similar to the visual map shown in FIG. 2, however, for clarity and simplicity the angular hash marks and labels are omitted from FIG. 5. The outline identified as 502 in FIG. 5 corresponds approximately to a human's peripheral visual field. The outline identified as 504 in FIG. 5 corresponds approximately to a human's central visual field.

As may be seen, FIG. 5 also shows output data 501 in the form of text. While embodiments are not limited only to text as output data, text is used in FIG. 5 and in several subsequent figures herein as an example to represent output data 501. As shown in FIG. 5 the output data 501 is not restricted as to output location. Output data 501 exists within the central visual field 504, extends throughout the peripheral visual field 502, and even beyond the peripheral visual field 502. It is noted that output data 501 that is outputted beyond the peripheral visual field 502 may not be visible, since the peripheral field substantially represents the limits of the human visual field overall. However, embodiments are not necessarily restricted from outputting output data 501 outside the human visual field. For example, for output data 501 that is presented as substantially fixed relative to a point in space, a viewer might be able to pan and/or tilt his or her eyes and/or head to view a larger total area than is encompassed by the human visual field at any given moment. More with regard to such a pan/tilt arrangement is described later herein, but embodiments are not limited only to such a pan/tilt arrangement insofar as outputting output data 501 outside of a viewer's visual field.

With regard to FIG. 6 through FIG. 17, therein output data is shown outputted as limited to and/or excluded from various regions, such as regions of a viewer's visual field, as might be executed through a transformation as described herein. Such output arrangements may be useful for various purposes. For example, since the human visual field has high resolution in the central visual field thereof, limiting to the central visual field the output of information that requires or benefits from discrimination of fine detail, such as text, may be advantageous under at least some circumstances. Conversely, if the viewer is known or considered likely to be executing some activity that would require or at least benefit from unobstructed central vision, such as walking or running while seeing clearly so as to avoid obstacles and/or hazards, excluding the output of output data to the central visual field may likewise be advantageous. As another example, since the human peripheral visual field has high sensitivity to light and motion, limiting to the peripheral visual field the output of information that requires or benefits from high sensitivity to light or motion, such as directional indicators or high-priority notices, may also be advantageous under at least some circumstances.

For at least some embodiments, if a transformation is employed so as to limit output of information to a particular region of a viewer's visual field, and/or to otherwise produce an effect that is related to the viewer's visual field and/or some specific region thereof, it may be useful to utilize eye tracking so as to reliably determine where a viewer is looking, which is to say, how the viewer's visual fields are aligned. More specifically, when outputting for example to one or more displays disposed in front of a viewer's eye or eyes, eye tracking may be useful in determining what portion of the screen(s) represent the peripheral visual field, central visual field, etc. of the viewer, so as to effectively limit output thereto, exclude output therefrom, etc. In such an arrangement, the portion of a physical screen that represents, for example, the viewer's central visual field may change over time depending upon where the viewer looks, so that eye tracking (or some other approach for determining where the viewer is looking) may help define what portion of a physical display or other device corresponds substantially with the viewer's central visual field. However, such arrangements are examples only, and neither eye tracking nor other such arrangements will necessarily be utilized for all embodiments.

Figure 6:
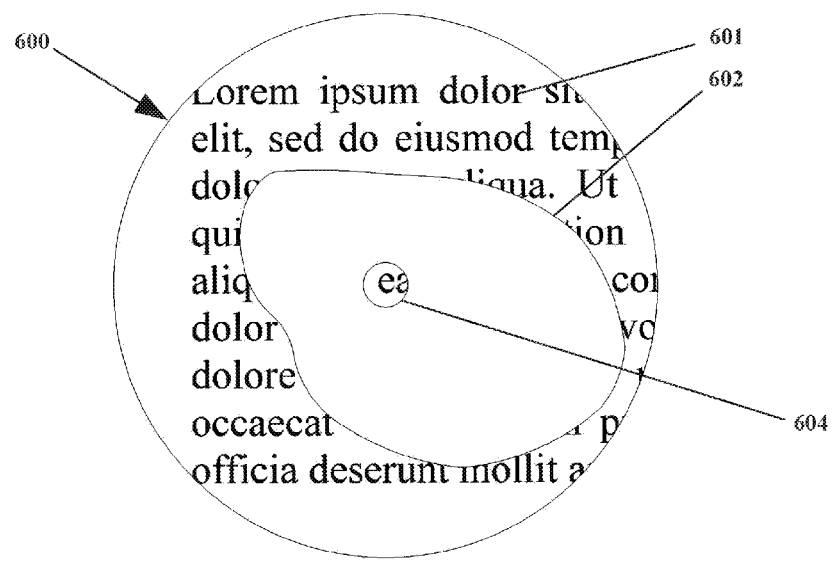
FIG. 6 shows an example arrangement of output data excluding the peripheral visual field.

Turning specifically to FIG. 6, another visual map 600 is presented therein. The visual map 600 is at least somewhat similar to the visual map shown in FIG. 5, with output data 601, an outline 602 that corresponds approximately to a human's peripheral visual field, and an outline 604 in that corresponds approximately to a human's central visual field.

However, as may be seen in FIG. 6, the output data 601 does not appear within the peripheral visual field 602. The arrangement in FIG. 6 may be a result, for example, of a transformation applied to output data 601 so as to define an output region and limiting the output of output data 601 thereto, with the output region substantially excluding a viewer's peripheral visual field 602.

Figure 7:
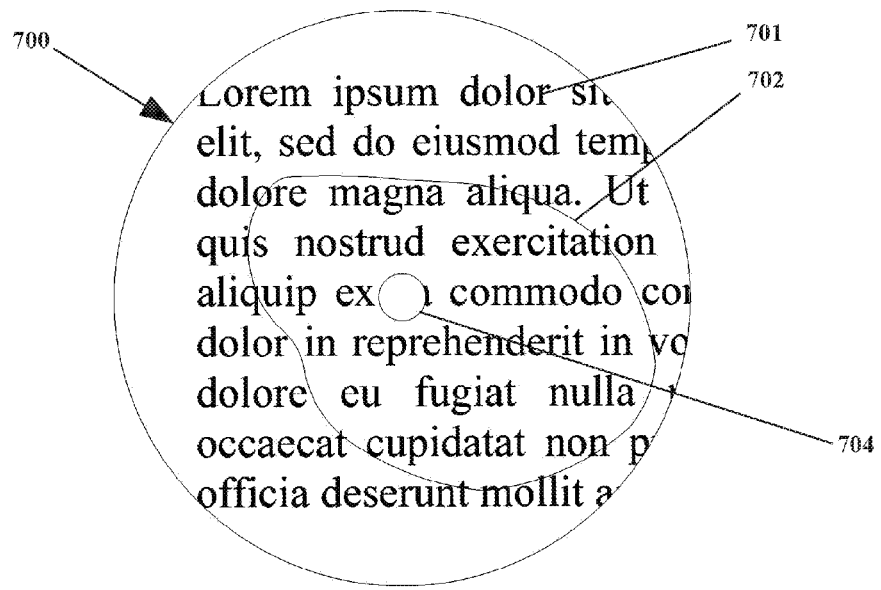
FIG. 7 shows an example arrangement of output data excluding the central visual field.

Now with respect to FIG. 7, another visual map 700 is presented therein. The visual map 700 is again at least somewhat similar to the visual map shown in FIG. 5, with output data 701, an outline 702 that corresponds approximately to a human's peripheral visual field, and an outline 704 in that corresponds approximately to a human's central visual field.

However, as may be seen in FIG. 7, the output data 701 does not appear within the central field of view 704. The arrangement in FIG. 7 may be a result, for example, of a transformation applied to output data 701 so as to define an output region and limiting the output of output data 701 thereto, with the output region substantially excluding a viewer's central visual field 704.

As has been described, embodiments are not limited only to transformations that define output regions, and/or limit output thereto and/or exclude output therefrom, or otherwise affect the location of output data. With regard to FIG. 7, it is noted also that embodiments, even when so affecting the location of output data, are not limited to regions defining entire visual fields, or individual visual fields. For example, output to the central visual field 702 is excluded in FIG. 7, although as previously noted the human central visual field may itself be subdivided into the macular, foveal, and fovealar visual fields. Thus in some sense the arrangement of FIG. 7 may be understood to show exclusion of output from three distinct visual fields. Other arrangements, including but not limited to defining output location in terms of portions of one or more visual fields and/or defining output location in terms unrelated to human visual fields, may be equally suitable.

Figure 8:
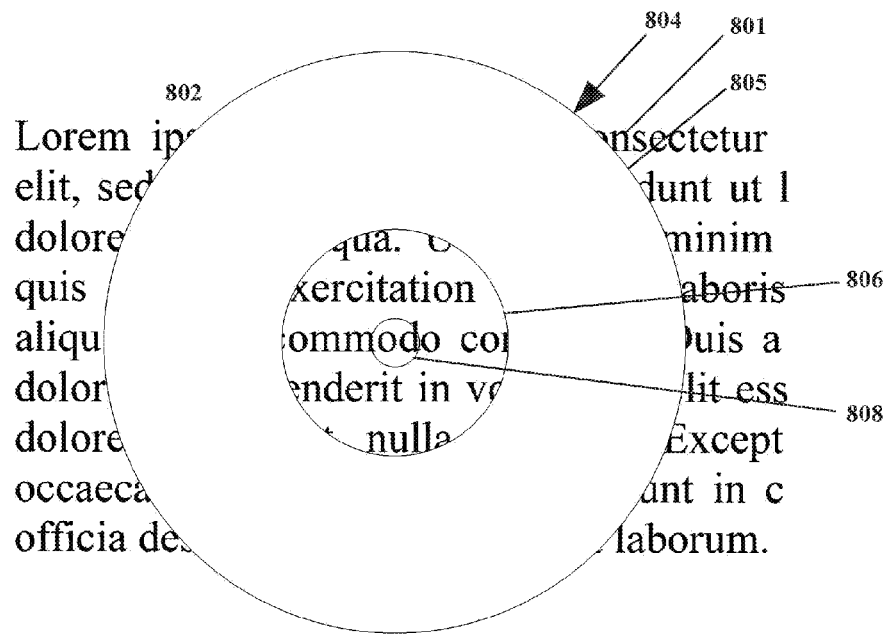
FIG. 8 shows an example arrangement of output data excluding the macular visual field.

Referring now to FIG. 8, a portion of a human visual field is shown therein. The arrangement in FIG. 8 is at least somewhat similar to the arrangement shown in FIG. 3, however, for clarity and simplicity the angular hash marks and labels are omitted from FIG. 8. The outline identified as 804 in FIG. 8 corresponds approximately to a human's central visual field, while the region outside the central visual field 804 corresponds to a portion of a human's peripheral visual field 802. The outline identified as 805 in FIG. 8 corresponds approximately to a human's macular visual field, the outline identified as 806 in FIG. 8 correspond approximately to a human's foveal visual field, and the outline identified as 808 in FIG. 8 corresponds approximately to a human's foveolar visual field. FIG. 8 also shows output data 801 in the form of text.

As may be seen in FIG. 8, the output data 801 does not appear within the macular visual field 805. The arrangement in FIG. 8 may be a result, for example, of a transformation applied to output data 801 so as to define an output region and limiting the output of output data 801 thereto, with the output region substantially excluding a viewer's macular visual field 805.

Figure 9:
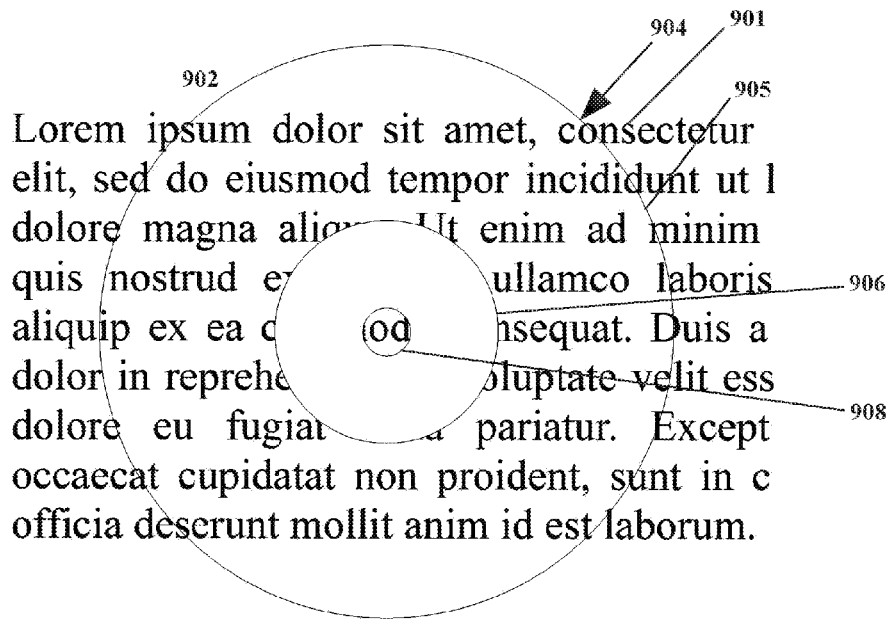
FIG. 9 shows an example arrangement of output data excluding the foveal visual field.

Moving to FIG. 9, another portion of a human visual field is shown therein. FIG. 9 is again at least somewhat similar to FIG. 3, showing a portion of the peripheral visual field 902, the central visual field 904, the macular visual field 905, the foveal visual field 906, and the foveolar visual field 908, along with output data 901.

However, as may be seen in FIG. 9, the output data 901 does not appear within the foveal visual field 906. The arrangement in FIG. 9 may be a result, for example, of a transformation applied to output data 901 so as to define an output region and limiting the output of output data 901 thereto, with the output region substantially excluding a viewer's foveal visual field 906.

Figure 10:
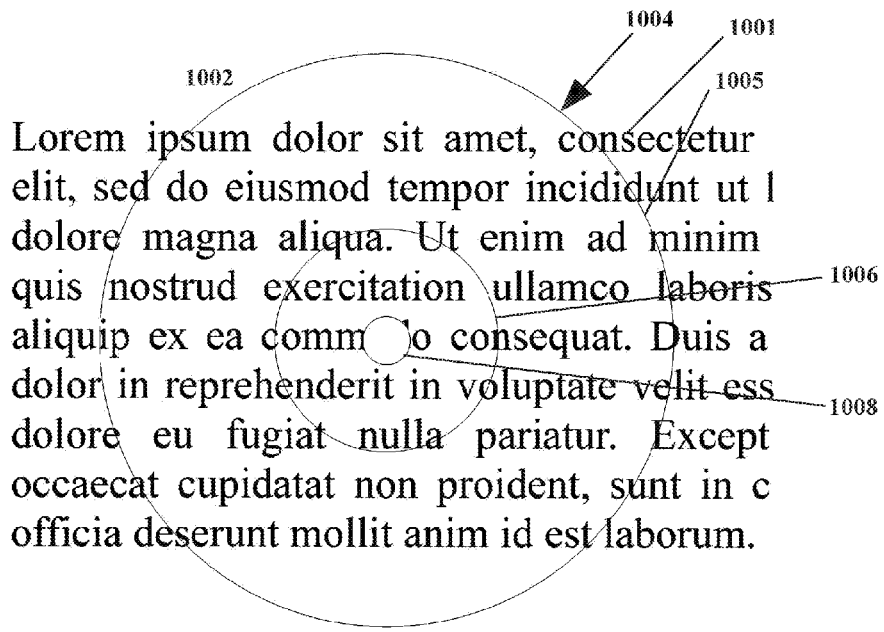
FIG. 10 shows an example arrangement of output data excluding the foveolar visual field.

Turning to FIG. 10, another portion of a human visual field is shown therein. FIG. 10 is again at least somewhat similar to FIG. 3, showing a portion of the peripheral visual field 1002, the central visual field 1004, the macular visual field 1005, the foveal visual field 1006, and the foveolar visual field 1008, along with output data 1001.

However, as may be seen in FIG. 10, the output data 1001 does not appear within the foveolar visual field 1008. The arrangement in FIG. 10 may be a result, for example, of a transformation applied to output data 1001 so as to define an output region and limiting the output of output data 1001 thereto, with the output region substantially excluding a viewer's foveolar visual field 1008.

Figure 11:
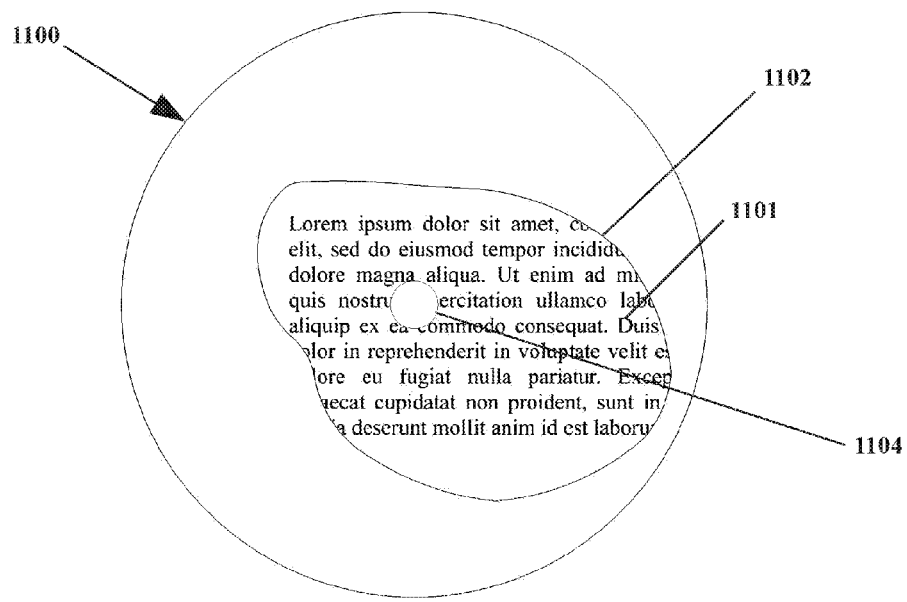
FIG. 11 shows an example arrangement of output data limited to the peripheral visual field.

Now with regard to FIG. 11, another visual map 1100 is presented therein. The visual map 1100 is at least somewhat similar to the visual map shown in FIG. 5, with output data 1101, an outline 1102 that corresponds approximately to a human's peripheral visual field, and an outline 1104 in that corresponds approximately to a human's central visual field.

However, as may be seen in FIG. 11, the output data 1101 appears only within the peripheral visual field 1102. The arrangement in FIG. 11 may be a result, for example, of a transformation applied to output data 1101 so as to define an output region and limiting the output of output data 1101 thereto, with the output region substantially corresponding to a viewer's peripheral visual field 1102.

Figure 12:
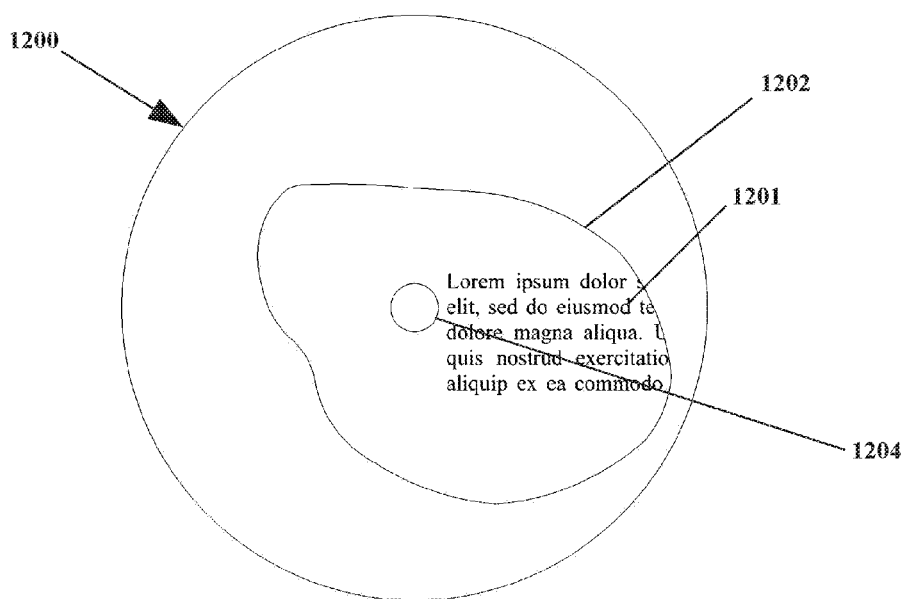
FIG. 12 shows another example arrangement of output data limited to the peripheral visual field.

FIG. 12 also shows a visual map 1200 therein. The visual map 1200 is at least somewhat similar to the visual map shown in FIG. 11, with output data 1201, an outline 1202 that corresponds approximately to a human's peripheral visual field, and an outline 1204 in that corresponds approximately to a human's central visual field.

As may be seen in FIG. 12, the output data 1201 appears only within the peripheral visual field 1202. The arrangement in FIG. 12 may be a result, for example, of a transformation applied to output data 1201 so as to define an output region and limiting the output of output data 1201 thereto, with the output region substantially corresponding to a viewer's peripheral visual field 1202.

However, while the arrangement of the output data 1201 in FIG. 12 is at least somewhat descriptively similar to the arrangement in FIG. 11—in both instances output data appears only within the peripheral visual field—a comparison of FIG. 11 and FIG. 12 reveals differences in the arrangement of the output data therein. Namely, in FIG. 11 that portion of the output data 1101 that might be expected to align with the central visual field 1104 is not displayed. By contrast, in FIG. 12 the output data 1201 is positioned and configured differently, such that even though no data is displayed within the central visual field 1204 no data is "masked" by the area of non-display corresponding to the central visual field 1204.

While in some cases in FIG. 6 through FIG. 17 the display or lack of display of output data in various areas is shown in simple form, with areas simply blanked out, this is an example only and is presented for purposes of simplicity. As may be seen from FIG. 12, limiting output data 1201 to certain areas and/or excluding output data 1201 from certain regions does not necessarily imply truncating, losing, or not displaying some portion of the output data. Although so limiting output data is not prohibited, neither is so limiting output data required. Likewise, other transformations may, but are not required to, transform output data in a manner as to obstruct, limit, truncate, etc. the output data.

Figure 13:
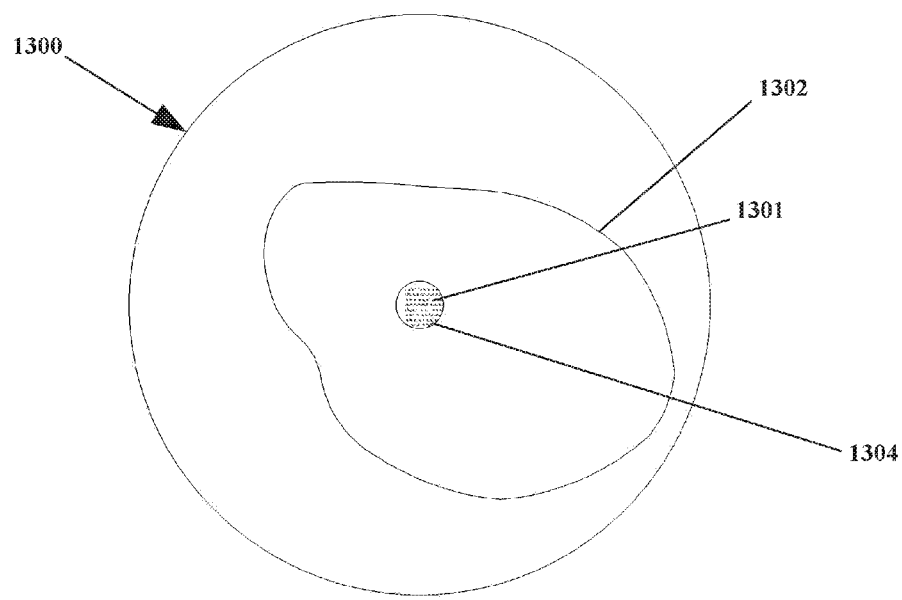
FIG. 13 shows an example arrangement of output data limited to the central visual field.

Moving on to FIG. 13, another visual map 1300 is presented therein. The visual map 1300 is at least somewhat similar to the visual map shown in FIG. 5, with output data 1301, an outline 1302 that corresponds approximately to a human's peripheral visual field, and an outline 1304 in that corresponds approximately to a human's central visual field.

As may be seen in FIG. 13 the output data 1301 appears only within the central visual field 1304. The arrangement in FIG. 13 may be a result, for example, of a transformation applied to output data 1301 so as to define an output region and limiting the output of output data 1301 thereto, with the output region substantially corresponding to a viewer's central visual field 1304.

Figure 14:
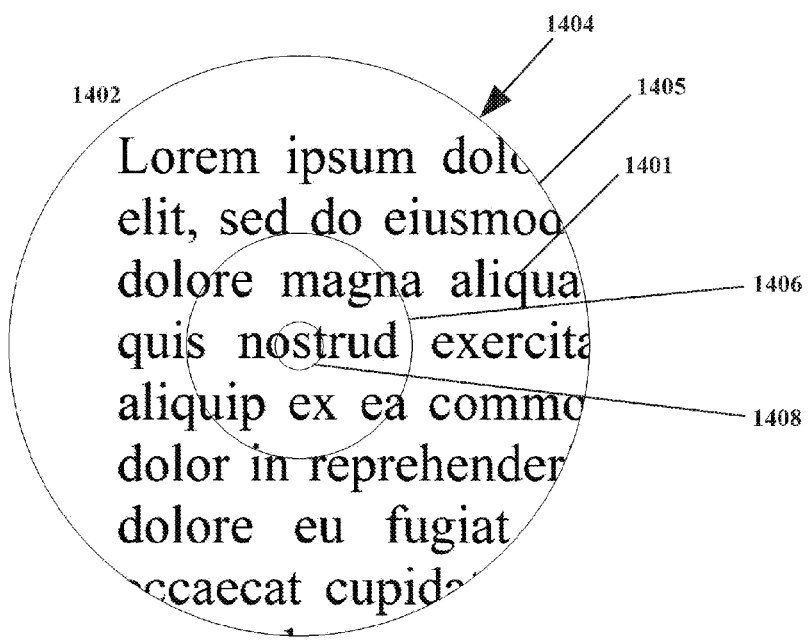
FIG. 14 shows another example arrangement of output data limited to the central visual field.

Turning to FIG. 14, another portion of a human visual field is shown therein. FIG. 14 is at least somewhat similar to FIG. 3, showing a portion of the peripheral visual field 1402, the central visual field 1404, the macular visual field 1405, the foveal visual field 1406, and the foveolar visual field 1408, along with output data 1401.

FIG. 14 also shows an arrangement similar to FIG. 13, in that in FIG. 14 the output data 1401 also appears only within the central visual field 1404 (collectively the macular visual field 1405, the foveal visual field 1406, and the foveolar visual field 1408). As with FIG. 13, the arrangement in FIG. 14 may be a result, for example, of a transformation applied to output data 1401 so as to define an output region and limiting the output of output data 1401 thereto, with the output region substantially corresponding to a viewer's central visual field 1404.

Figure 15:
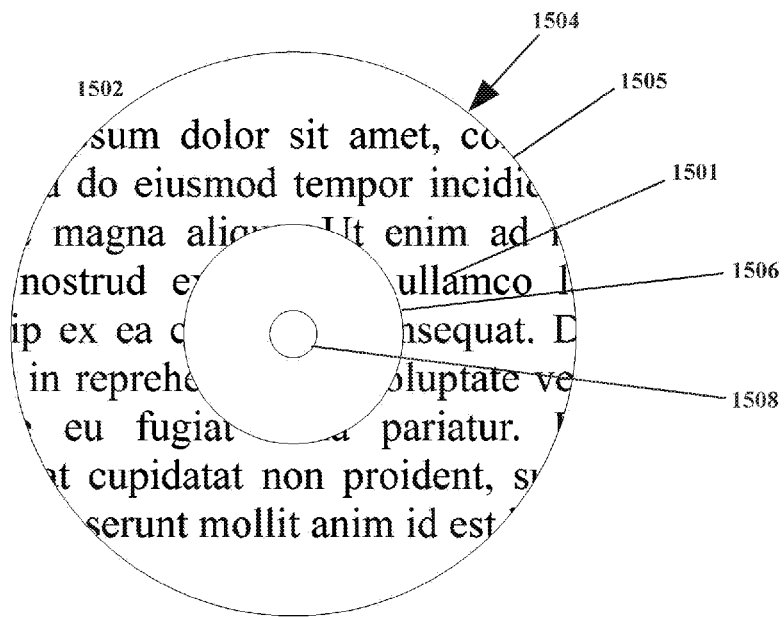
FIG. 15 shows an example arrangement of output data limited to the macular visual field.

Now with reference to FIG. 15, another portion of a human visual field is shown therein. FIG. 15 is at least somewhat similar to FIG. 3, showing a portion of the peripheral visual field 1502, the central visual field 1504, the macular visual field 1505, the foveal visual field 1506, and the foveolar visual field 1508, along with output data 1501.

As may be seen in FIG. 15 the output data 1501 appears only within the macular visual field 1505. The arrangement in FIG. 15 may be a result, for example, of a transformation applied to output data 1501 so as to define an output region and limiting the output of output data 1501 thereto, with the output region substantially corresponding to a viewer's macular visual field 1505.

Figure 16:
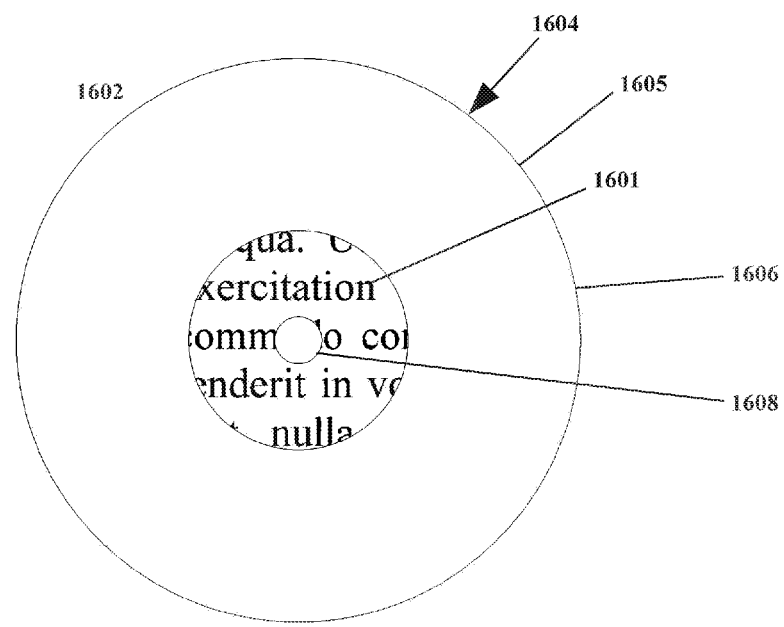
FIG. 16 shows an example arrangement of output data limited to the foveal visual field.

With regard to FIG. 16, another portion of a human visual field is shown therein. FIG. 16 is at least somewhat similar to FIG. 3, showing a portion of the peripheral visual field 1602, the central visual field 1604, the macular visual field 1605, the foveal visual field 1606, and the foveolar visual field 1608, along with output data 1601.

As may be seen in FIG. 16 the output data 1601 appears only within the foveal visual field 1606. The arrangement in FIG. 16 may be a result, for example, of a transformation applied to output data 1601 so as to define an output region and limiting the output of output data 1601 thereto, with the output region substantially corresponding to a viewer's foveal visual field 1606.

Figure 17:
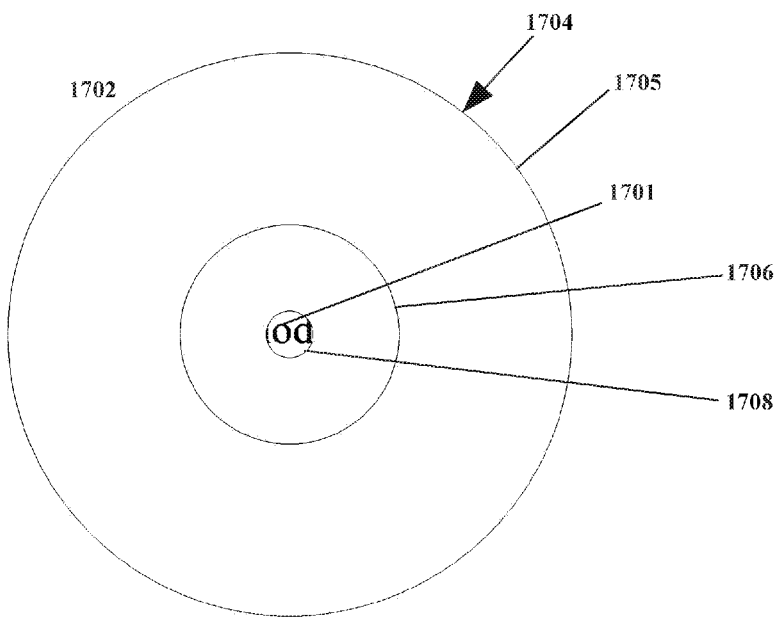
FIG. 17 shows an example arrangement of output data limited to the foveolar visual field.

Now with reference to FIG. 17, another portion of a human visual field is shown therein. FIG. 17 is at least somewhat similar to FIG. 3, showing a portion of the peripheral visual field 1702, the central visual field 1704, the macular visual field 1705, the foveal visual field 1706, and the foveolar visual field 1708, along with output data 1701.

As may be seen in FIG. 17 the output data 1701 appears only within the foveolar visual field 1708. The arrangement in FIG. 17 may be a result, for example, of a transformation applied to output data 1701 so as to define an output region and limiting the output of output data 1701 thereto, with the output region substantially corresponding to a viewer's foveolar visual field 1708.

With respect to FIG. 6 through FIG. 17, as has been stated previously these illustrations are examples of transformations that may be invoked if the status of a contextual factor is determined to meet a standard therefor. Spatial and/or position transformations including but not limited to those illustrated in FIG. 6 through FIG. 17 may be useful for at least certain embodiments, and illustrations thereof are presented herein as examples at least in part of that purpose.

However, embodiments are not limited only to the spatial/positional transformations shown as examples in FIG. 6 through FIG. 17. For example, a transformation that disposes readable text substantially below the horizon in a viewer's field of view (e.g. by defining a first output region that is below that horizon) may be suitable, perhaps in response to a contextual factor relating to whether the viewer's head position corresponds to a near-distance reading position. Other spatial/positional transformations may also be equally suitable. Moreover, embodiments also are not limited only to spatial and/or positional transformations in general.

Substantially any feature of the output data, and/or of the display or other device or method for outputting the output data, may be transformed as part of a transformation. The transformation may include at least a partial determination and/or re-determination of at least one property of the output data.

As previously noted, transformations may include definition of one or more output regions, and limiting output thereto and/or excluding output therefrom. Such output regions may, but are not required to, correspond with one or more anatomical and/or functional regions of a viewer's visual field.

Where multiple transformations are utilized, transformations may be identical, similar, or entirely distinct from one another. As an example of multiple transformations, a first transformation might define a first output region and limit output of the output data thereto or exclude output therefrom, while a second transformation might define a second output region and limit output of the output data thereto or exclude output therefrom. As a more particular example, a first transformation might define a first output region that corresponds to the viewer's central visual field (thus excluding the peripheral visual field) and limiting output data thereto, while the second transformation might define a second output region that corresponds to the viewer's peripheral visual field (thus excluding the central visual field) and limiting output data thereto. (More description regarding invoking multiple transformations is provided subsequently herein.)

A transformation may include definition of one or more subsets of the output data, with output being limited only to the subset or subsets. That is, the output data might be truncated or otherwise reduced as part of the transformation.

Transformations may include multiple changes to multiple features of the output data. To continue the example of generating subsets of output data, a transformation might define first and second subsets of output data, and may also generate first and second output regions, limiting output of the first subset to the first output region and the second subset to the second output region.

Transformations may also include, but are not limited to, at least partial determination (and/or re-determination) of the presence of output data, the location of output data, the size of output data, an abridgement (or lack of same) of output data, the dimensionality of output data (e.g. changing between two dimensional and three dimensional, etc.), the resolution of output data, the color of output data (including but not limited to bit depth and other color properties), the brightness of output data, the contrast of output data, the transparency and/or opacity of output data, the motion of output data, the animation and/or animation properties of output data (if any), and the frame rate of output data. The above are examples only, and other properties may be equally suitable for determination and/or re-determination through transformations.

As has also been noted, embodiments are not limited with regard to the type, form, and/or quantity of output data that is generated, transformed, and/or outputted. As examples, output data (whether before or after transformation) may include but is not limited to text, graphics, images, video, image augmentations, and sound.

Where output data is generated partially or entirely from input data, output data (whether before or after transformation) may include all of the input data, some of the input data, or none of the input data. Moreover, the output data may be an empty set. That is, whether before or after transformation, no output data is required to be either generated or transformed or outputted.

Further with regard to outputting data, it is noted that with or without (and before or after) transformation, output data may vary considerably. For example, as previously noted output data may be generated and/or outputted in an arrangement that exceeds the visual field of the viewer at any given time. Panning, tilting, angling, etc. of the head by the viewer may then reveal more and/or different portions of the output data. Such an arrangement is illustrated in FIG. 18 through FIG. 21.

Figure 18:
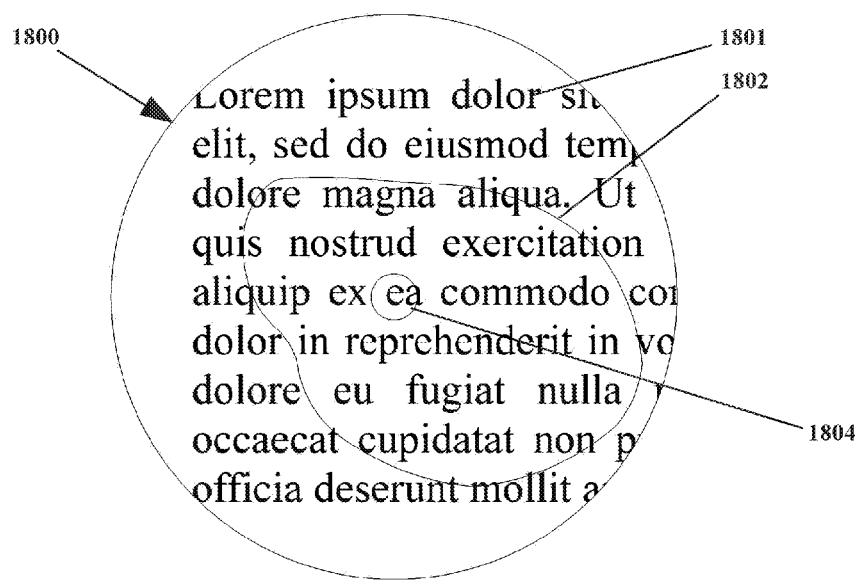
FIG. 18 shows an example arrangement of output data with a viewer's visual field in a neutral position.

With regard to FIG. 18, therein a visual map 1800 is presented. The outline identified as 1804 in FIG. 5 corresponds approximately to a human's peripheral visual field. The outline identified as 1802 in FIG. 5 corresponds approximately to a human's central visual field. Output data 1801 in the form of text exists within the visual map.

As may be seen, the central visual field 1804 and peripheral visual field 1802 combined, representing substantially a human eye's entire visual field, encompass only a portion of the output data 1801.

Figure 19:
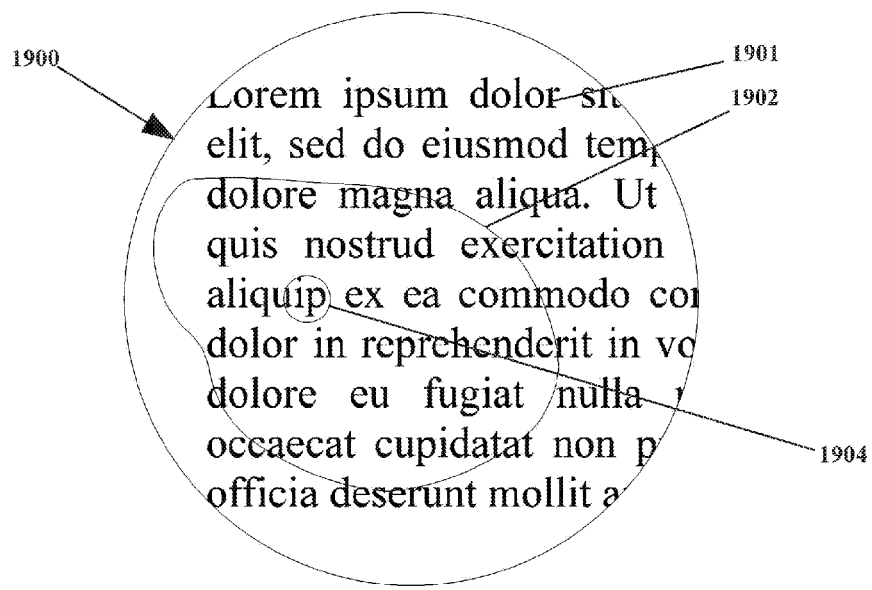
FIG. 19 shows an example arrangement of output data with a viewer's visual field panned left.

Moving now to FIG. 19, another visual map 1900 is presented, again with a central visual field 1904, a peripheral visual field 1902, and output data 1901. However, as may be seen from a comparison with FIG. 18, in FIG. 19 the central visual field 1904 and peripheral visual field 1902 are shifted to the left (panned), resulting in a different portion of the input data 1901 being within the central visual field 1904 and peripheral visual field 1902. This may be a result of the output data 1901 being outputted so as to be substantially fixed relative to some point, with the viewer then panning his or her sight to the left. Alternately, this may be considered to represent a viewer panning to the left, with the output data 1901 then being shifted correspondingly in an opposite direction (right), i.e. as displayed on a head mounted display screen, so as to present the appearance of the output data being substantially fixed.

In such an arrangement, the combination of the central visual field 1904 and the peripheral visual field 1902 may be considered collectively as a moveable "window" onto a larger arrangement of output data 1901. In practice, only that portion of the output data 1901 that is within the window (in the case of FIG. 19 the combined central visual field 1904 and the peripheral visual field 1902) may be outputted at any given time, although outputting more than such a window could accommodate also is not prohibited.

Figure 20:
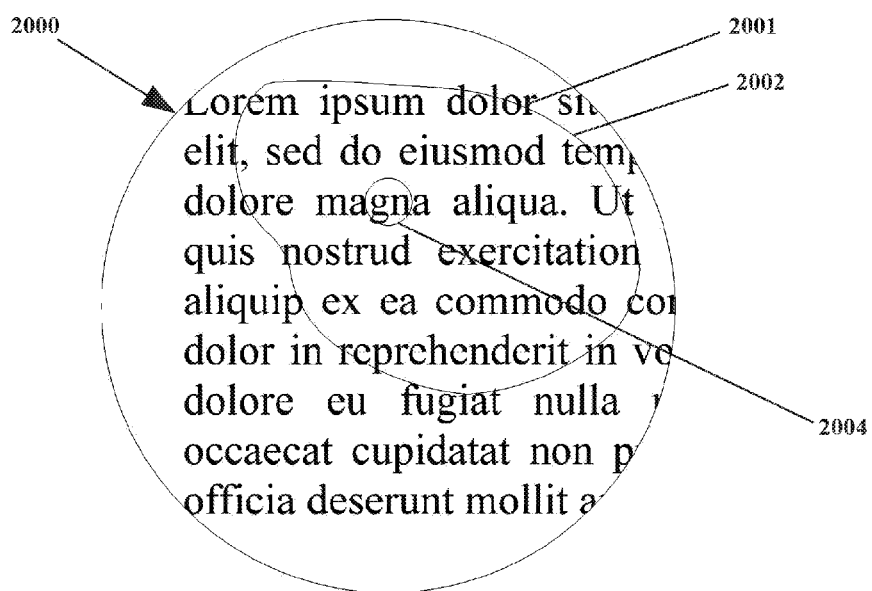
FIG. 20 shows an example arrangement of output data with a viewer's visual field tilted up.

Similarly in FIG. 20, another visual map 2000 is presented, again with a central visual field 2004, a peripheral visual field 2002, and output data 2001. However, as may be seen from a comparison with FIG. 18, in FIG. 20 the central visual field 2002 and peripheral visual field 2004 are shifted to the left (tilted, or elevated), resulting in yet a different portion of the input data 2001 being within the central visual field 2004 and peripheral visual field 2002. This may be a result of the output data 2001 being outputted so as to be substantially fixed relative to some point, with the viewer then tilting his or her sight upward. Alternately, this may be considered to represent a viewer tilting upward, with the output data 2001 then being shifted correspondingly in an opposite direction (downward) so as to present the appearance of the output data being substantially fixed.

Figure 21:
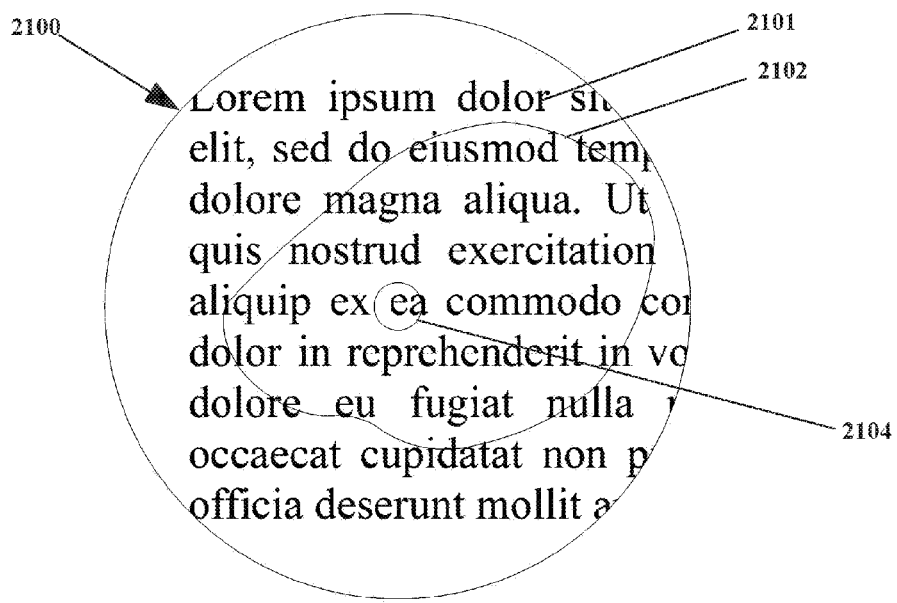
FIG. 21 shows an example arrangement of output data with a viewer's visual field inclined counterclockwise.

Likewise with reference to FIG. 21, another visual map 2100 is presented, again with a central visual field 2104, a peripheral visual field 2102, and output data 2101. However, as may be seen from a comparison with FIG. 18, in FIG. 21 the central visual field 2102 and peripheral visual field 2104 are shifted substantially about the central vision (inclined counterclockwise), resulting in still a different portion of the input data 2101 being within the central visual field 2104 and peripheral visual field 2102. This may be a result of the output data 2101 being outputted so as to be substantially fixed relative to some point, with the viewer then inclining his or her sight counterclockwise. Alternately, this may be considered to represent a viewer inclining counterclockwise, with the output data 2101 then being shifted correspondingly in an opposite direction (clockwise) so as to present the appearance of the output data being substantially fixed.

Although FIG. 18 through FIG. 21 are presented with moveable "windows" corresponding substantially with human central and peripheral visual fields, this is an example only. Other window arrangements may be equally suitable.

Other output features and arrangements may likewise be useful for at least certain applications. For example, for stereo output data outputted using a stereo display, it may be advantageous for at least some embodiments to define a natural convergence for the stereo output data that substantially corresponds to a natural reading position, and outputting the output data therewith.

Figure 22:
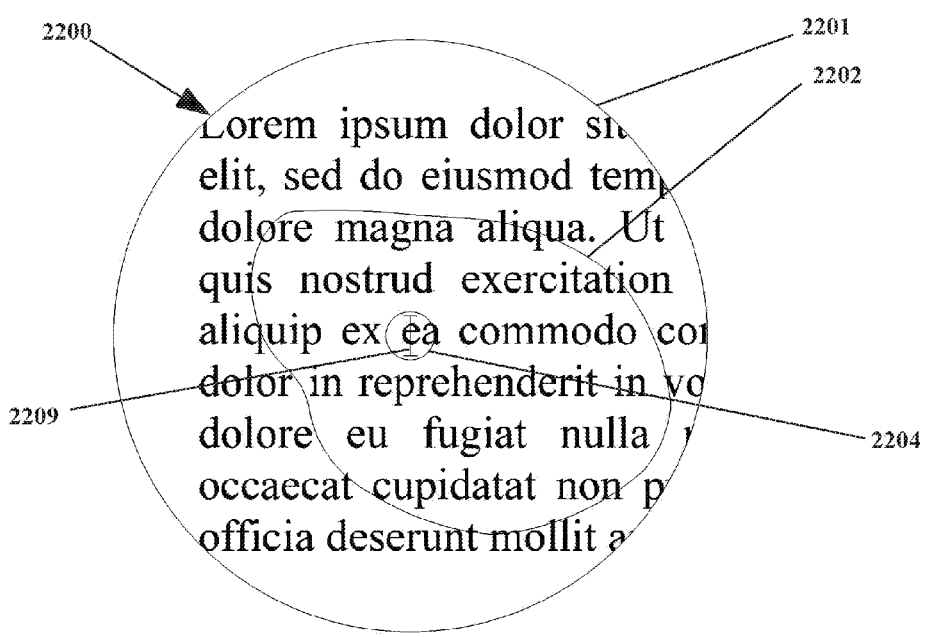
FIG. 22 shows an example arrangement of output data including a cursor as a target.

Yet another feature that may be utilized with and/or as part of the output data is the presence of one or more markers. For example, a marker such as a cursor might be outputted so as to be substantially fixed relative to the field of view of the viewer. Such an arrangement is illustrated in FIG. 22. Therein a visual map 2200 is presented, with a central visual field 2104, a peripheral visual field 2202, output data 2201 in the form of text, and a marker 2209 in the form of a cursor disposed within the central visual field 2204.

With regard to FIG. 23 through FIG. 29, embodiments may encompasses a number of variations to the basic method as illustrated for example in FIG. 1 and FIG. 4. FIG. 23 through FIG. 29 show additional example arrangements of methods, although it is emphasized that the arrangements shown therein are examples and that embodiments are not limited thereto.

Figure 23:
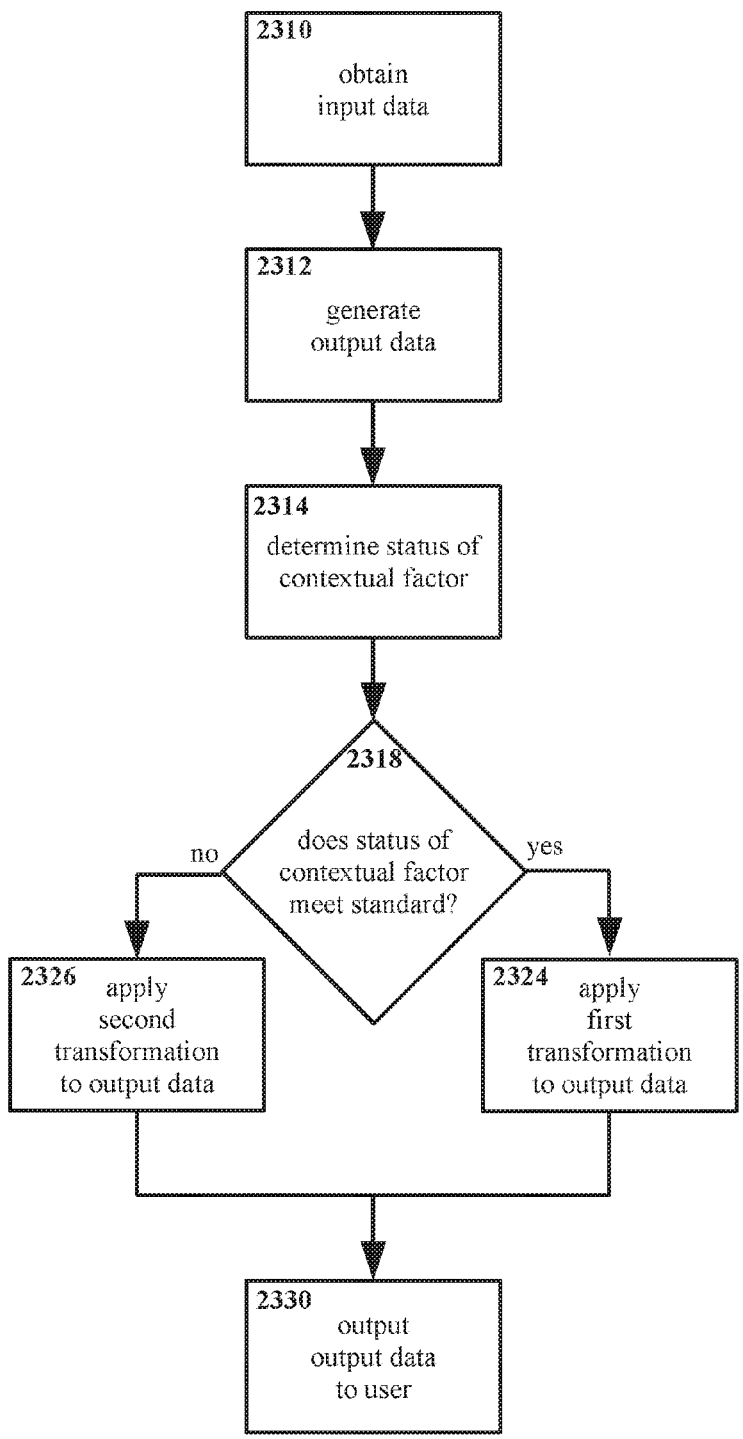
FIG. 23 shows an example embodiment of a method for selectively outputting data to a viewer, having a first transformation with a positive status and a second transformation with a negative status.

With reference now specifically to FIG. 23, as has been noted previously embodiments may utilize multiple transformations, and/or may invoke different transformations under different circumstances. One such example arrangement is shown in FIG. 23, wherein a first transformation is applied if the status of a contextual factor meets a standard therefor, while a second transformation is applied if the status does not meet the standard.

In the method as shown in FIG. 23, input data is obtained 2310. Output data is generated 2312. A status of a contextual factor is determined 2314.

A determination is made 2318 as to whether the status of the contextual factor (as determined in step 2314) meets a standard for that contextual factor. If the determination 2318 is positive—if the contextual factor meets the standard—then a first transformation is applied 2324 to the output data. However, if the determination is negative—if the contextual factor does not meet the standard—then a second transformation is applied 2326 to the output data.

The output data is then outputted 2330.

Figure 24:
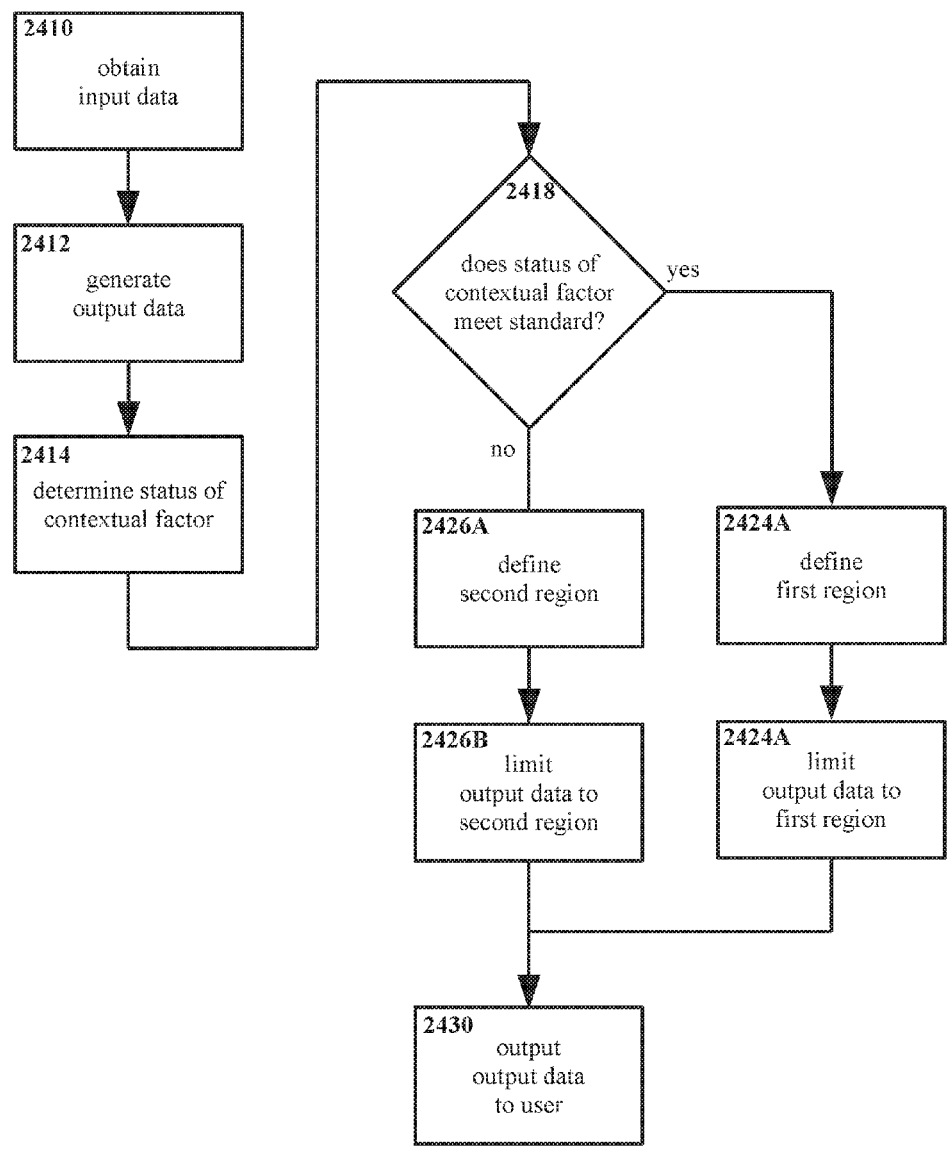
FIG. 24 shows an example embodiment of a method for selectively outputting data to a viewer, transforming output to a first region with a positive status and a second region with a negative status.

With reference now to FIG. 24, therein another example arrangement is shown wherein a first transformation is applied if the status of a contextual factor meets a standard therefor, while a second transformation is applied if the status does not meet the standard.

In the method as shown in FIG. 24, input data is obtained 2410, output data is generated 2412, and a status of a contextual factor is determined 2414.

A determination is made 2418 as to whether the status of the contextual factor (as determined in step 2414) meets a standard for that contextual factor. If the determination 2418 is positive, then a first region is defined 2424A, and the output of output data is limited 2424B to that first region. Collectively, steps 2424A and 2424B may be considered to be a first transformation. On the other hand, if the determination is negative, then a second region is defined 2426A and the output of output data is limited 2426B to that second region.

The output data is then outputted 2430. From the standpoint of a viewer, if the status of the contextual factor meets the standard (whether or not the viewer is aware of the contextual factor, the status thereof, and/or the standard), then the output data appears in one region, while if the status of the contextual factor does not meet the standard, the output data appears in another region. For example, data might be outputted to the viewer's central vision (e.g. on a head mounted display) if the standard is met, and outputted to the viewer's peripheral vision if the standard is not met.

Figure 25:
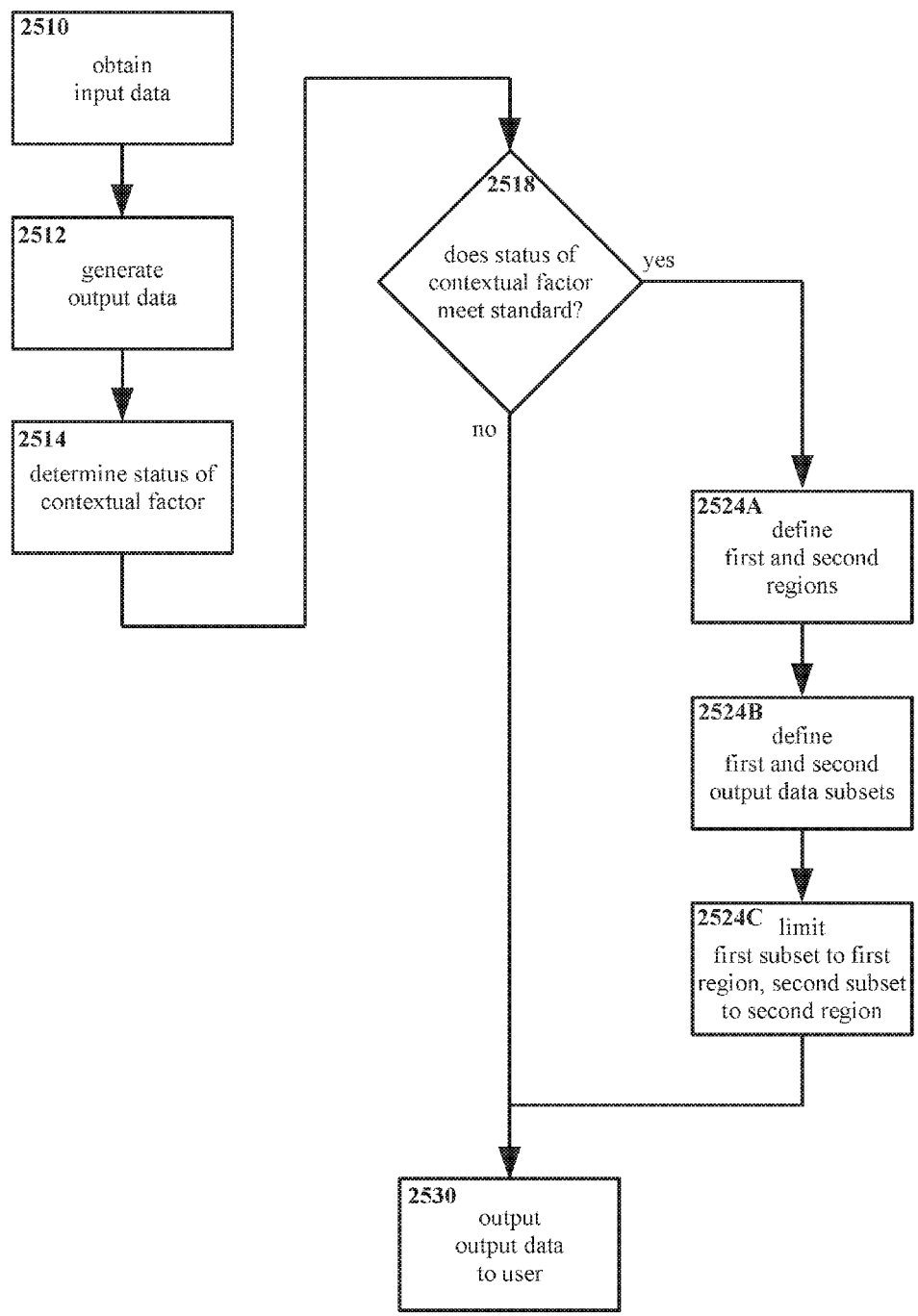
FIG. 25 an example embodiment of a method for selectively outputting data to a viewer, transforming first and second subsets of output to first and second regions with a positive status.

Turning to FIG. 25, therein an example arrangement is shown wherein a first transformation splits data output into two distinct regions. In the method as shown in FIG. 25, input data is obtained 2510, output data is generated 2512, and a status of a contextual factor is determined 2514.

A determination is made 2518 as to whether the status of the contextual factor (as determined in step 2514) meets a standard for that contextual factor. If the determination 2518 is negative, the method proceeds to output the output data 2530.

However, if the determination is positive, several steps are executed. First and second regions are defined 2524A. First and second output data subsets also are defined 2524B. Output of both subsets is then limited 2524C, the first subset being limited to output in the first region, and the second subset being limited to output in the second region. The output data (rather, the first and second subsets thereof) is then outputted 2530.

As previously noted, subsets of the output data may include some or all of the full output data, and may or may not include additional data as well. Thus not all of the output data is necessarily outputted in either or both subsets; some portion of the output data may not be outputted at all in view of the transformation. In addition, since it is possible that the first and second subset may (depending on the transformation) include some of the same output data, some portion of the output data may be outputted twice (in both the first and the second subsets).

While the arrangement in FIG. 25 is somewhat similar to that in FIG. 24 in that both result in output data may appear in either of two defined regions, in the arrangement of FIG. 24 the output data either appears in a first region or a second region, while in the arrangement of FIG. 25 the output data is split into two subsets (assuming the status of the contextual factor is determined to meet the standard therefor, as shown) with one subset being outputted to a first region and another subset being outputted to a second region.

Figure 26:
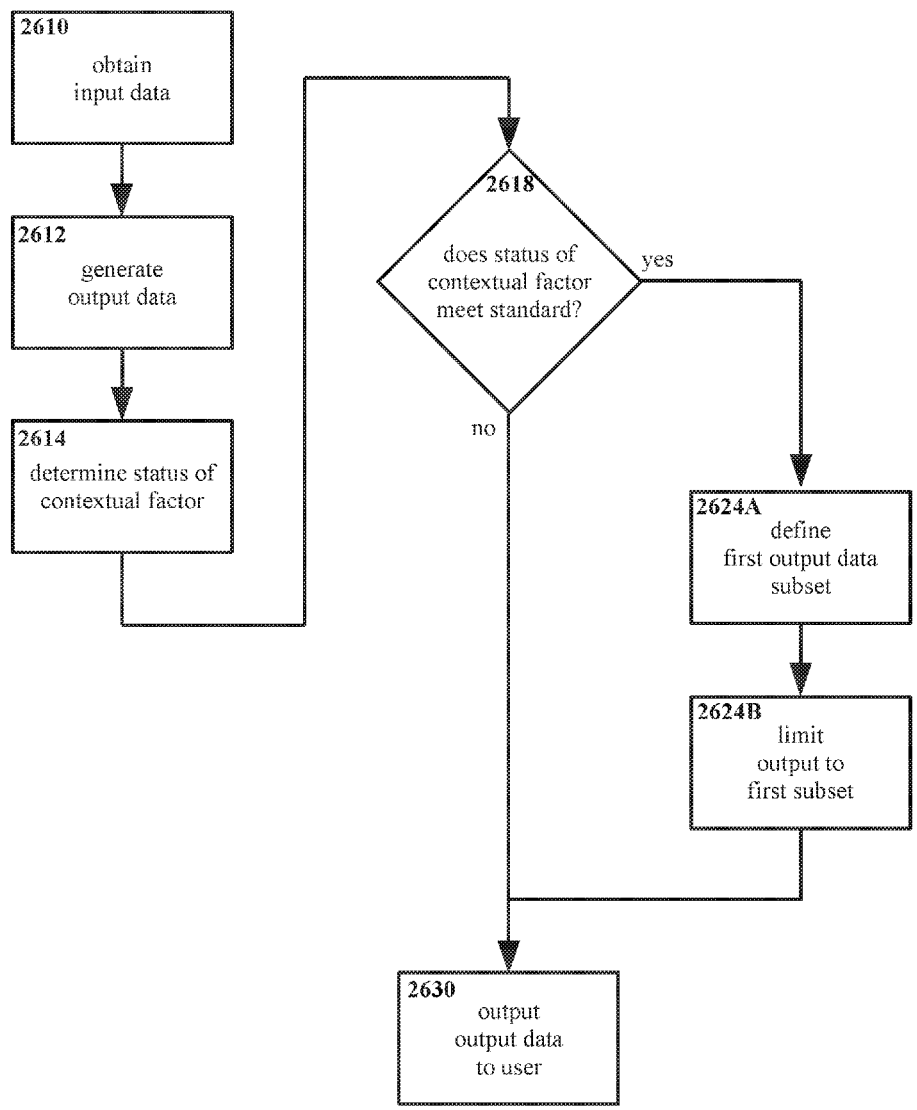
FIG. 26 an example embodiment of a method for selectively outputting data to a viewer, limiting output to a first subset with a positive status.

Now with reference to FIG. 26, an example arrangement is shown therein with only a first subset of the output data being outputted. In the method as shown in FIG. 26, input data is obtained 2610, output data is generated 2612, and a status of a contextual factor is determined 2614.

A determination is made 2618 as to whether the status of the contextual factor (as determined in step 2614) meets a standard for that contextual factor. If the determination 2618 is negative, the method proceeds to output the output data 2630.

However, if the determination is positive, a first output data set is defined 2624A, and output of the output data is limited 2624B to that first subset. The output data (rather, the first subset thereof) is then outputted 2630.

Figure 27:
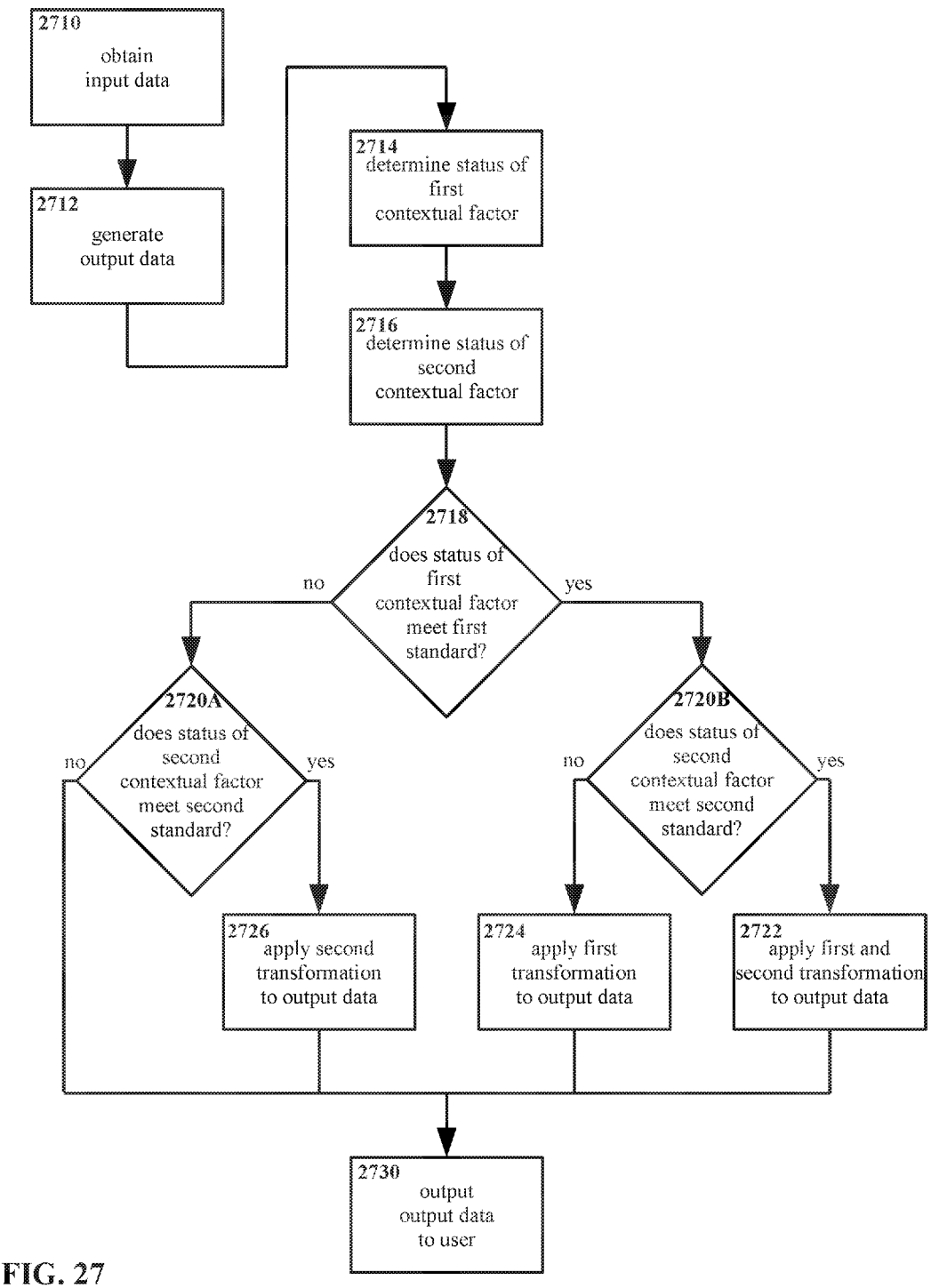
FIG. 27 an example embodiment of a method for selectively outputting data to a viewer, showing equal precedence between first and second transformations.
Figure 28:
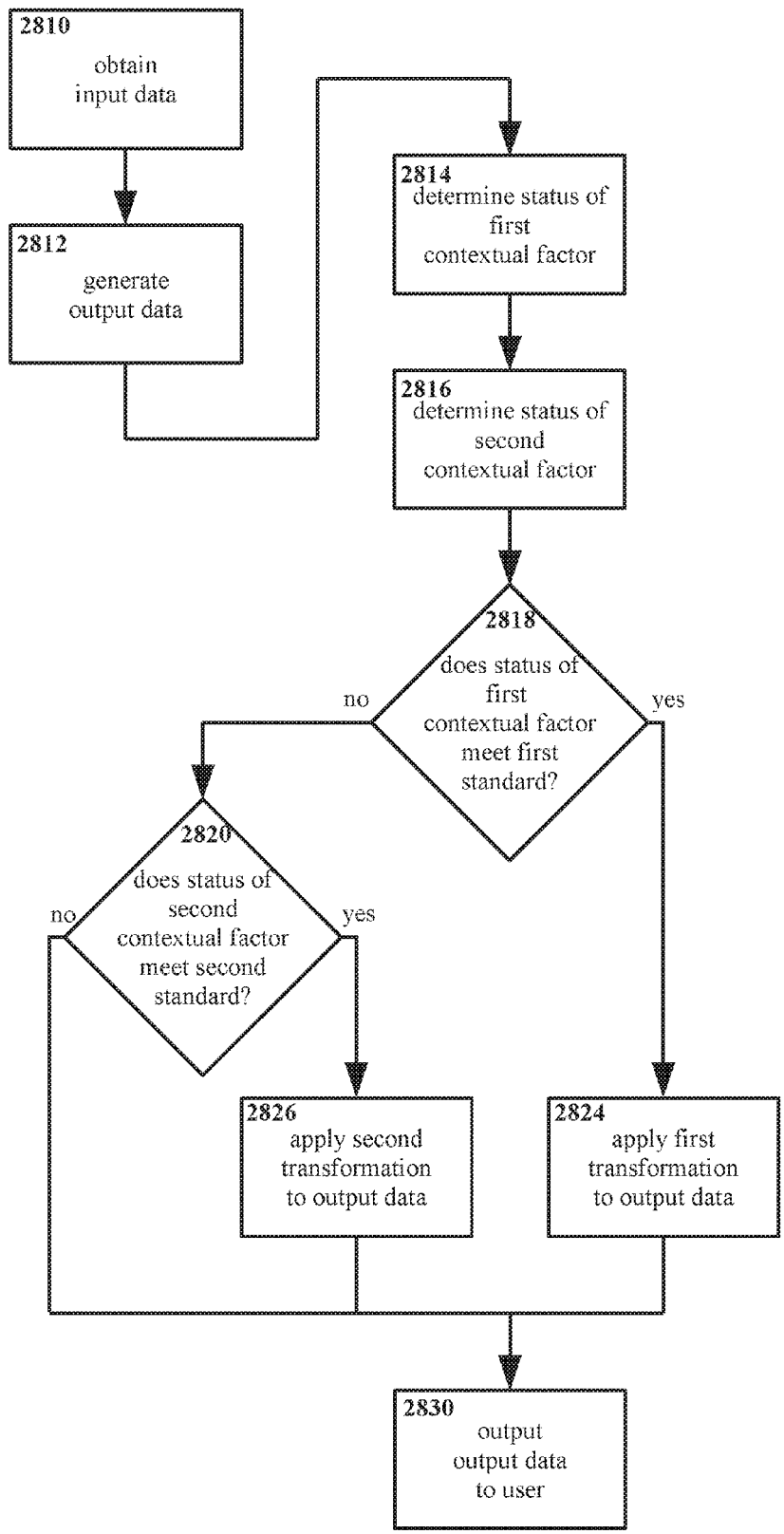
FIG. 28 an example embodiment of a method for selectively outputting data to a viewer, showing a first transformation with full precedence over a second transformation.
Figure 29:
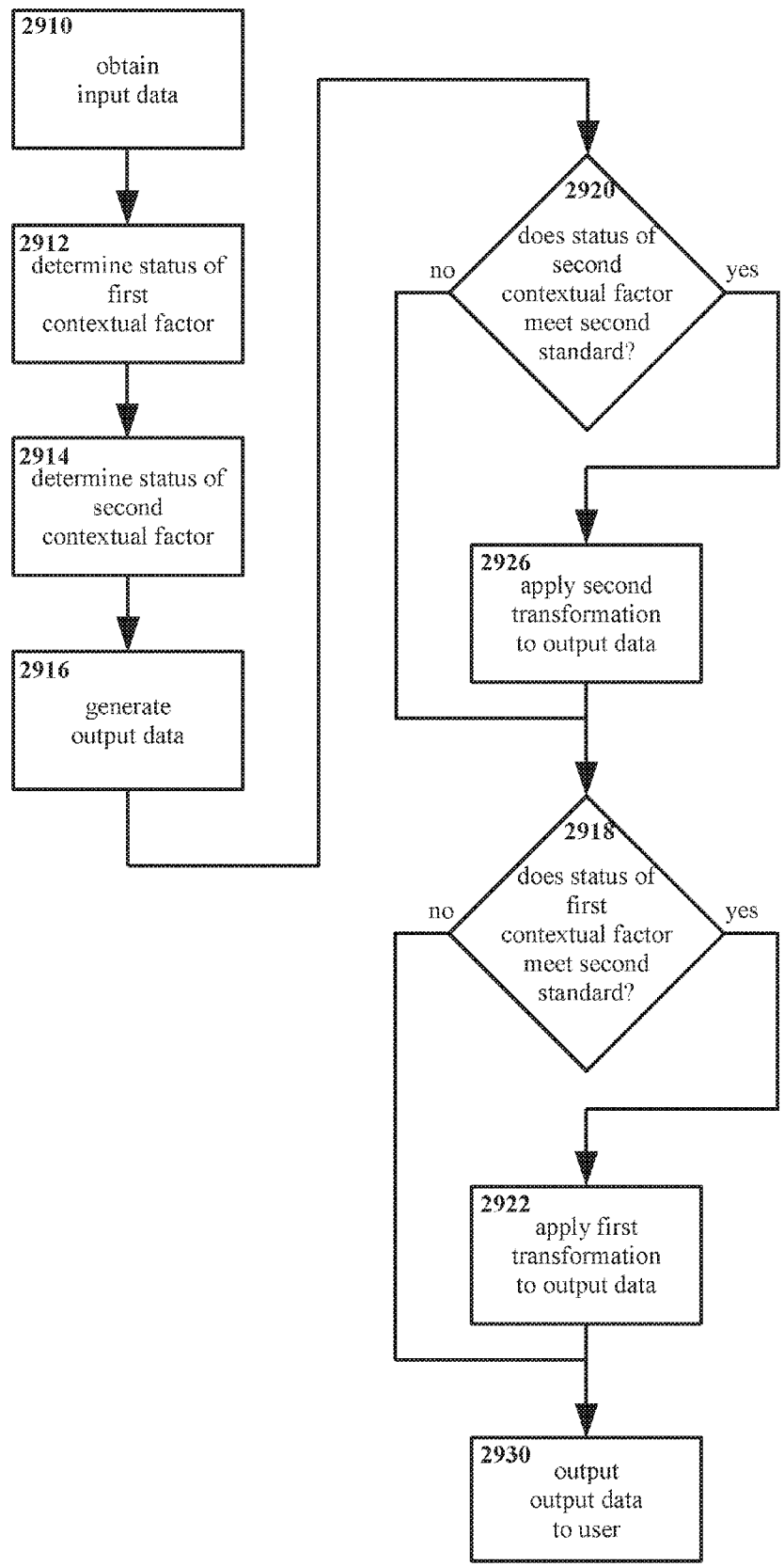
FIG. 29 an example embodiment of a method for selectively outputting data to a viewer, showing a first transformation with partial precedence over a second transformation.

With regard to FIG. 27 through FIG. 29, as noted previously embodiments may include two or more contextual factors, status determinations, standards, and/or transformations invoked thereby. When two or more transformations are invoked, the relative precedence of the transformations may be significant. That is, if two transformations have the potential to produce different effects on the output data, some consideration may be useful in so far as which transformation(s) and/or which portions thereof are implemented. FIG. 27 through FIG. 29 present three examples of arrangements for managing multiple transformations, with each such figure showing an example wherein a different degree of precedence exists between the first and second transformations.

Now particularly with reference to FIG. 27, therein an example arrangement is shown wherein a first and second transformations have substantially equal precedence. In the method as shown in FIG. 27, input data is obtained 2710 and output data is generated 2712. A status of a first contextual factor is determined 2714, and the status of a second contextual factor is determined 2716.

A first determination is made 2718 as to whether the status of the first contextual factor (as determined in step 2714) meets a first standard. Regardless of whether the status first contextual factor is determined 2718 to meet the standard or not, a second determination is also made 2720A or 2720B as to whether the status of the second contextual factor (as determined in step 2716) meets a second standard. Thus, four paths are possible within the method as shown.

If the first determination 2718 is negative and the second determination 2720A is also negative, the method proceeds to output the output data 2730.

If the first determination 2718 is negative but the second determination 2720A is positive, a second transformation is applied 2726 to the output data, and the method then proceeds to output the output data 2730.

If the first determination 2718 is positive but the second determination 2720B is negative, a first transformation is applied 2724 to the output data, and the method then proceeds to output the output data 2730.

If the first determination 2718 is positive and the second determination 2720B is positive, both the first and second transformations are applied 2722 to the output data, and the method then proceeds to output the output data 2730.

As noted, for the arrangement in FIG. 27 the first and second transformations have substantially equal precedence. Thus, either or both transformations may be applied to and/or affect the output data.

Turning to FIG. 28, therein an example arrangement is shown with a first transformation having full precedence over a second transformation. In the method as shown in FIG. 28, input data is obtained 2810 and output data is generated 2812. A status of a first contextual factor is determined 2814, and the status of a second contextual factor is determined 2816.

A first determination is made 2818 as to whether the status of the first contextual factor (as determined in step 2814) meets a first standard. If the first determination is positive, a first transformation is applied 2824 to the output data. The output data is then outputted 2830. In such cases wherein the status of the first contextual factor meets the first standard, the status of the second contextual factor may not even be considered. In practice, for some embodiments the first determination 2818 as to whether the status of the first contextual factor meets the first standard may be made before the status of the second factor is determined 2816, since the outcome of the first determination may render the status of the second contextual factor moot.

If the first determination is negative, a second determination is made as to whether the status of the second contextual factor (as determined in step 2816) meets a second standard. If the second determination is also negative, the method proceeds to output the output data 2830. However, if the second determination is positive, a second transformation is applied to the output data 2826 before the output data is outputted.

As noted, for the arrangement in FIG. 28 the first transformation has full precedence over the second transformation. If the first transformation is executed, the second transformation is not executed.

Turning now to FIG. 29, therein an example arrangement is shown with a first transformation having partial precedence over a second transformation. In the method as shown in FIG. 29, input data is obtained 2910 and output data is generated 2912. A status of a first contextual factor is determined 2914, and the status of a second contextual factor is determined 2916.

A second determination is made 2920 as to whether the status of the second contextual factor (as determined in step 2916) meets a second standard. If the second determination is positive, a second transformation is applied 2926 to the output data. If the second determination is negative, the second transformation is not applied. In either event, a first determination is also made 2918 as to whether the status of the first contextual factor (as determined in step 2914) meets a first standard. If the first determination is positive, a first transformation is applied 2922 to the output data (as potentially already transformed by the second transformation). If the first determination is negative, the first transformation is not applied. In any event, the method proceeds to output the output data 2930.

As illustrated and described in FIG. 29, the second determination and/or the second transformation may take place before the first determination and/or the first transformation. This is presented as an example only for purposes of illustrating precedence, and does not necessarily imply a strict chronology. The chronological order of the first and second transformations is not necessarily significant in itself. Rather, because the first transformation has partial precedence over the second transformation, the first transformation is able to partially or completely undo, counter, and/or or override the second transformation, and/or to limit the second transformation, should a conflict between the first and second transformations exist.

Figure 30:
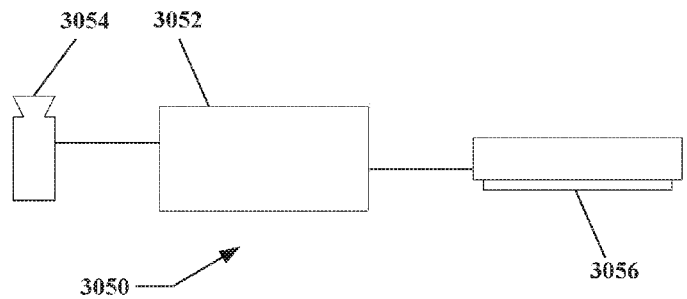
FIG. 30 shows an example embodiment of an apparatus for selectively outputting data to a viewer.

With reference now to FIG. 30, an embodiment of an apparatus 3050 for selectively presenting content is shown. The example apparatus as illustrated includes a processor 3052, a sensor 3054 in communication with the processor 3052, and a display 3056 in communication with the processor 3052.

The sensor 3054 is adapted to sense at least one contextual factor. The sensor 3054 may be, but is not required to be, adapted to generate some or all input data (if any) used by the processor 3052.

The processor 3052 is adapted to determine a status of the contextual factor as sensed by the sensor 3054. The processor 3052 is also adapted to determine if the contextual factor meets a standard. The processor 3052 is further adapted to generate output data, e.g. from input data supplied thereto, and to apply a transformation to the output data if the contextual factor meets the standard.

The display 3056 is adapted to output the output data to a viewer.

A range of devices may be suitable for use as the sensor 3054. As illustrated in FIG. 30, the sensor 3054 is shown as an imaging sensor such as a camera, adapted to capture images and/or video. A range of cameras, including but not limited to CMOS and CCD cameras, may be suitable. However, the use of a camera or other imaging sensor as a sensor 3054 for the apparatus 3050 is an example only. Other sensors may be equally suitable, such as sensors that capture information other than images and/or video may be equally suitable. Other suitable sensors 3054 may include but are not limited to position sensors, motion sensors, acceleration sensors, and biometric sensors. More particular sensors 3054 may include but are not limited to accelerometers, gyroscopes, compasses, GPS sensors, and differential GPS sensors.

The sensor 3054 is not limited with regard to either what precise context factor(s) may be sensed, or how the sensor 3054 may sense the contextual factor(s).

Similarly, a range of general-purpose, special-purpose, and embedded systems may be suitable for use as the processor 3052. Moreover, it may be equally suitable for the processor 3052 to consist of two or more physical or logical processor components.

A range of devices likewise may be suitable for use as the display 3056, including but not limited to light emitting diodes (LED), organic light emitting diodes (OLED), plasma screen panels (PDP), liquid crystal displays (LCD), etc. Likewise, the use of projected or transmitted displays, where the viewed surface (if any) is essentially a passive screen for an image projected or otherwise transmitted after being generated elsewhere, may also be suitable. Other arrangements including but not limited to systems that display images directly onto a viewer's eyes also may also be suitable. Either digital or analog display technologies may be suitable.

The apparatus may vary considerably from one embodiment to another, in ways including but not limited to the following.

Figure 31:
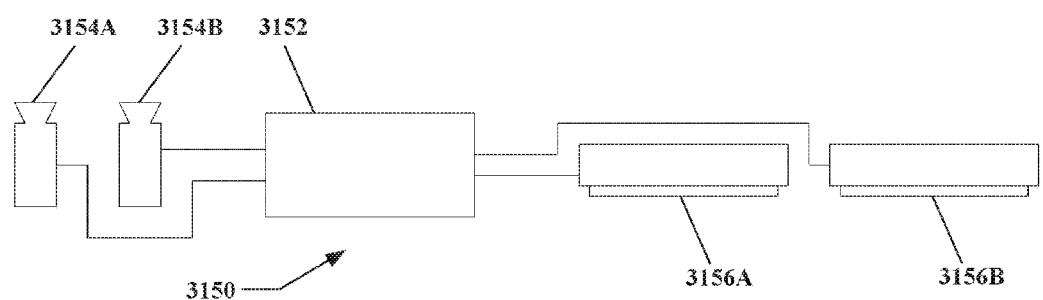
FIG. 31 shows an example embodiment of an apparatus for selectively outputting data to a viewer, with stereo sensors and stereo displays.

Turning to FIG. 31, an example apparatus 3150 is shown having stereo sensors 3154A and 3154B, adapted to generate stereo information, in communication with a processor 3152. Such a sensor arrangement may be useful for at least some embodiments, at least in that stereo imaging can provide three dimensional data regarding an environment, e.g. by capturing images (or other data) from slightly different perspectives so as to provide distance information, etc. However, the use of stereo sensors 3154A and 3154B is an example only, and other arrangements may be equally suitable.

The apparatus 3150 also includes stereo displays 3156A and 3156B, adapted to output stereo output data, in communication with the processor 3152. Such a display arrangement may be useful for at least some embodiments, at least in that stereo output can display three dimensional data to a viewer, e.g. by outputting slightly different perspectives to left and right displays 3156A and 3156B (and thus to left and right eyes). However, the use of stereo displays 3156A and 3156B is an example only, and other arrangements may be equally suitable.

Figure 32:
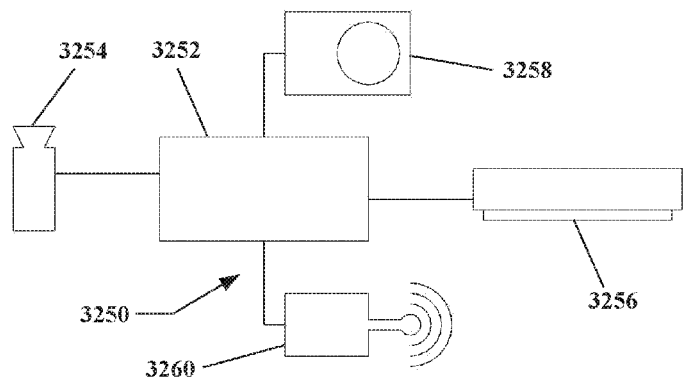
FIG. 32 shows an example embodiment of an apparatus for selectively outputting data to a viewer, with a data store and communicator.

With reference now to FIG. 32, an apparatus 3250 is shown having a processor 3252, a sensor 3254, and a display 3256, at least somewhat similar to FIG. 30. However, the example apparatus in FIG. 32 also includes a data store 3258 in communication with the processor 3252. The data store 3258 is adapted to store input data and/or to store information regarding the status of one or more contextual factors, and to communicate such information with the processor 3252.

A variety of devices may be suitable for use as the data store 3258. Suitable devices may include but are not limited to magnetic hard drives, optical drives, and solid state drives. Other devices and/or systems may be equally suitable.

The apparatus 3250 also includes a communicator 3260 in communication with the processor 3252. The communicator 3260 is adapted to receive input data and/or information regarding the status of one or more contextual factors from some source external to the apparatus 3250. The communicator 3260 also may be, but is not required to be, adapted to transmit information to some destination external to the apparatus 3250.

A variety of devices also may be suitable for use as the communicator 3258. Communication may be wired and/or wireless. Suitable devices may include but are not limited to wired and wireless modems.

As noted above with regard to the individual elements, any or all of a sensor, a data store, and/or a communicator may provide input data and/or information regarding contextual factors to a processor in an apparatus. Thus, arrangements with only a sensor, only a data store, and/or only a communicator may be suitable for at least some embodiments. However, combinations of one or more sensors, one or more data stores, and/or one or more communicators also may be suitable, and embodiments are not limited with respect thereto.

Figure 33:
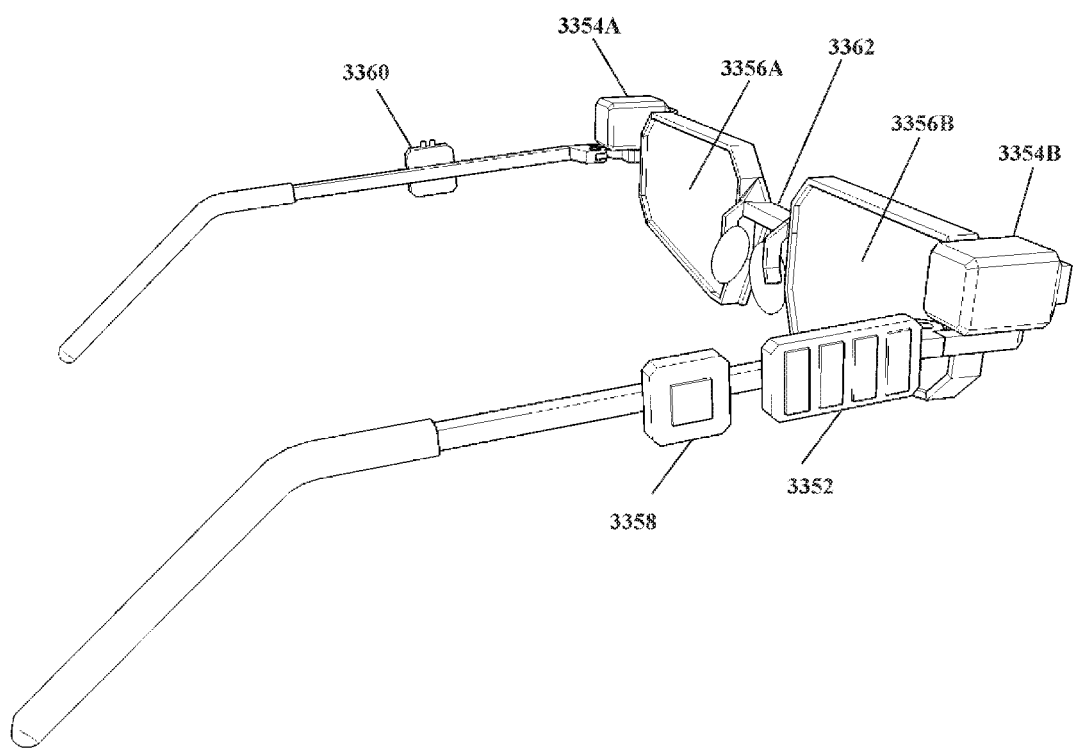
FIG. 33 shows an example embodiment of an apparatus for selectively outputting data to a viewer, in the form of a head mounted display.

Embodiments may be incorporated into and/or utilized with a broad range of other devices. For example, FIG. 33 shows an example arrangement of an apparatus 3350 as incorporated with a head mounted display. The embodiment shown in FIG. 33 includes a processor 3352, first and second sensors 3354A and 3354B in a stereo arrangement, and first and second displays 3356A and 3356B also in a stereo arrangement. The apparatus 3350 also includes a data store 3358 and a communicator 3360.

The apparatus shown in FIG. 33 also includes a body 3362 in the form of a frame for a head mounted display. As shown the body 3362 resembles a pair of glasses, but this is an example only, and other configurations may be equally suitable.

As may be seen, the first and second sensors 3354A and 3354B are disposed so as to be generally forward-facing similarly to a viewer's eyes. Typically, although not necessarily, the first and second sensors 3354A and 3354B will have imaging fields of view at least sufficient so as to substantially encompass the visual field of a viewer. While the imaging fields of view of the first and second sensors 3354A and 3354B may potentially extend beyond the visual field of the viewer, with sufficiently large angles of view for the first and second sensors 3354A and 3354B the images obtained therefrom will at least include imaging fields of view substantially corresponding the with a viewer's visual field. However, such an arrangement is an example only, and other arrangements may be equally suitable.

The displays 3356A and 3356B are engaged with the body 3362, with the body 3362 being configured and the displays 3356A and 3356B being disposed such that when viewer wears the apparatus 3350, the displays 3356A and 3356B are disposed proximate to and substantially aligned with the viewer's eyes. The sensors 3354A and 3354B are engaged with the body 3362, as are the processor 3352, the data store 3358, and the communicator 3360.

Although as shown in FIG. 33 the sensors 3354A and 3354B are engaged with the body 3362 such that both sensors 3354A and 3354B face generally away from the viewer when the viewer wears the apparatus 3350, this is an example only and is not required. Arrangements wherein one or more sensors are disposed so as to face toward the viewer, and/or are in direct contact with the viewer, may be equally suitable.

Figure 34:
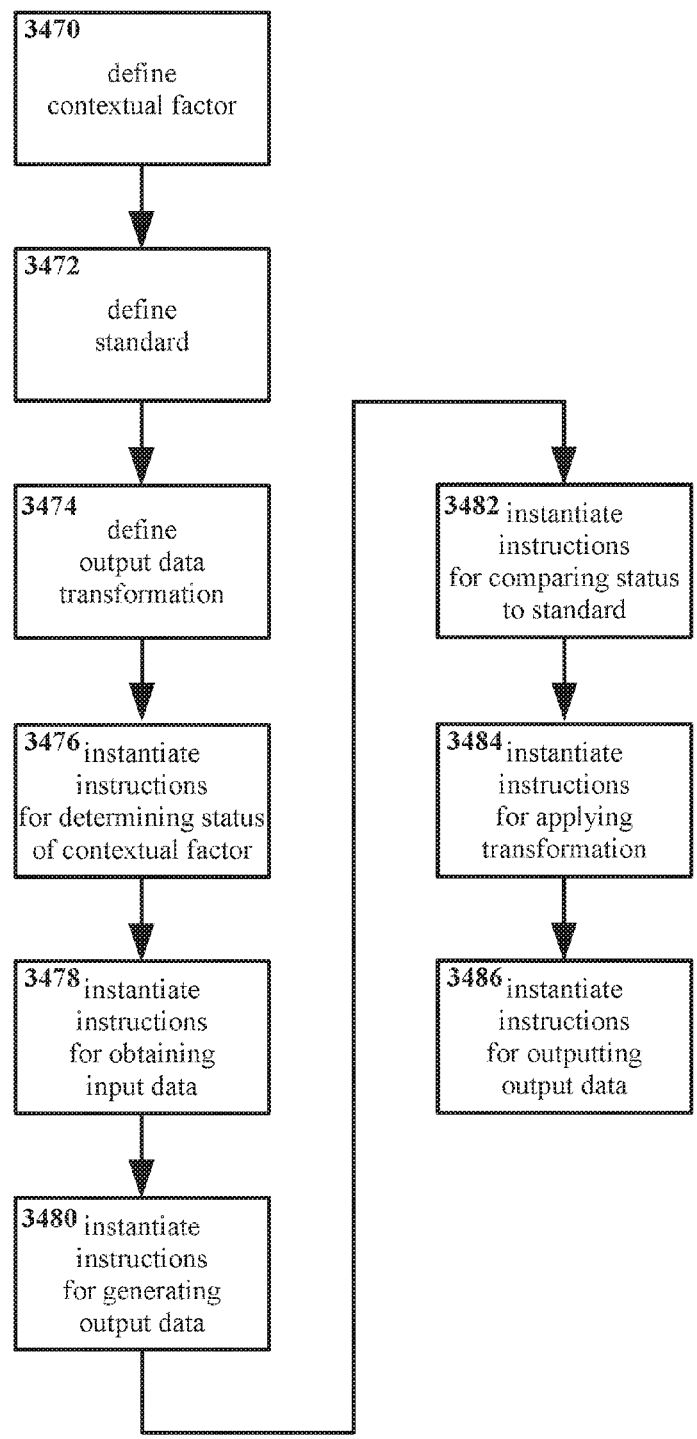
FIG. 34 shows an example arrangement for establishing in a processor an example embodiment of a method for selectively outputting data to a viewer.

With reference now to FIG. 34, an example embodiment of a method is shown. As noted, at least some embodiments may be machine-controlled methods. In the example embodiment of FIG. 34, an arrangement is shown wherein a method is established within a processor, for executing a method for selectively presenting content according.

In the method of FIG. 34, a contextual factor is defined 3470. The source of the contextual factor is not limited. The contextual factor may for example be viewer-defined, may be determined by a controlling processor, may be read from a data store, may be received from an external source, etc. Other arrangements may be equally suitable. The nature of the contextual factor also is not limited.

A standard for the contextual factor also is defined 3472. As with the contextual factor, the source of the standard therefor is not limited. The standard may for example be viewer-defined, may be determined by a controlling processor, may be read from a data store, may be received from an external source, etc. Other arrangements may be equally suitable. The nature of the standard also is not limited.

In addition, a transformation for output data is defined 3474. Again, the source of the transformation is not limited. The transformation may for example be viewer-defined, may be determined by a controlling processor, may be read from a data store, may be received from an external source, etc. Other arrangements may be equally suitable. The nature of the transformation also is not limited.

Executable instructions for determining the status of the contextual factor are instantiated 3476 onto a controlling processor. The manner by which the determination is made is not limited, nor are the executable instructions therefor.

Executable instructions for obtaining input data are instantiated 3478 onto the controlling processor. The source for obtaining the input data is not limited, nor is the manner of obtaining the input data, nor are the executable instructions therefor. For some embodiments the executable instructions may cause the controlling processor to obtain input data from one or more sensors, to generate input data internally, to read input data from a data store, to receive input data from an external source, etc. Other arrangements may be equally suitable.

Executable instructions for generating output data, e.g. from the input data, are instantiated 3480 onto the controlling processor. The manner by which the output data is generated is not limited, nor are the executable instructions therefor.

Executable instructions for comparing the status of the contextual factor with the standard defined therefor (in step 3472) are instantiated 3482 onto the controlling processor. The manner of comparison and the instructions therefor are not limited.

Executable instructions for applying the transformation (defined in step 3474) to the output data are instantiated 3484 onto the controlling processor, with the transformation being contingent on whether the status of the contextual factor meets the standard therefor. The manner of executing the transformation is not limited.

Executable instructions for outputting the output data (whether or not the transformation is applied thereto) are instantiated 3486 onto the controlling processor. The manner of outputting the output data is not limited.

With reference now to collectively FIG. 35 through FIG. 55, therein is shown a series of arrangements of motion of a viewer using an example embodiment of an apparatus and/or exhibiting an example embodiment of a method. More particularly, in FIG. 35 through FIG. 55 various example arrangements are shown wherein a viewer and/or a viewer's eye(s) are disposed in and/or move in some manner, and visual appearances responsive to those dispositions and/or motions.

With reference to FIG. 35, a viewer 3559 is shown therein in a top-down view, wearing an apparatus 3350. In the example shown, the apparatus 3350 is configured as a near-eye head-mounted display resembling and worn as a pair of glasses. However, this arrangement is an example only, and other arrangements may be equally suitable.

Also in FIG. 35, first and second displays 3556A and 3556B are shown, displaying output data 3501A and 3501B respectively. In FIG. 35, the first and second displays 3556A and 3556B are shown as left and right displays as may be disposed within a near-eye head-mounted display such as in the apparatus 3350, e.g. as being configured for stereo output. The first and second output data 3501A and 3501B show views of a sail boat, as may be seen by a viewer 3559 wearing the apparatus 3350. While such arrangements are examples only, the arrangement in FIG. 35 may be understood as two related views: a lower image showing the viewer 3359 and apparatus 3550 representing an arrangement of a person wearing a head-mounted display, and an upper image showing the first and second displays 3556A and 3556B with first and second output data 3501A and 3501B representing what may be seen by the person wearing the head-mounted display in some circumstance. (Similar arrangements are shown in several subsequent illustrations herein.) More colloquially, FIG. 35 may be understood to show both "what the user is doing" and "what the user sees".

As may be seen in FIG. 35, the viewer 3559 is oriented such that his or her head aligns generally forward (upward on the page). As also may be seen, the first and second output data 3501A and 3501B show a sail boat (e.g. left and right stereo images thereof) disposed approximately centered within and substantially filling the displays 3556A and 3556B. The output data 3501A and 3501B shown (a static image of a sail boat) is an example only, and should not be interpreted as limiting. Other output data and/or content, including but not limited to animated images or video, charts or graphs, text, a cursor or crosshair (e.g. as shifted with the user's gaze to select positions or objects in space), etc. may be equally suitable.

FIG. 36 and FIG. 37 show two possible arrangements for content similar to that in FIG. 35, including a head turn by the viewer. Briefly, in FIG. 36 the content remains at least substantially stationary with respect to the viewer's eyes, while in FIG. 37 the content remains at least substantially stationary with respect to an external frame of reference (e.g. "the world"). It is emphasized that the two options shown in FIG. 36 and FIG. 37 are not exclusive of one another; that is, a given embodiment may follow either FIG. 36 or FIG. 37, or may do both under different circumstances, etc. The possibility of content remaining fixed with respect to the viewer's eyes as in FIG. 36 does not preclude the possibility of content remaining fixed with respect to an external frame of reference as in FIG. 37, for example. In addition, the two options shown in FIG. 36 and FIG. 37 are not exhaustive; responses to movement other than the example options shown in FIG. 36 and FIG. 37 also may be equally suitable.

With regard specifically to FIG. 36, a viewer 3659 is shown wearing an apparatus 3650, similar to the arrangement in FIG. 35. However, in FIG. 36 the viewer 3650 is turned approximately 30 degrees to the right (clockwise as shown) as compared with FIG. 35. Thus, the disposition of the viewer's eyes in FIG. 36 also may be understood as being panned 30 degrees clockwise/right compared to FIG. 35. (For simplicity, it is assumed for FIG. 35 through FIG. 37 that the viewer leaves his or her eyes pointing directly ahead with regard to his or her head. This is an example only, made for purposes of clarity, and should not be considered as limiting. Instances addressing eye motion, wherein the viewer may move his or her eyes in addition to or instead of moving his or her head, are described subsequently herein.)

Also in FIG. 36, first and second displays 3656A and 3656B with output data 3601A and 3601B are shown. As may be seen, the output data 3601A and 3601B in FIG. 36 is substantially similar to the output data 3501A and 3501B in FIG. 35: the sail boats as shown in FIG. 36 are not perceptibly different as compared with the sail boats in FIG. 35 (for example, the sail boats exhibit similar position on the respective displays, similar orientation, similar size, etc.).

If one considers FIG. 35 and FIG. 36 as two sequential configurations of one viewer and the views of displayed content visible to that viewer, then it may be understood that despite a difference in orientation of 30 degrees the difference in head/eye disposition does not perceptibly change what the viewer sees displayed. For example, if the viewer is considered to keep his or her eyes aligned straight ahead with regard to his or her head in both FIG. 35 and FIG. 36, then substantially the same images are delivered to substantially the same portions of the viewer's retinas.

Thus it may be said that in comparing FIG. 35 and FIG. 36, the sail boat imagery is delivered to the same portion of the viewer's field-of-view—i.e. the same portions of the viewer's retinas—in both FIG. 35 and FIG. 36, without a perceptible change in response to the movement of the viewer's eyes as his or her head turns. The viewer's eyes change in disposition as the viewer's head turns, but in the example of FIG. 35 and FIG. 36 the portion of the retina to which the output data is delivered does not change because of that change in disposition.

In more colloquial terms, regardless of where the viewer looks, the same image (a sail boat) is displayed to the same apparent place in his or her field of view (and in the example in FIG. 36, the same apparent size, same apparent orientation, etc.) If a sail boat is in his or her central vision with his or her head facing forward as in FIG. 35, then after turning his or her head to the right as in FIG. 36 the sail boat still will be in his or her central vision. The change in eye disposition does not change where the sail boat is in his or her field of view (though potentially other factors might alter the sail boat's position, e.g. if the sail boat were animated and moving right to left, then the sail boat might change its apparent position in the viewer's field of view even if that change were not a result of the user moving his or her head).

Conversely in more specific terms and relating to language already used with regard to previous examples herein, as shown in FIG. 35 and FIG. 36 a substantial correspondence may be maintained between a first output region and a first portion of the viewer's retina, without perceptibly changing the output data in response to a change in disposition of the viewer's eye (or eyes).

For the preceding discussion of FIG. 35 and FIG. 36, it has been assumed for simplicity that the viewer 3559 and 3659 has his or her eyes disposed differently only due to the difference in orientation of the head as shown, that is, a turn of approximately 30 degrees clockwise between FIG. 35 and FIG. 36. However, this is an example only. Other head motions, including but not limited to other rotations (e.g. inclining the head in addition to or instead of turning the head), translations (e.g. moving the head left, right, forward, back, up, down, etc. such as by walking), and movements of the eyes with respect to the head (e.g. looking left, right, up down, etc.) also may be suitable (and certain additional examples thereof are presented below). Regardless of the particulars of the change in disposition of a viewer's head, eyes thereof, and/or retinas thereof, substantial correspondence may be maintained between an output region and a portion of the viewer's retina, without perceptibly changing the output data in response to a change in disposition of the viewer's eye. Or stated differently, no matter how or where the viewer moves his or her eyes, the image (or text, etc.) is made visible to the viewer may appear to him or her to remain in the same place despite the eye motion.

However, turning now to FIG. 37, although output may be "held in place" within a viewer's field of view despite eye motion in certain instances (e.g. due to head turning), it is not necessarily required that output be held in place despite eye motion in all circumstances. That is, a change in eye disposition may be made to result in a change in the apparent position of output data as viewed by a viewer.

In FIG. 37, a viewer 3759 is shown with an apparatus 3750. The viewer 3750 is turned approximately 30 degrees clockwise compared to the viewer 3550 in FIG. 35, similarly to the viewer 3650 in FIG. 36. Thus, the disposition of the viewer's eyes in FIG. 37 may be understood as being panned 30 degrees clockwise compared to FIG. 35, similarly to FIG. 36. However, as may be seen in FIG. 37 the output data 3701A and 3701B on first and second displays 3756A and 3756B is arranged differently than in FIG. 35 (or FIG. 36). Compared with FIG. 35, the output data 3701A and 3701B is shifted left as the viewer 3759 is turned right. This arrangement is as may be expected if the content 3701A and 3701B were fixed in space: as the viewer looks to the right, the content 3701A and 3701B appears to the viewer move to the left. That is, as the visual field of the viewer turns to the right, the content remains in place with respect to the outside world but (because of the moving visual field) moves into the left of that visual field.

Thus in the example shown by comparing FIG. 35 and FIG. 37, a substantial correspondence is not maintained between a first output region and a first portion of the viewer's retina. The output data does change perceptibly (i.e. shifting to the left within the visual field) in response to a change in disposition of the viewer's eyes.

Through comparison of FIG. 35, FIG. 36, and FIG. 37, it may be understood that maintaining a substantial correspondence between a first output region and a first portion of the viewer's retina is one option, but is not necessarily required.

Behavior of output data is not limited only to that shown in FIG. 35 through FIG. 37. For example, for certain embodiments content may not be fixed either with respect to the viewer's retinas/eyes or with respect to an external frame of reference, potentially moving with regard to both, being fixed to a frame of reference within an augmented or virtual reality, or some other arrangement.

In addition, the fixing of content either to the frame of reference of the viewer's retinas/eyes or to an external frame of reference is not limited only to a viewer's head turning left or right, as illustrated in FIG. 35 through FIG. 37. Turning now to FIG. 38 through FIG. 40, therein examples are shown of behavior of content responsive to a viewer tilting his or her head.

In FIG. 38, a viewer 3859 is shown in a front view, wearing an apparatus 3850 configured as a near-eye head-mounted display resembling and worn as a pair of glasses. As may be seen, the viewer 3859 is oriented such that his or her head is generally vertical. Also in FIG. 38, first and second displays 3856A and 3856B are shown, displaying output data 3801A and 3801B respectively. As also may be seen, the first and second output data 3801A and 3801B show a sail boat (e.g. left and right stereo images thereof) disposed approximately centered within and substantially filling the displays 3856A and 3856B.

FIG. 39 and FIG. 40 show two possible arrangements for content similar to that in FIG. 38, including an inclination of the viewer's head. Briefly, in FIG. 38 the content remains at least substantially stationary with respect to the viewer's eyes, while in FIG. 39 the content remains at least substantially stationary with respect to an external frame of reference (e.g. "the world"). Again, the options shown in FIG. 38 and FIG. 39 are not exclusive of one another, and are not exhaustive.

With regard specifically to FIG. 39, a viewer 3959 is shown wearing an apparatus 3950, similar to the arrangement in FIG. 38. However, in FIG. 39 the viewer 3950 has inclined his or her head approximately 30 degrees to his or her right as compared with FIG. 38 (though because the viewer is facing out of the page, the illustration of the viewer 3950 is inclined to the reader's left). Thus, the disposition of the viewer's eyes in FIG. 39 also may be understood as being inclined 30 degrees to his or her right compared to FIG. 38. (It is assumed for FIG. 38 through FIG. 40 that the viewer leaves his or her eyes pointing directly ahead with regard to his or her head.)

In practice, a viewer inclining his or her head 3959 may produce motions more complex than simple inclination. For example, tilting one's head to the left does not merely rotate each eye, but rather typically moves the entire head about some point of rotation in the neck, thus causing translation of the eyes to the left, up and/or down, etc. In practice, multiple changes—rotations about multiple axes, multiple translations, combinations of translations and/or rotations, etc.—may take place, and may be equally suitable. However, for clarity, in the example described with regard to FIG. 39 (and certain other examples herein) the change in orientation of eyes may be addressed as though only an angular change in the orientation of the eyes has taken place. It should be understood that certain real-world motions may be more complex than those examples presented here, and that motions and behaviors of content in response thereto are not limited only to those examples presented herein.

Still with regard to FIG. 39, first and second displays 3956A and 3956B with output data 3901A and 3901B are shown. The displays 3956A and 3956B are shown inclined approximately 30 degrees to the right, as may be expected if those displays 3956A and 3956B are worn by a viewer 3950 who has inclined his or her head 3859 to the right. However, as may be seen the output data 3901A and 3901B in FIG. 39 is substantially similar to the output data 3801A and 3801B in FIG. 38, with regard to the displays 3956A and 3956B. That is, with respect to displays 3956A and 3956B the sail boats in FIG. 39 are not perceptibly different compared with the sail boats in FIG. 38 (similar position on the respective displays, similar orientation, similar size, etc.).

If one considers FIG. 38 and FIG. 39 as sequential configurations, then despite a difference in head inclination of 30 degrees the difference in head/eye disposition does not perceptibly change what the viewer sees displayed. For example, if the viewer is considered to keep his or her eyes aligned straight ahead with regard to his or her head in both FIG. 38 and FIG. 39, then substantially the same images are delivered to substantially the same portions of the viewer's retinas. The viewer's eyes would be inclined, but with displays 3956A and 3956B correspondingly inclined as shown in FIG. 39 the sail boat shown thereon would appear similarly in the viewer's field of view compared with FIG. 38.

Thus in comparing FIG. 38 and FIG. 39, the sail boat is delivered to the same portion of the viewer's field-of-view—i.e. the same portions of the viewer's retinas—and in the same orientation in both FIG. 38 and FIG. 39, without a perceptible change in response to the movement of the viewer's eyes as his or her head turns. The same image (a sail boat) is displayed to his or her field of view with substantially the same apparent size, apparent orientation, etc. Stated differently, as shown in FIG. 38 and FIG. 39 a substantial correspondence may be maintained between a first output region and a first portion of the viewer's retina, without perceptibly changing the output data in response to a change in disposition of the viewer's eye (or eyes).

Turning now to FIG. 40, although output may be "held in place" within a viewer's field of view despite eye motion in certain instances (e.g. due to head inclination), it is not necessarily required that output be held in place despite eye motion in all circumstances. As noted previously with regard to FIG. 37, a change in eye disposition may be made to result in a change in the apparent position of output data as viewed by a viewer.

In FIG. 40, a viewer 4059 is shown with an apparatus 4050. The head of the viewer 4050 is inclined approximately 30 degrees to his or her right compared to FIG. 38, and similarly to the viewer 3950 in FIG. 39. Thus, the disposition of the viewer's eyes in FIG. 40 may be understood as being inclined 30 degrees right compared to FIG. 38, again similarly to FIG. 39.

However, where in FIG. 39 the change in eye disposition therein did not produce a change in the apparent position of content, in FIG. 40 the difference in eye disposition compared with FIG. 38 does produce a change in the apparent position of output data. More particularly, in FIG. 40 the output data 4001A and 4001B is inclined approximately 30 degrees with respect to the left and right displays 4056A and 4056B, as compared with the arrangement in FIG. 38. Described differently, the output data 4001A and 4001B in FIG. 40 remains vertical relative to the external environment, although the left and right displays 4056A and 4056B have been inclined (e.g. by the user 4059 inclining his or her head, with the left and right displays 4056A and 4056B disposed on the user's head).

The arrangement shown in FIG. 40 is as may be expected if the output data 4001A and 4001B were fixed in space: as the viewer inclines his or her head to the right, the output data 4001A and 4001B appears to the viewer to incline to the left. That is, as the visual field of the viewer inclines to the right, the content remains in place with respect to the outside world but (because of the moving visual field) inclines to the left in the viewer's visual field.

Thus in the example shown by comparing FIG. 38 and FIG. 40, a substantial correspondence is not maintained between a first output region and a first portion of the viewer's retina. The output data does change perceptibly (i.e. shifting to the left within the visual field) in response to a change in disposition of the viewer's eyes.

Now with reference to FIG. 41, as previously noted multiple motions may be considered together. In FIG. 41, a viewer 4159 is shown with an apparatus 4150. The head of the viewer 4150 is inclined approximately 30 degrees to his or her right compared to FIG. 38, and similarly to the viewers in FIG. 39 and FIG. 40. Thus, the disposition of the viewer's eyes in FIG. 41 may be understood as being inclined 30 degrees right compared to FIG. 38. However, where in FIG. 40 only inclination of the content was considered (e.g. the content rotated), in FIG. 41 an example is shown wherein content is inclined and also translated. The arrangement shown in FIG. 41 may be as expected for inclination of a viewer's head, wherein inclining the head not only changes the angular orientation of eyes (and/or content) but also translates the eyes (and/or content).

In comparing FIG. 41 with FIG. 38, in FIG. 41 the content 4101A and 4101B in FIG. 41 appears to have "hung in space" despite the viewer 4159 and the apparatus 4150 (and consequently displays 4156A and 4156B of the apparatus 4150) inclining. Consequently, from the perspective of the viewer 4159, the content 4101A and 4101B appears to have inclined (e.g. relative to displays 4156A and 4156B) and also translated: the left content 4101A has shifted down and right with respect to the left display 4156A, and the right content 4101B has shifted up and left with respect to the right display 4156B. That is, compared with FIG. 38 in FIG. 41 the content has remained in place with respect to the outside world, but has translated and inclined in the viewer's visual field.

Thus in the example shown by comparing FIG. 38 and FIG. 41, a substantial correspondence is not maintained between a first output region and a first portion of the viewer's retina. The output data does change perceptibly in response to a change in disposition of the viewer's eyes, though the output data changes differently than in FIG. 40 (as may be expected from considering different motions), and also as compared with FIG. 39 wherein the output data does not perceptibly change in response to a change in disposition of the viewer's retinas.

Now with reference collectively to FIG. 42 through FIG. 48, displayed content is not required to fill the full field of view of a viewer, or to fill the full display area of a display. For purposes of convenient visibility, in FIG. 35 through FIG. 41 content was shown sized so as to occupy all or at least a large fraction of the displays. However, displays are not required to extend to a viewer's entire field of view, nor is content displayed thereon required to fill either the viewer's field of view or the entire display area of the displays (though fully filling fields of view and/or display areas is not excluded). As may be seen in FIG. 42 through FIG. 48, content may be displayed so as to occupy only a relatively small portion of the display area and/or field of view.

It is emphasized that no particular relationships are required among output data, output regions, display extents, and viewer fields of view. For example, output data may or may not fill an output region, and/or may or may not extend beyond an output region. Likewise, an output region may or may not fill a display, etc. FIG. 42 through FIG. 45 show arrangements wherein the visible content—a sail boat—is small relative to the displays. Although it may be possible to infer certain relationships—for example, that associated output regions likewise are smaller—such relationships are not necessarily present, and even if present are not limiting.

In FIG. 42, a viewer 4259 is shown in a top-down view, wearing an apparatus 4250. Also in FIG. 42, first and second displays 4256A and 4256B are shown, displaying output data 4201A and 4201B respectively. The first and second output data 4201A and 4201B show views of a sail boat, as may be seen by a viewer 4259 wearing the apparatus 4250. The output data 4201A and 4201B (represented by the sail boat) is disposed in the upper right corner of each display, occupying only a small portion of the area of the displays 4256A and 4256B (and thus also only a small portion of the field of view of the viewer, though the field of view of the viewer is not explicitly marked in FIG. 42).

In FIG. 42, the viewer 4259 is oriented such that his or her head aligns generally forward (upward on the page). The output data 4201A and 4201B also may be seen to be oriented generally "right side up".

In FIG. 43, a viewer 4359 again is shown wearing an apparatus 4350, similar to the arrangement in FIG. 42. In FIG. 43 the viewer 4350 is turned approximately 30 degrees to the right (clockwise as shown) as compared with FIG. 42. Thus, the disposition of the viewer's eyes in FIG. 43 also may be understood as being panned 30 degrees clockwise/right compared to FIG. 42.

Also in FIG. 43, first and second displays 4356A and 4356B with output data 4301A and 4301B are shown. As may be seen, the output data 4301A and 3601B in FIG. 43 is substantially similar to the output data 4301A and 4301B in FIG. 42: the sail boats as shown in FIG. 43 are not perceptibly different as compared with the sail boats in FIG. 42. A difference in orientation of 30 degrees the difference in head/eye disposition does not perceptibly change what the viewer sees displayed; substantially the same images are delivered to substantially the same portions of the viewer's retinas.

Thus in comparing FIG. 42 and FIG. 43, the sail boat imagery is delivered to the same portion of the viewer's field-of-view—i.e. the same portions of the viewer's retinas—in both FIG. 42 and FIG. 43, without a perceptible change in response to the movement of the viewer's eyes as his or her head turns. The viewer's eyes change in disposition as the viewer's head turns, but in the example of FIG. 42 and FIG. 43 the portion of the retina to which the content is delivered does not change because of that change in disposition. Thus, a substantial correspondence is maintained between a first output region and a first portion of the viewer's retina, without perceptibly changing the output data in response to a change in disposition of the viewer's eye (or eyes).

Turning to FIG. 44, a viewer 4459 is shown with an apparatus 4450. The viewer 4450 again is turned approximately 30 degrees clockwise compared to the viewer 4250 in FIG. 42. However, in FIG. 44 the output data 4401A and 4401B on first and second displays 4456A and 4456B is left of the corresponding positions in FIG. 42. As may be seen, the sail boat shown on displays 4456A and 4456B has shifted left in FIG. 44, to the point that part of the sail boat is "off-screen", or out of the output region. Such an arrangement may represent content that is fixed to some external frame of reference (or not fixed at all).

In addition, the arrangement in FIG. 44 may be understood to show that the output region is limited to roughly the area occupied by the output data in FIG. 42, namely, the upper right corner of displays 4456A and 4456B. As may be seen in FIG. 44, the output data 4401A and 4401B is "cut off"; this may be the case when, for example, a viewer turns far enough that content moves partially out of the display region (or stated differently, when a viewer turns far enough that the display region moves until the content is only partially visible thereon). In more colloquial terms, in FIG. 44 output regions may be seen as being fixed in place and located in the upper right corner only; content (e.g. the sail boat) for those output regions either appears in the upper right corners of the displays 4456A and 4456B or not at all (e.g. being outside the output regions, and so not displayed).

However, other arrangements also may be suitable. With reference to FIG. 45, an arrangement at least somewhat similar to that in FIG. 44 is shown.

In FIG. 45 a viewer 4559 is shown with an apparatus 4550. The viewer 4550 similarly is turned approximately 30 degrees clockwise compared to the viewer 4250 in FIG. 42. In FIG. 45 the output data 4501A and 4501B on first and second displays 4556A and 4556B is again left of the corresponding positions in FIG. 42. However, where in FIG. 44 the output data 4501A and 4501B is shifted partially out of the output regions so as to appear "cut off", in FIG. 45 the output data 4501A and 4501B is present in full but is displaced to the left. Thus, either the output regions in FIG. 45 are sufficiently large as to accommodate such a shift (e.g. covering the entire displays 4556A and 4556B, a broad band along the top edges of displays 4556A and 4556B, etc.), or the output regions in FIG. 45 are themselves movable with respect to the displays 4556A and 4556B and/or with respect to the visual field of the viewer.

Regardless, both FIG. 44 and FIG. 45 illustrate examples wherein a substantial correspondence is not maintained between a first output region and a first portion of the viewer's retina. The output data does change perceptibly (i.e. shifting to the left, though shifting differently in FIG. 44 and FIG. 45) in response to a change in disposition of the viewer's eyes.

In comparing FIG. 44 and FIG. 45, it is noted that the apparent magnitude of the head turns appear similar, while the motion of the output data in FIG. 45 is visibly greater in FIG. 45 than in FIG. 44. In part, the greater displacement in FIG. 45 is used to provide clarity, i.e. to show a large and easily visible displacement of content. However, it is also emphasized that a difference as seen between FIG. 44 and FIG. 45 may be literal in certain instances. On the one hand, a 30 degree head turn may produce a large displacement (e.g. equivalent to 30 degrees) of output data as shown in FIG. 45, corresponding for example content being in effect "fixed in mid-air", or otherwise held to some rigid external frame of reference. However on the other hand, a 30 degree head turn may produce less than 30 degrees of apparent motion, as may be inferred from FIG. 44, corresponding for example to content being fixed neither to the viewer's visual field nor to a rigid external frame of reference. That is, in certain instances a viewer may turn his or her head to the right by (for example) 30 degrees, and may observe an apparent drift of content toward the left, but even so that drift is not required to also be equivalent to 30 degrees. Options are not limited only to "content fixed to the field of view" and "content fixed to the physical world"; intermediate arrangements and/or other behaviors also may be equally suitable.

Figures 46, 47, 48:
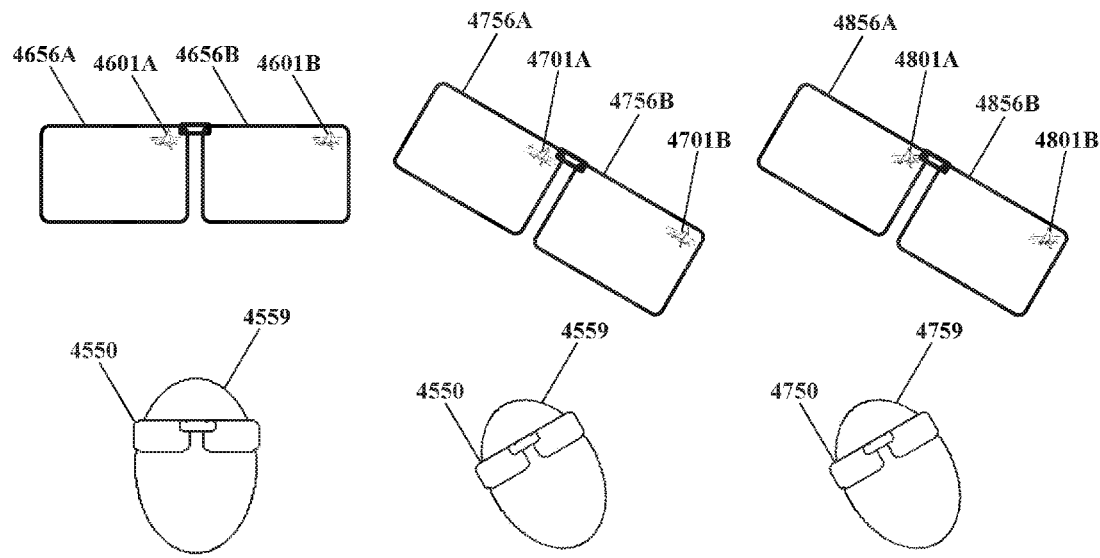
FIG. 46 through FIG. 48 show example arrangements of content displayed to a corner of a head mounted display, responsive to head inclinations by a viewer wearing the head mounted display.

Now with reference to FIG. 46, a viewer 4659 is shown therein wearing an apparatus 3850. The viewer 3859 is oriented such that his or her head is generally vertical. Also in FIG. 46, first and second displays 4656A and 4656B are shown, displaying output data 4601A and 4601B respectively. The first and second output data 4601A and 4601B show a sail boat (e.g. left and right stereo images thereof) disposed in the upper right corner of displays 4656A and 4656B and occupying a small portion thereof.

FIG. 47 and FIG. 48 show two possible arrangements for content similar to that in FIG. 46, including an inclination of the viewer's head.

In FIG. 47, a viewer 4759 is shown wearing an apparatus 4750, the viewer 4750 having inclined his or her head approximately 30 degrees to his or her right as compared with FIG. 46. First and second displays 4756A and 4756B with output data 4701A and 4701B also are shown. The displays 4756A and 4756B are shown inclined approximately 30 degrees to the right. However, the output data 4701A and 4701B in FIG. 47 is substantially similar to the output data 4601A and 4601B in FIG. 46, with regard to the displays 4756A and 4756B. With respect to displays 4756A and 4756B the sail boats in FIG. 47 are not perceptibly different compared with the sail boats in FIG. 46.

Thus in comparing FIG. 46 and FIG. 47 the sail boat is delivered to the same portion of the viewer's field-of-view—i.e. the same portions of the viewer's retinas—and in the same orientation (with respect to the displays, and thus with respect to the viewer) in FIG. 46 and FIG. 47, without a perceptible change in response to the movement of the viewer's eyes as his or her head turns. For FIG. 46 and FIG. 47, a substantial correspondence is maintained between a first output region and a first portion of the viewer's retina, without perceptibly changing the output data in response to a change in disposition of the viewer's eye (or eyes).

Turning now to FIG. 48, a viewer 4859 is shown with an apparatus 4850. The head of the viewer 4850 is inclined approximately 30 degrees to his or her right compared to FIG. 46. Thus, the disposition of the viewer's eyes in FIG. 48 may be understood as being inclined 30 degrees right compared to FIG. 46.

However, where in FIG. 47 the change in eye disposition therein did not produce a change in the apparent position of content, in FIG. 48 the difference in eye disposition compared with FIG. 46 does produce a change in the apparent position of the output data. In FIG. 48 the output data 4801A and 4801B is inclined approximately 30 degrees with respect to the left and right displays 4856A and 4856B, as compared with the arrangement in FIG. 46. The output data 4801A and 4801B in FIG. 48 remains vertical relative to the external environment, although the left and right displays 4856A and 4856B have been inclined.

The arrangement shown in FIG. 48 is as may be expected if the output data 4801A and 4801B were fixed in space: as the viewer inclines his or her head to the right, the output data 4801A and 4801B appears to the viewer to incline to the left. As the visual field of the viewer inclines to the right, the output remains in place with respect to the outside world but (because of the moving visual field) inclines to the left in the viewer's visual field. Thus for a comparison of FIG. 46 and FIG. 48, a substantial correspondence is not maintained between a first output region and a first portion of the viewer's retina. The output data does change perceptibly (i.e. shifting to the left within the visual field) in response to a change in disposition of the viewer's eyes.

FIG. 46 through FIG. 48 are at least somewhat analogous to FIG. 38 through FIG. 40, showing similar arrangements but with content that is displayed with different sizes and locations. No analog to FIG. 41 is shown; given the size and location of the content in FIG. 46 through FIG. 48, an arrangement similar to that in FIG. 41 may be expected to show no content at all, that is, since a small sail boat in a corner as in FIG. 46 through FIG. 48 typically may move completely off-screen by inclining the displays as shown in FIG. 41. As a figure showing only blank displays is of questionable illustrative utility, no analog to FIG. 41 is included herein. However, it is emphasized that the examples shown are not intended to be comprehensive; lack of an illustration should not be considered to be limiting, and should not be considered to suggest that a particular example would not be functional.

Figures 49, 50, 51:
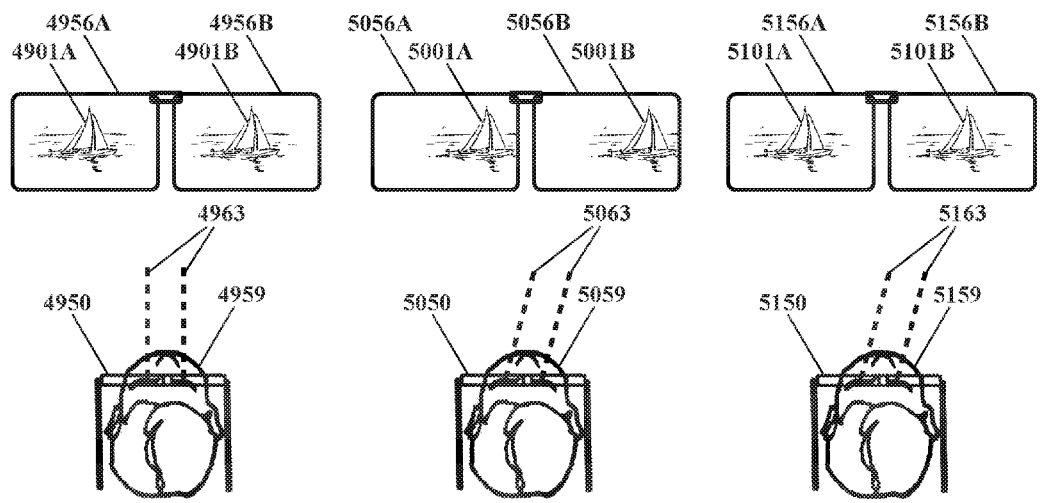
FIG. 49 through FIG. 51 show example arrangements of content displayed to the center of a head mounted display, responsive to eye shifts by a viewer wearing the head mounted display.

Moving on to FIG. 49 through FIG. 51, in certain previous examples it has been assumed for simplicity that a viewer is looking straight ahead, without moving his or her eyes. That is, eye movements was considered only as a function of larger body motions, such as turning or inclining the head. However, motion of the eyes independently of (or in combination with) the head, body, etc., is not excluded. Certain functions—for example, maintaining a substantial correspondence between a first output region and a first portion of the viewer's retina, without perceptibly changing in response to a change in disposition of the viewer's eyes—also may be carried out with respect to movement of eyes alone.

In FIG. 49, a viewer 4959 is shown in a top-down view, wearing an apparatus 4950. First and second displays 4956A and 4956B are shown, displaying output data 4901A and 4901B respectively. The first and second output data 4901A and 4901B show views of a sail boat, as may be seen by a viewer 4959 wearing the apparatus 4950.

As may be seen in FIG. 49, the viewer 4959 is oriented such that his or her head aligns generally forward (upward on the page). In addition, as shown by dashed sight lines 4963 the viewer's eyes also are aligned generally forward (directed upward on the page). The first and second output data 4901A and 4901B show a sail boat (e.g. left and right stereo images thereof) disposed approximately centered within and substantially filling the displays 4956A and 4956B.

Turning to FIG. 50, a viewer 5059 again is shown wearing an apparatus 5050. In FIG. 50, the viewer 5059 is oriented such that his or her head aligns generally forward, as in FIG. 49. However, wherein in FIG. 49 the viewer's eyes also were directed forward, in FIG. 50 the viewer 5059 has his or her eyes directed to the right, as shown by dashed sight lines 5063.

Corresponding to the rightward shift in the sight lines 5063 of the viewer 5059, the output data 5001A and 5001B shown on the displays 5056A and 5056B respectively also is shifted to the right. As may be understood, if a viewer 5059 shifts his or her eyes to the right, and output data 5001A and 5001B (the sail boat) displayed to that viewer 5059 on the displays 5056A and 5056B also is shifted to the right in a corresponding manner, then that output data 5001A and 5001B will appear to the viewer 5059 to remain in place within his or her field of view. That is, sail boats that are centered in the fields of view of a viewer in FIG. 49 also would be centered in the fields of view of the viewer in FIG. 50.

Thus comparing FIG. 49 and FIG. 50, a substantial correspondence may be maintained between a first output region and a first portion of the viewer's retina, without perceptibly changing the output data in response to a change in disposition of the viewer's eye (or eyes).

It is noted that if FIG. 49 and FIG. 50 are considered together as sequential images for one viewer, then the content displayed (the sail boat) is maintained centered within the viewer's field of view by moving the content on the displays. This may be contrasted with the arrangement in FIG. 35 and FIG. 36, which if considered similarly exhibit content being maintained centered in the viewer's field of view by leaving the content stationary on the displays. In both the arrangement of FIG. 49 and FIG. 50 and also the arrangement of FIG. 35 and FIG. 36 a substantial correspondence may be seen to be maintained between a first output region and a first portion of the viewer's retina, without perceptibly changing the output data in response to a change in disposition of the viewer's eye (or eyes); however, the approaches for maintaining that correspondence vary between the arrangement of FIG. 49 and FIG. 50 and the arrangement of FIG. 35 and FIG. 36.

Such a contrast may be understood, in that in the arrangement of FIG. 35 and FIG. 36 the display is moving with the viewer's head (as the viewer turns) but the viewer's eyes are remaining stationary relative to the viewer's head and relative to the displays, while in the arrangement of FIG. 49 and FIG. 50 the displays are not moving but the viewer's eyes are moving relative to the viewer's head and relative to the displays. Thus, even though the same result may be achieved—content remaining stationary from the point of view of the viewer (substantial correspondence being maintained between a first output region and a first portion of the viewer's retina, without perceptibly changing the output data in response to a change in disposition of the viewer's eye)—the implementation for achieving that result may vary.

Thus, it should be understood that leaving output data apparently stationary in a viewer's field of view may imply that the output data remains stationary on a display (as in FIG. 35 and FIG. 36), but this is not required. Similarly, leaving output data apparently stationary in a viewer's field of view may imply that the output data moves on a display (as in FIG. 49 and FIG. 50), but this also is not required. Maintaining substantial correspondence between a first output region and a first portion of the viewer's retina without perceptibly changing the output data in response to a change in disposition of the viewer's eye may include moving output data on a display, and/or may include leaving output data stationary on a display; neither behavior is either required for all possible embodiments, or otherwise limiting. (Similarly, in choosing not to maintain such correspondence as in certain other examples herein, content may be moved on displays, or may not be moved on displays; neither is required or limiting.)

Now with reference to FIG. 51, a viewer 5159 is shown with an apparatus 5150. The eyes of the viewer 5150 are shifted to the right compared with FIG. 49 as may be seen by sight lines 5163, similarly to the arrangement in FIG. 51. However, as may be seen in FIG. 51 the output data 5101A and 5101B on first and second displays 5156A and 5156B has not changed compared with FIG. 49. That is, the sail boats as shown in FIG. 51 are not visibly shifted compared to the sail boats as shown in FIG. 49. As may be understood, if a viewer 5159 shifts his or her eyes to the right, and output data 5101A and 5101B (the sail boat) displayed to that viewer 5159 remains stationary on the displays 5156A and 5156B, then that output data 5001A and 5001B will appear to the viewer 5059 to shift to the left within his or her field of view. That is, sail boats that are centered in the fields of view of a viewer in FIG. 49 would not be centered in the fields of view of the viewer in FIG. 51.

Thus comparing FIG. 49 and FIG. 51, a substantial correspondence may not be maintained between a first output region and a first portion of the viewer's retina, without perceptibly changing the output data in response to a change in disposition of the viewer's eye.

Figure 52:
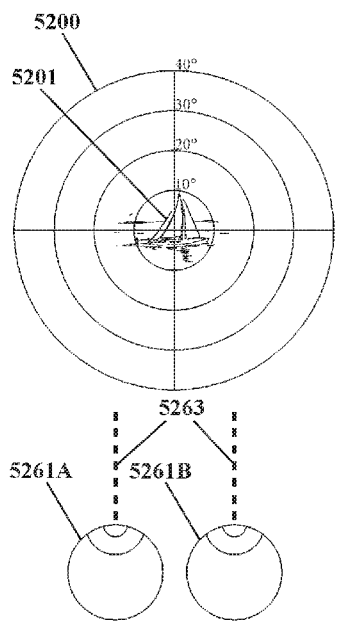
FIG. 52 through FIG. 54 show example dispositions of content in a field of view of a viewer, responsive to eye shifts by the viewer.
Figure 53:
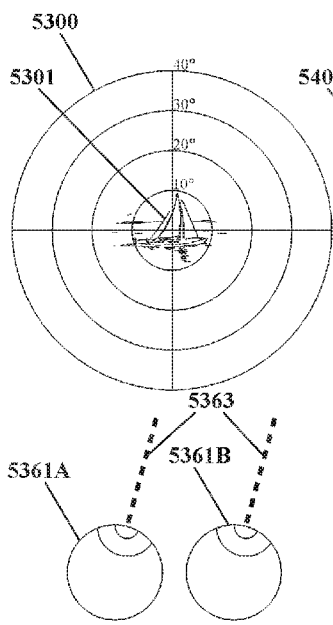
Figure 54:
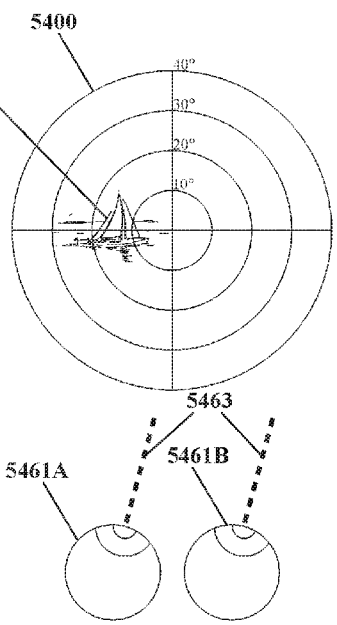

Now with reference to FIG. 52 through FIG. 54, similar eye motions are shown as in FIG. 49 through FIG. 51 respectively, however in FIG. 52 through FIG. 54 content (again sail boats) is shown so as to represent the position of that content within the field of view of the viewer, rather than the position of that content on displays.

In FIG. 52, eyes 5261A and 5261B of a viewer are shown, with sight lines 5263 extending generally upward on the page. Above the eyes and sight lines, an arrangement showing the position of output data 5201 within the field of view 5200 of the viewer also is shown. As may be seen, the output data 5201 is at least approximately centered within the field of view 5200.

In FIG. 53, eyes 5361A and 5361B of a viewer again are shown. Sight lines 5363 for the eyes 5361A and 5361B also are shown, extending upward but also shifted approximately 15 degrees to the right as compared with FIG. 52. Above the eyes and sight lines output data 5301 is shown positioned within the field of view 5300 of the viewer also is shown. Although the sight lines 5363 are shown shifted to the right compared with FIG. 52, the output data 5301 nevertheless is at least approximately centered within the field of view 5300 in FIG. 53.

Thus, considering FIG. 52 and FIG. 53 together sequentially, the output data remains unmoved from the point of view of the viewer (i.e. still centered as shown), even though the viewer's eyes have shifted to the right; the shift in the viewer's eyes has not produced a shift in the position of the sail boats as seen by the viewer. Comparing FIG. 52 and FIG. 53, a substantial correspondence may be maintained between a first output region and a first portion of the viewer's retina, without perceptibly changing the output data in response to a change in disposition of the viewer's eye (or eyes).

The arrangement of FIG. 52 and FIG. 53 thus may be at least somewhat analogous to the arrangement in FIG. 49 and FIG. 50 as described above. For example, an arrangement as in FIG. 49 and FIG. 50 wherein the sail boats are shifted on the displays in response to eye movement may produce an arrangement as in FIG. 52 and FIG. 53 wherein the sail boats remain centered in the field of view despite such eye movement. However, although an arrangement as in FIG. 49 and FIG. 50 may be suitable to produce an arrangement as in FIG. 52 and FIG. 53, this is an example only, and other arrangements may be equally suitable.

It is noted that an analog between FIG. 49 and FIG. 50 compared with FIG. 52 and FIG. 53 may not be (and is not required) to be exact. For example, in FIG. 50 the sail boats may be seen to have been "clipped" at the right, having been shifted to the right far enough that wave marks on the right edge of the sail boats may no longer be on the surfaces of the displays. In such instance, a viewer may no longer see such far-right wave markings, since the far-right edge of the image would no longer be displayed. This is not reflected in FIG. 53, which does show the full sail boat image without clipping. Such clipping may be present in certain circumstances and/or in certain embodiments, but is not required and may not necessarily be present.

It is noted that where present, clipping may exist both in terms of content as a whole (for example, clipping off the right edge of an image) and/or in terms of dimensionality or other features of content. That is, if content is displayed in stereo 3D with stereo displays (e.g. left and right), and the right edge of an image is clipped off in one display but not in the other, then the image may remain visible, but may no longer appear in 3D (since a stereo pair of the right edge may no longer be resolved, with that right edge visible on only one of the stereo displays).

Artifacts such as clipping may for example exist, as described, due to physical limits of hardware (e.g. displays of finite dimensions). However, other factors also may produce and/or contribute to such artifacts.

Regardless of the particular manner and/or source of manifestation, clipping and/or other image artifacts may exist and/or may be considered acceptable in certain embodiments even if a substantial correspondence otherwise is maintained between a first output region and a first portion of the viewer's retina, without perceptibly changing the output data in response to a change in disposition of the viewer's eye. That is, for at least certain embodiments, such clipping or other artifacts may not necessarily be considered to be violations of maintaining such correspondence, in themselves; a clipped image, for example, may nevertheless still be considered to exhibit maintaining such substantial correspondence.

Turning to FIG. 54, eyes 5461A and 5461B of a viewer again are shown. Sight lines 5463 for the eyes 5461A and 5461B are shown, extending upward but also shifted approximately 15 degrees to the right. Output data 5401 is shown positioned within the field of view 5400 of the viewer also is shown. As may be seen, the output data 5401 is shifted approximately 15 degrees to the left within the field of view 5400 as compared with in FIG. 52. Thus, with the eyes shifted right by 15 degrees, the content as viewed appears shifted left also by 15 degrees.

A comparison of FIG. 52 with FIG. 54 may be at least somewhat analogous to a comparison of FIG. 49 with FIG. 51. For example, an arrangement as in FIG. 49 and FIG. 51 wherein sail boats are stationary on displays despite eye movement by a viewer may produce an arrangement as in FIG. 52 and FIG. 54 wherein the sail boats shift left in a viewer's field of view in response to the viewer moving his or her eyes to the right. However, although an arrangement as in FIG. 49 and FIG. 51 may be suitable to produce an arrangement as in FIG. 52 and FIG. 54, this is an example only, and other arrangements may be equally suitable.

Now with reference to FIG. 55 through FIG. 60, therein arrangements somewhat similar to those in FIG. 35 through FIG. 37 and FIG. 49 through FIG. 51. However, where FIG. 35 through FIG. 37 and FIG. 49 through FIG. 51 show content (a sail boat) on stereo display screens with various head and eye positions of a viewer, FIG. 55 through FIG. 60 show the content itself as may be seen by the viewer. The output of a see-through stereo pair displays (such as on a head mounted display device) may in fact be two images of a sail boat (for example) on the surfaces of those displays; however, in viewing such output a viewer typically may fuse the two stereo images together and perceive a single sail boat disposed in space. FIG. 55 through FIG. 60 illustrates such a "as perceived" views, rather than showing content on individual displays or in comparison with a mapped field of view as in certain previous examples. (However, although FIG. 55 through FIG. 60 illustrate an arrangement that may include fused stereo content, embodiments are not limited only to stereo content.)

Figure 55:
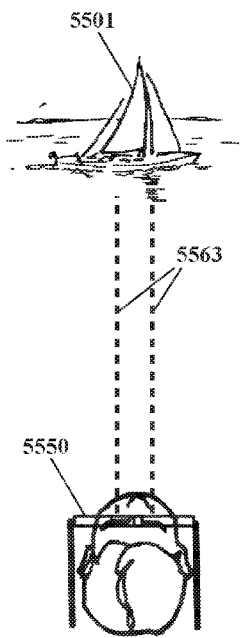
FIG. 55 through FIG. 57 show example appearances of content to a viewer, responsive to head turns by the viewer.

In FIG. 55, a viewer 5550 is shown. (A head mounted display is shown, but is not numbered, as the focus is on the viewer's view rather than on the particulars of how that view is achieved, e.g. by outputting two stereo images that the viewer then fuses.) As may be seen from sight lines 5563, the viewer 5550 is looking substantially straight ahead (upward on the page). Visual content 5501 in the form of a sail boat is also illustrated, disposed generally centered with regard to the viewer's 5550 sight lines 5563.

In FIG. 56, a viewer 5650 is again shown. The viewer's 5650 head is turned to the right compared with FIG. 55, and as seen from sight lines 5663 in FIG. 56 the viewer 5650 may be understood to be looking some angle to the right. Visual content 5601 in the form of a sail boat is also illustrated, disposed generally centered with regard to the viewer's 5650 sight lines 5663 despite the viewer's 5650 head being turned to the right.

In FIG. 57, a viewer 5750 is again shown. The viewer's 5750 head is turned to the right compared with FIG. 55, and as seen from sight lines 5763 in FIG. 57 the viewer 5750 may be understood to be looking some angle to the right. Visual content 5701 in the form of a sail boat is illustrated, but is disposed offset to the left with regard to the viewer's 5750 sight lines 5763.

Figure 56:
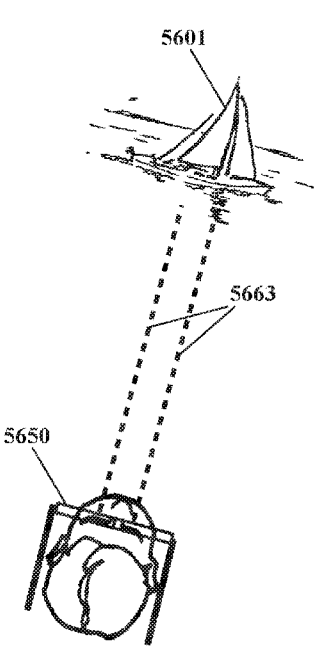

Considering FIG. 55 and FIG. 56 as sequential images, such an arrangement may represent content as viewed by the viewer if a substantial correspondence is maintained between a first output region and a first portion of the viewer's retina, without perceptibly changing the output data in response to a change in disposition of the viewer's eyes. If such correspondence is maintained, then as the viewer turns his or her head, the content may appear to remain in place as seen by the viewer, without changing in response to that head turn.

Figure 57:
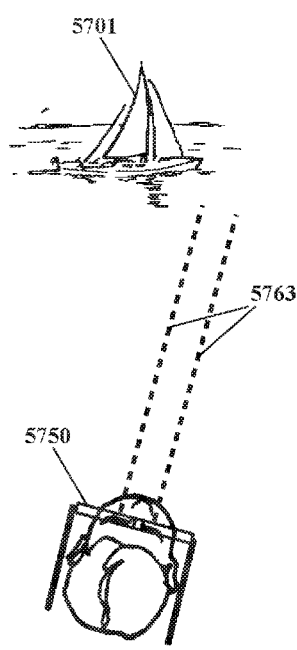

Considering FIG. 55 and FIG. 57 as sequential images, such an arrangement may represent content as viewed by the viewer under different circumstances: namely, if substantial correspondence is not maintained between a first output region and a first portion of the viewer's retina. If such correspondence is not maintained, then as the viewer turns his or her head, the content may appear to remain fixed relative to the outside world (or some other external frame of reference), changing in position in response to the head turn.

Figure 58:
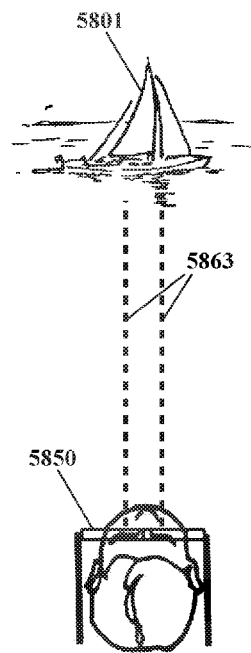
FIG. 58 through FIG. 60 show example appearances of content to a viewer, responsive to eye shifts by the viewer.

Similarly, in FIG. 58, a viewer 5850 is shown. As may be seen from sight lines 5863, the viewer 5850 is looking substantially straight ahead (upward on the page). Visual content 5801 in the form of a sail boat is also illustrated, disposed generally centered with regard to the viewer's 5850 sight lines 5863.

In FIG. 59, a viewer 5950 is again shown. The viewer's 5950 head is unchanged compared with FIG. 58, but as seen from sight lines 5963 in FIG. 59 the viewer 5950 may be understood to be looking some angle to the right (e.g. by shifting his or her eyes to the right). Visual content 5901 in the form of a sail boat is also illustrated, disposed generally centered with regard to the viewer's 5950 sight lines 5963 despite the viewer's 5650 gaze being directed to the right.

In FIG. 60, a viewer 6050 is again shown. Again as seen from sight lines 6063 the viewer 6050 may be understood to be looking some angle to the right. Visual content 6001 in the form of a sail boat is illustrated, but is disposed offset to the left with regard to the viewer's 6050 sight lines 6063.

Figure 59:
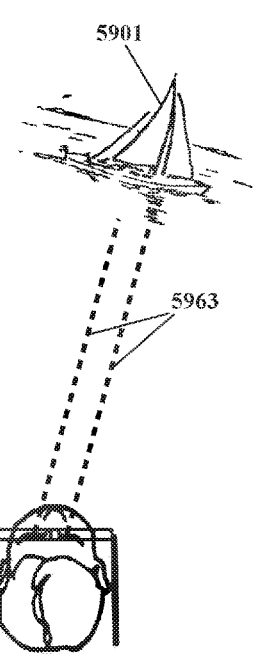

Considering FIG. 58 and FIG. 59 as sequential images, such an arrangement may represent content as viewed by the viewer if a substantial correspondence is maintained between a first output region and a first portion of the viewer's retina, without perceptibly changing the output data in response to a change in disposition of the viewer's eyes. If such correspondence is maintained, then as the viewer shifts his or her eyes, the content may appear to remain in place as seen by the viewer, without changing in response to that eye shift.

Figure 60:
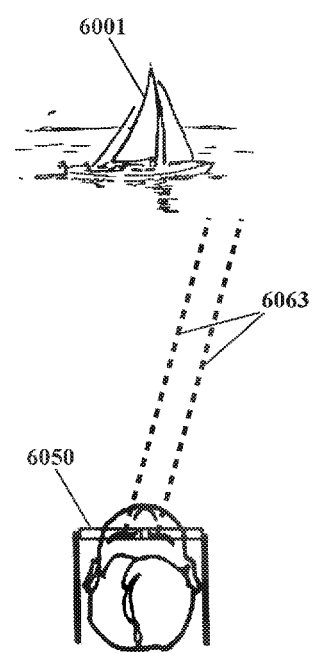

Considering FIG. 58 and FIG. 60 as sequential images, such an arrangement may represent content as viewed by the viewer under different circumstances: namely, if substantial correspondence is not maintained between a first output region and a first portion of the viewer's retina. If such correspondence is not maintained, then as the viewer shifts his or her eyes, the content may appear to remain fixed relative to the outside world (or some other external frame of reference), changing in position in response to the eye shift.

With regard to eye motion, head motion, body motion, etc., although certain examples have been presented herein—such as head turns left or right, eye shifts left or right, etc.—these should not be considered as limiting. Other motions, including but not limited to eye shifts up or down, head tilts up or down, etc. may be equally suitable. In addition, motions not necessarily by the user also may be considered, for example the motion of a user while the user is in an automobile in motion, an aircraft in flight, etc. Furthermore, arrangements are not limited only to individual motions; thus, correspondence between (for example) a first output region and a first portion of a viewer's retina may be maintained (or not maintained) as described, given a combination of head turns, eye shifts, etc.

Figure 61:
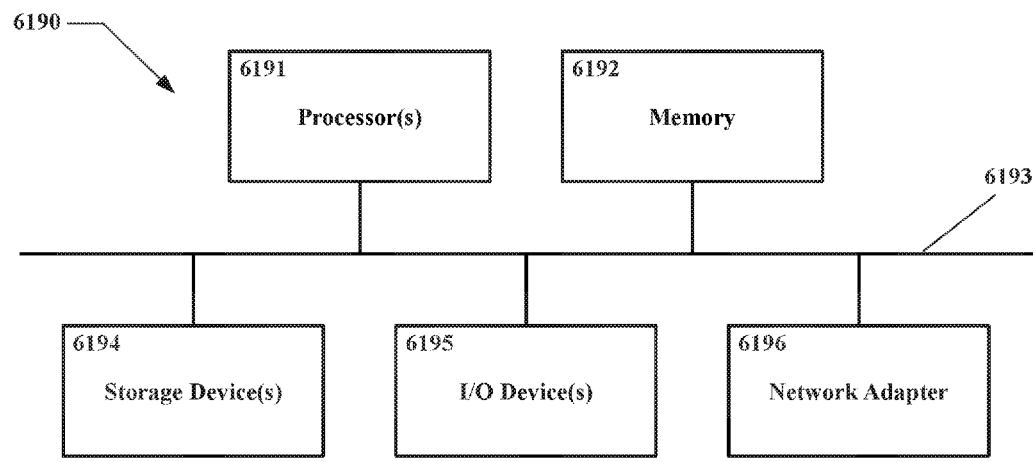
FIG. 61 shows an example block diagram of a processing system that may implement operations of various embodiments.

FIG. 61 is a block diagram of an apparatus that may perform various operations, and store various information generated and/or used by such operations, according to an embodiment of the disclosed technique. The apparatus may represent any computer or processing system described herein. The processing system 6190 is a hardware device on which any of the other entities, components, or services depicted in the examples of FIG. 1 through FIG. 60 and FIG. 62 through FIG. 63 (and any other components described in this specification) may be implemented. The processing system 6190 includes one or more processors 6191 and memory 6192 coupled to an interconnect 6193. The interconnect 6193 is shown in FIG. 61 as an abstraction that represents any one or more separate physical buses, point to point connections, or both connected by appropriate bridges, adapters, or controllers. The interconnect 6193, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 6191 is/are the central processing unit of the processing system 6190 and, thus, control the overall operation of the processing system 6190. In certain embodiments, the processor(s) 6191 accomplish this by executing software or firmware stored in memory 6192. The processor(s) 6191 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 6192 is or includes the main memory of the processing system 6190. The memory 6192 represents any form of random access memory (RAM), read-only memory (ROM), flash memory, or the like, or a combination of such devices. In use, the memory 6192 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 6191 through the interconnect 6193 are a network storage adapter 6194, a storage device(s) 6195, and I/O device(s) 6196. The network adapter 6194 provides the processing system 6190 with the ability to communicate with remote devices over a network and may be, for example, an Ethernet adapter or Fibre Channel adapter. The network adapter 6194 may also provide the processing system 6190 with the ability to communicate with other computers within the cluster. In some embodiments, the processing system 6190 may use more than one network adapter to deal with the communications within and outside of the cluster separately.

The I/O device(s) 6196 can include, for example, a keyboard, a mouse or other pointing device, disk drives, printers, a scanner, and other input and/or output devices, including a display device. The I/O device(s) 6196 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 6192 may be implemented as software and/or firmware to program the processor(s) 6191 to carry out actions described herein. In certain embodiments, such software or firmware may be initially provided to the processing system 6190 by downloading from a remote system through the processing system 6190 (e.g., via network adapter 6194).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 6195 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

Figure 62:
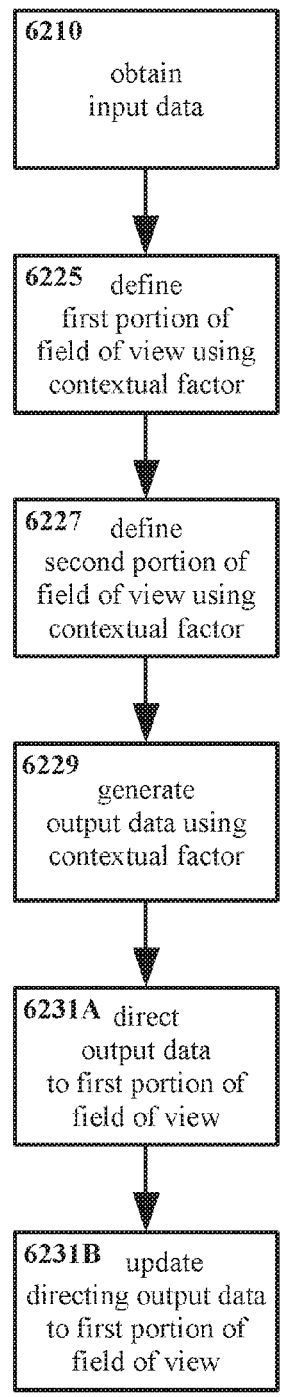
FIG. 62 shows an example method for selectively outputting data to a viewer, enabling output data to remain stationary in the viewer's field of view.

Now with reference to FIG. 62, therein an example method for selectively outputting data to a viewer is shown. Certain other example methods and steps thereof have been shown previously, such as in FIG. 1. However, the arrangement shown in FIG. 62 (and in certain other examples as described below) addresses a particular subset of arrangements for selectively outputting data to a viewer, that is, that enable content to be displayed to a viewer, wherein that content does not move in the viewer's field of view responsive to motions by the viewer. For example, a sail boat displayed to the upper right corner of a viewer's field of view may remain in the upper right corner of that viewer's field of view, despite the viewer turning his or her head, shifting his or her eyes, walking, etc. Stated differently, output data directed to a viewer's field of view may remain perceptibly changed responsive to a change in the disposition of that viewer's field of view.

It is noted that certain previous examples herein have addressed similar functionality in different terms, e.g. maintaining a substantial correspondence between a first output region on a display and a first portion of a retina. Insofar as the human field of view is defined by and/or maps to the human retina, it may be understood that referring to a portion of the field of view may be equivalent or at least similar to referring to a portion of the retina. Thus, in at least certain instances the functional matter of "where the content is displayed" may be described with respect to the field of view or the retina, without necessarily conflicting. Other descriptions likewise may be suitable, for example in certain instances directing output to a particular portion of a near-eye display may equate or be similar to directing that output to some portion of the retina and/or some portion of the field of view.

Thus, although terminology may be varied for different examples, it is emphasized that such a difference in terminology does not necessarily represent a conflict, but rather illustrates that a substantial degree breadth may exist in not only the possible embodiments but also in the manners in which such embodiments may be conceptualized and/or described.

Although the example in FIG. 62 addresses directing output data to portions of the field of view and maintaining that direction, while certain other examples may address portions of the retina and a correspondence with regions on a display, these are presented so as to emphasize a range of variations, and are not either necessarily exclusive of one another or necessarily exhaustive.

With regard specifically to FIG. 62, it is noted that certain numbered steps that may be considered analogous to steps in other examples are presented in FIG. 62 in a different order than in previous examples. As may be understood, at least certain steps presented not only in FIG. 62 but in other examples herein may be re-ordered, for example while in FIG. 62 output data is generated (in step 6229) after defining portions of the field of view (6225 and 6227), in other embodiments defining portions of the field of view and/or the retina may take place before output data is generated.

Turning to the steps in FIG. 62, input data is obtained 6210. Obtaining input data has been described previously herein.

A first portion of the field of view of a viewer is defined 6225, at least in part using a contextual factor. That is, some part of a visual field is specified, such as the upper right corner. The definition may be geometric, e.g. "from 30 to 60 degrees counterclockwise of vertical, and from 30 to 50 degrees radially offset from center". (Such angles may be understood for example with regard to FIG. 2.), may be anatomical, e.g. "the foveal region", or through other parameters.

Contextual factors have been described previously herein. The nature of the contextual factor considered in defining 6225 the first portion of the field of view is not limited, and may include (but is not limited to) user postures, user gestures, actions by the user, environmental features, etc.

The manner in which the contextual factor is considered and/or otherwise used also is not limited. For example, the contextual factor may be considered as to whether the contextual factor meets some standard, with the determination leading to different definitions 6225 of the first portion of the field of view if the contextual factor does or does not meet the standard. (Such an approach has been presented in certain previous examples herein.) However, other arrangements also may be suitable.

A second portion of the field of view of the viewer is defined 6227 again at least in part using a contextual factor. As with the first portion, the second portion may be defined 6227 geometrically, anatomically, etc.

Defining 6225 the first portion of the field of view and/or defining 6227 the second portion of the field of view may be at least somewhat analogous to defining first and second regions of a display (e.g. for arrangements wherein the display defines what is visible in different parts of the field of view), defining first and second portions of a retina, (e.g. insofar as retinal extent and/or sensitivity may define the field of view) etc., as described previously herein.

Continuing in FIG. 62, output data is generated 6229 from the input data, again at least in part using a contextual factor. Generation of output data also has been described previously herein.

Typically though not necessarily, the same contextual factor may be considered in defining 6225 the first portion of the field of view, in defining 6227 the second portion of the field of view, and in generating 6229 the output data from the input data. However, this is not required, and arrangements wherein two or more different contextual factors are used for each of the determinations (and/or wherein two or more contextual factors are considered for each determination) may be equally suitable.

Still with reference to FIG. 62, output data is directed 6231A to the first portion of the field of view, limited to that first portion of the field of view. That is, visual content (in certain previous examples herein illustrated as a sail boat) is directed to that part of the field of view previously defined 6225 to be the first portion, e.g. the upper right corner, the foveal region, etc.

In addition, although not positively shown as a step in FIG. 62, it will be understood that with the output data directed 6231A specifically to the first portion of the field of view, it follows that the output data is not directed to the second portion of the field of view in such instance. Thus, the second portion of the field of view may be understood to be left unobstructed by the output data.

Still with reference to FIG. 62, subsequent to a change in the disposition of the field of view—e.g. when the viewer shifts his or her eyes, turns his or her head, otherwise moves, etc.—an update is made 6231B to the directing of the output data, such that the output data continues to be directed to the first region of the viewer's field of view. Thus, the output data as viewed by the viewer does not perceptibly change in response to the change in the disposition of the viewer's field of view. For example, if the first output region is the upper right portion of the viewer's field of view, and the output data is a graphical representation of a sail boat, then that sail boat will continue to appear in the upper right of the viewer's field of view even if the viewer turns his or her head, shifts his or her eyes, etc.

Figure 63:
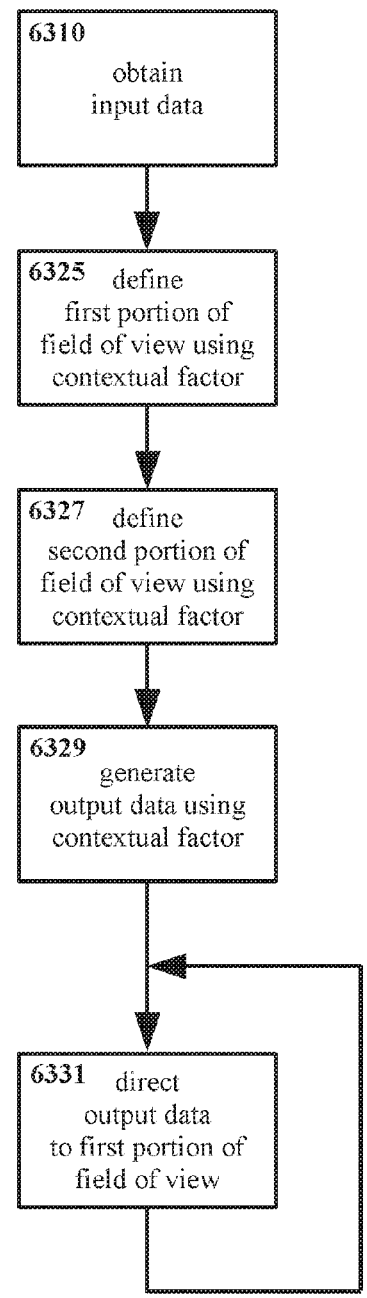
FIG. 63 shows an example method for selectively outputting data to a viewer enabling output data to remain stationary in the viewer's field of view, displayed as a loop.

Turning to FIG. 63, another example method for selectively outputting data to a viewer is shown therein. Where in FIG. 62 the updating of the direction of output data was considered as a positive step (namely 6231B, illustrated distinctly from the original direction of output data in step 6231A), in FIG. 63 a loop is shown, accomplishing a similar result.

In FIG. 63, input data is obtained 6310, and first and second portions of a viewer's field of view are defined 6325 and 6327 considering a contextual factor. Output data is generated 6329 from the input data, also considering a contextual factor. These steps are at least somewhat similar to analogous steps described previously with respect to FIG. 62.

Continuing in FIG. 63, the output data is then directed 6331 to the first portion of the field of view. Previously in the example of FIG. 62, output data was then updated in being directed to the first portion of the field of view. However in FIG. 63, rather than illustrating updating as a distinct step separate from the step of directing 6331 the output data to the first portion of the field of view (as in FIG. 62), as may be seen the method in FIG. 63 loops to repeat that step of directing 6331 the output data to the first portion of the field of view.

Although the examples of FIG. 62 and FIG. 63 may be described and/or illustrated differently, in terms of the functions performed the arrangements shown in FIG. 62 and FIG. 63 may be similar, or even equivalent. More generally, in at least certain instances (including but not limited to examples presented elsewhere herein) an indication that steps are repeated may be equivalent or similar to positive depictions of such repetition as distinct steps. The particulars of an arrangement by which a given example is presented should not be considered limiting, and should not be considered to exclude other possibilities.

In addition, although FIG. 62 and FIG. 63 refer to arrangements for selectively outputting data to a viewer in such manner that the output data does not change perceptibly in response to a shift in the field of view of the viewer, as noted with regard to previous examples such an arrangement is not limiting. Other arrangements, including but not limited to arrangements wherein output data is fixed with regard to some external frame of reference, and/or otherwise does change perceptibly in response to a shift in the field of view of the viewer, may be equally suitable.

Figure 64:
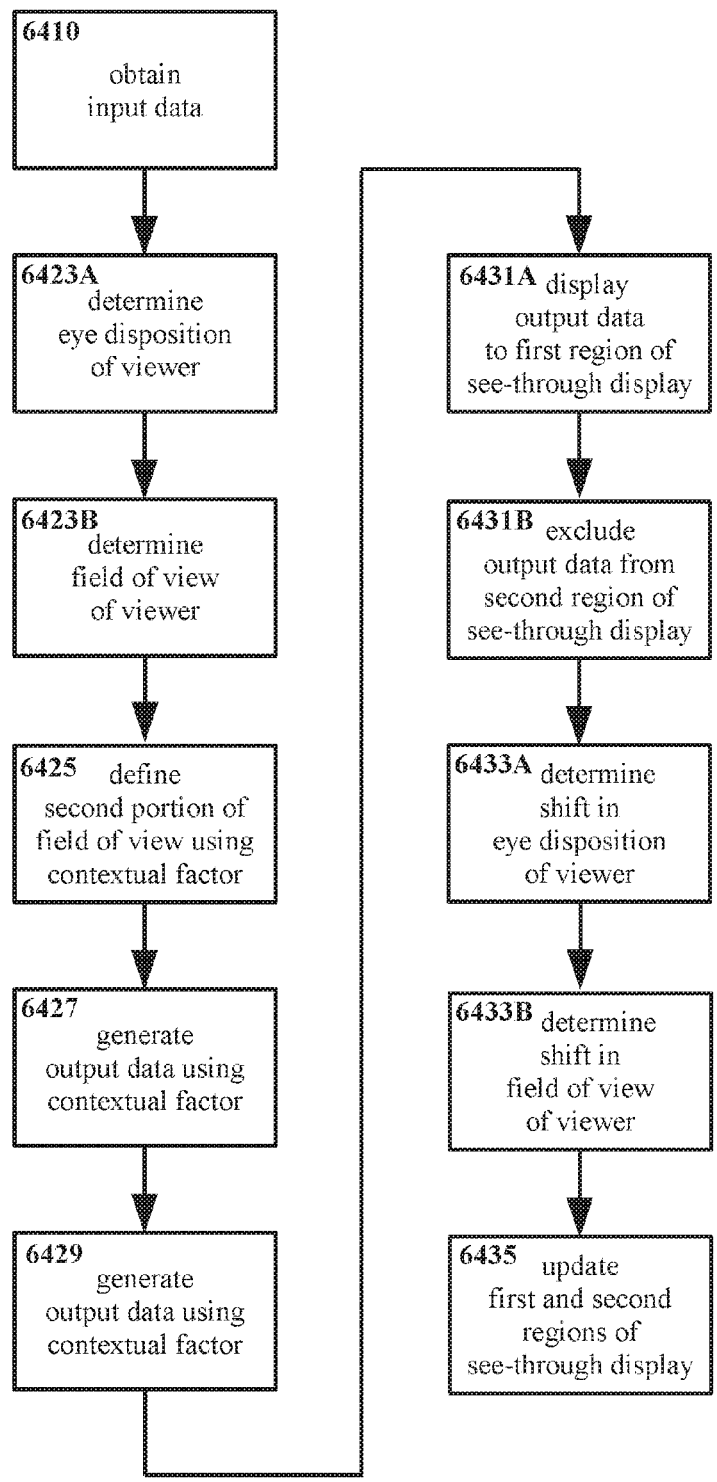
FIG. 64 shows an example method for selectively outputting data to a viewer enabling output data to remain stationary in the viewer's field of view, with regard to a near-eye see-through display.

Now with reference to FIG. 64, another example method for selectively outputting data to a viewer is shown therein. The arrangement in FIG. 64 may bear at least some similarity to that in FIG. 62 and FIG. 63, however in FIG. 64 the arrangement is specific to use of a see-through, near-eye display such as may be incorporated into a head mounted display or other wearable device.

In FIG. 64, input data is obtained 6410. The disposition of an eye of a viewer is determined 6423A. For example, a digital camera or other imager may be aimed at the eye of the viewer to determine the orientation of the eye, absolute position sensors such as GPS may be used to determine the position of the eye (e.g. when the position of the eye relative to a GPS sensor also is known), motion sensors such as gyroscopes and accelerometers may be used to determine the position and/or orientation of the eye based on some starting disposition, etc. Other approaches also may be suitable, including but not limited to glint detection (e.g. observing light reflecting from the eye and determining the eye orientation based thereon), biometric approaches (e.g. detecting electrical signals from muscles controlling the eye), etc.

From the disposition of the eye, the field of view of that eye of the viewer also is determined 6423B. For example, once the disposition of a viewer's eye is known from step 6423A, the field of view of that eye may be determined 6423B through general information regarding the human field of view (e.g. using some standard such as that shown in FIG. 2), through having previously measured the field of view of the particular viewer in question, etc.

Although as a particular example FIG. 64 shows an arrangement wherein the arrangement of the field of view is determined based on the disposition of the eye, this is an example only. In certain embodiments, it may be possible and/or advantageous to determine the field of view without first determining the disposition of the eye. For example, the retina may be imaged through the pupil, and the field of view determined by examination of the retina. Other approaches also may be suitable.

Continuing in FIG. 64, a first portion of the field of view is determined 6425 using a contextual factor, and a second portion of the field of view is determined 6427 using a contextual factor. Output data is then generated 6429 also using a contextual factor.

The output data is displayed 6431A to a first region of a see-through near-eye display, with that first region substantially corresponding with the first portion of the field of view. That is, when displaying 6431A the output data to that first region of the display, the output data appears to the viewer in the first portion of the viewer's field of view. For example, assuming a viewer is looking straight ahead at a display disposed directly in front of his or her eye, displaying output data such as an image of a sail boat to the upper right part of the display may result in that sail boat being seen by the viewer in the upper right of his or her field of view. (The particulars may vary from one embodiment to another. For example, the shape, size, and curvature (if any) of the display, the distance from the viewer's eye to the display, and/or other factors may affect the precise relationship between where data appears on the display and where the viewer sees that data in his or her field of view. A mathematical or other "transform" may be useful in certain embodiments, so as to map where and how output data is directed on a display so as to present that output data to a particular area of the viewer's field of view and/or retina. However, a variety of approaches for producing and/or determining correspondence between display and field of view may be suitable, and the particulars of such approaches are not limiting.)

Still with reference to FIG. 64, the output data is excluded 6431B from the second region of the see-through display, with the second region of the display substantially corresponding with the second portion of the field of view such that the output data does not obstruct the second portion of the field of view. As noted, in certain embodiments such lack of obstruction of the second portion of the field of view may be considered implicit from limiting output to the first portion of the field of view, i.e. insofar as output limited to one part of the field of view may be understood not to obstruct another part of the field of view. Nevertheless, for illustrative purposes the exclusion 6431B is shown as a positive step in the example of FIG. 64.

Moving on in FIG. 64, a shift in the eye disposition is determined 6433A. (This may presume that such a shift in eye disposition takes place, though the shift itself is not necessarily part of the example method shown, and is not explicitly identified as a step thereof in FIG. 64.) A shift in eye disposition may represent a change in the eye orientation within the viewer's head, e.g. the viewer looking up, down, left, right, etc. by moving his or her eyes. However, a shift in eye disposition also may represent the viewer turning his or her head or body, walking or running, sitting in a moving vehicle, etc.

A corresponding shift in the field of view of the viewer is determined 6433B based on the shift in his or her eye position.

The first and second regions of the see-through display are updated 6435 in response to the shift in the viewer's field of view, for example so that the position of the output data in the viewer's field of view does not perceptibly change. That is, where output data is displayed (the first region) and where output data is excluded (the region) may be updated, and may change, if and when the disposition of the viewer's eyes and/or the viewer's field of view shifts. For example, if the viewer shifts his or her eyes to the left, the positions, extents, etc. of the first and second regions also may shift.

The precise manner in which the first and second regions of the display may change may vary from one embodiment to another, and from one situation to another for a given embodiment. (For example, in comparing FIG. 35 and FIG. 36 no shift in the position of displayed output data on the displays is indicated for a head turn to the right, while in comparing FIG. 49 and FIG. 50 a shift in the position of display output data on the displays is indicated for an eye shift also to the right, even though in both instances the output data may not change perceptibly in its position in the viewer's field of view.)

In addition, it is emphasized that the update 6435 does not necessarily require a change in where output data is displayed. For example, in comparing FIG. 35 and FIG. 36, a viewer may turn his or her head, with the result that the disposition of the viewer's eyes and consequently the viewer's field of view may change. However, as described with regard to FIG. 35 and FIG. 36, the output data—shown as a sail boat—does not shift on the displays shown. While first and second regions are not explicitly identified in FIG. 35 and FIG. 36, if the position of the sail boat on the displays does not change, then it may be understood that a first region that defines where that sail boat is to be displayed also may not change. Even if the output data does not change perceptibly when a viewer shifts his or her eyes and/or field of view, it does not necessarily imply that an update to where/how the output data is displayed necessarily implies a change, per se, in where/how the output data is displayed.

Thus, although the first and/or second regions may be updated 6435 subsequent to and/or responsive to a change in eye disposition and/or field of view, such an update does not necessarily imply a change to the first and/or second regions. The first and/or second regions may or may not change as part of such an update; the update may merely be "re-evaluation", or a review of whether the first and second regions still are suited to deliver the output data to the desired first and second portions of the viewer's field of view. Although change in the first and/or second regions is permitted, change is not required in all instances.

With regard to FIG. 64 overall, as noted previously it may be equivalent or at least similar to consider the update 6435 as being a loop, rather than as a discrete step unto itself. For example, it may be at least comparable to configure FIG. 64 so as to exclude step 6435, but to loop the method from step 6433 back to (for example) step 6431A, so as to perform such an update by repeating steps already shown. Other arrangements also may be suitable.

Figure 65:
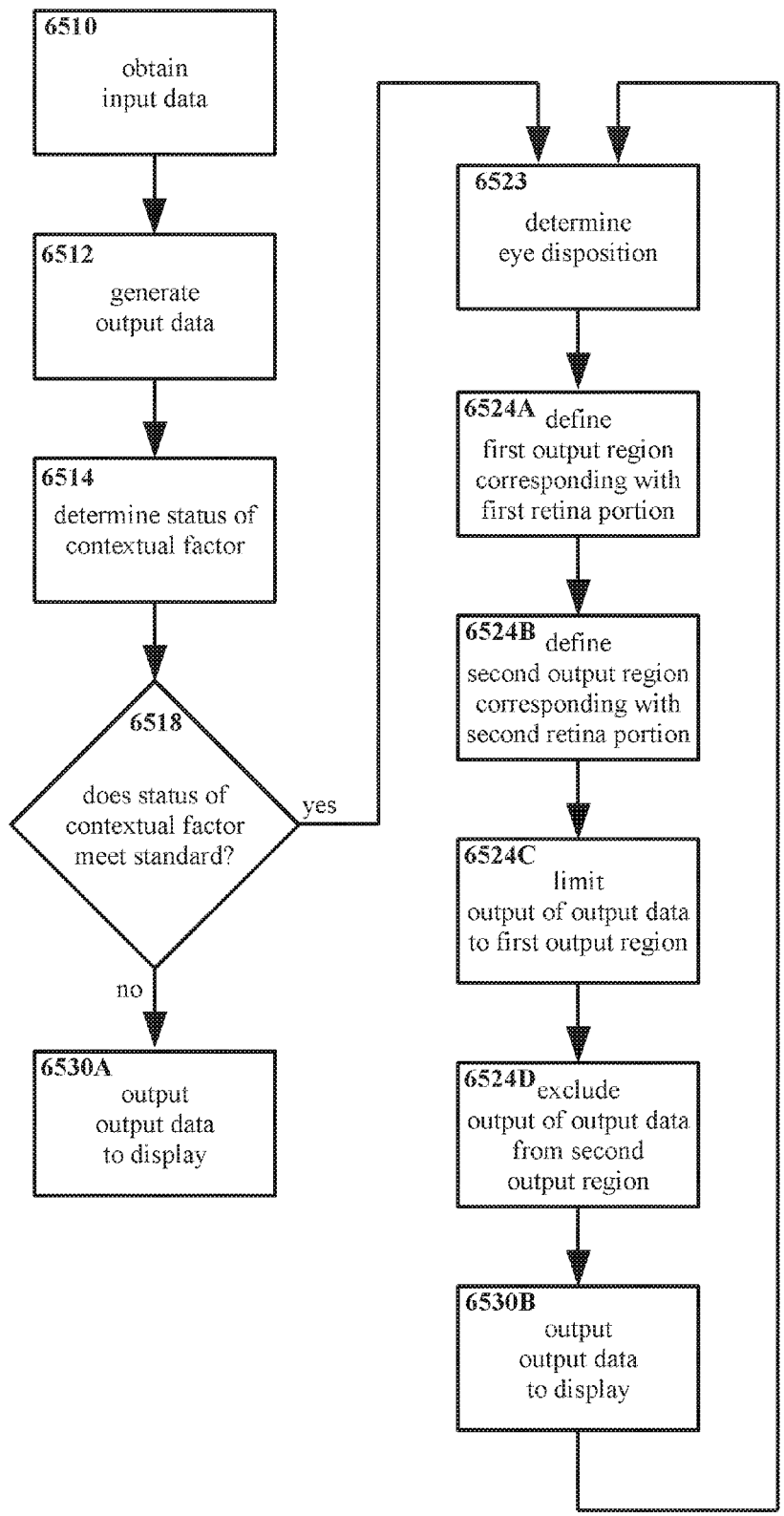
FIG. 65 shows another example method for selectively outputting data to a viewer enabling output data to remain stationary in the viewer's field of view.

Now with reference to FIG. 65, another example method for selectively outputting data to a viewer is shown therein. The arrangement in FIG. 65 may be at least somewhat similar to certain previous examples, such as FIG. 25.

In FIG. 65, input data is obtained 6510. Output data is generated 6512 from the input data. The status of a contextual factor is determined 6514.

An evaluation 6518 is made as to whether the contextual factor meets a standard therefor. If the evaluation 6518 is negative—if the contextual factor does not meet the standard—then the example method in FIG. 65 continues with outputting 6530A the output data to a display.

If the evaluation 6518 is positive—if the contextual factor does meet the standard—then the method as shown continues with determining 6523 eye disposition.

Collectively, steps 6524A through 6524D may be considered as transformation of the output data. However, for purposes of clarity the several operations referenced are illustrated separately in FIG. 65. A first output region is defined 6524A, substantially corresponding with a first portion of a retina of a viewer. A second output region is also defined 6524B, substantially corresponding with a second portion of a retina of a viewer. The output data is limited 6524C to output in the first region, and the output data is excluded 6524D from output in the second region.

The output data is outputted 6530B to the display.

It is noted that although both steps 6530A and 6530B are shown as outputting output data to the display, for clarity the steps are shown separately in FIG. 65. Steps 6530A and 6530B are shown as being subsequent to alternate possibilities of the evaluation in step 6518, and in addition as described below step 6530B is illustrated as part of a loop, which in the example shown does not necessarily repeat back in such manner as to include 6530A.

Continuing in FIG. 65, after outputting 6530B the output data to the display the method as shown loops back to again determine 6523 the eye disposition. In effect, the arrangement shown in FIG. 65 is updating the first and second regions, subsequent to changes in eye disposition. Thus, a substantial correspondence may be maintained between the first output region and the first portion of the retina without perceptibly changing the output data responsive to the change in disposition of said eye. Likewise, a substantial correspondence may be maintained between the second output region and the second portion of the retina.

In the example arrangement shown in FIG. 65, if the contextual factor does not meet the standard, the output data is simply outputted, and no further steps are shown. However, such an arrangement is permissible, but is not required. Additional features, functions, etc. may be performed.

Figure 66:
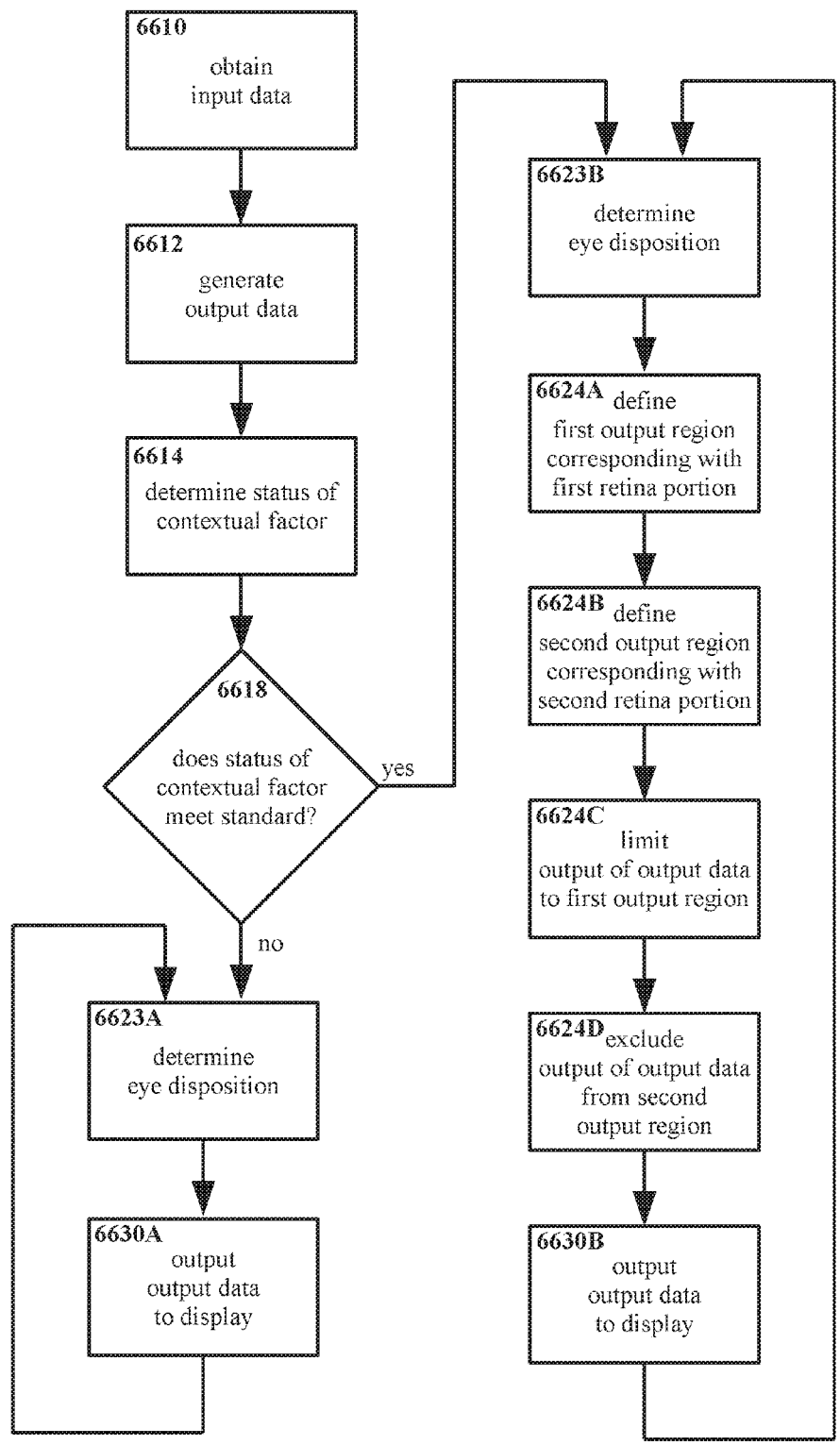
FIG. 66 shows another example method for selectively outputting data to a viewer enabling output data to remain stationary in the viewer's field of view, for multiple options regarding satisfaction of a contextual factor.

For example, with reference to FIG. 66, input data is obtained 6610. Output data is generated 6612 from the input data. The status of a contextual factor is determined 6614. An evaluation 6618 is made as to whether the contextual factor meets a standard therefor. If the evaluation 6618 is negative—if the contextual factor does not meet the standard—then the example method in FIG. 66 continues with determining eye disposition 6623A, followed by outputting 6630A the output data to a display. The method then loops back to determine the eye disposition 6623A again, and repeats (perhaps indefinitely).

Thus in the arrangement of FIG. 66, even for an arrangement wherein the contextual factor does not meet the standard, output data may be updated in response to changes in eye disposition, and relationships based thereupon maintained. For example, even if the output data is not transformed (e.g. as in steps 6624A through 6624D collectively, described below), the output data nevertheless may be displayed and updated in such fashion that the output data does not perceptibly change in response to changes in eye disposition. Thus, "keeping content in the same place" in a viewer's field of view, and/or other behaviors, is not necessarily limited only to instances wherein some contextual factor is satisfied. Other arrangements also may be equally suitable.

Still with reference to FIG. 66, if the evaluation 6618 is positive—if the contextual factor does meet the standard—then the method as shown continues with determining 6623B eye disposition. (As noted with regard to FIG. 65 and steps 6530A and 6530B, steps 6623A and 6623B may be similar or even identical, but are depicted separately in FIG. 66 for clarity due to issues regarding looping within the method as shown.)

Again, collectively steps 6624A through 6624D may be considered as transformation of the output data, bare are shown separately for purposes of clarity. A first output region is defined 6624A, substantially corresponding with a first portion of a retina of a viewer. A second output region is also defined 6624B, substantially corresponding with a second portion of a retina of a viewer. The output data is limited 6624C to output in the first region, and the output data is excluded 6624D from output in the second region.

The output data is outputted 6630B to the display. The method as shown in the example of FIG. 66 then loops back to determining the eye disposition 6623B.

Figure 67:
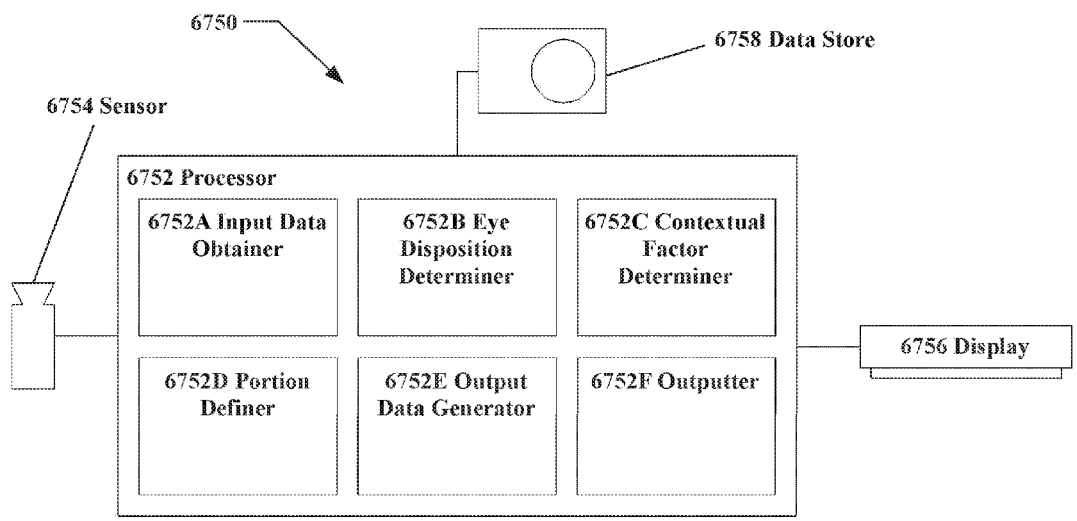
FIG. 67 shows an example embodiment of an apparatus for selectively outputting data to a viewer, including maintaining substantial correspondence between display regions and the field of view of a viewer without perceptibly changing responsive to shifts in the viewer's field of view.

Turning to FIG. 67, therein an example embodiment of an apparatus 6750 for selectively presenting content is shown. The example apparatus as illustrated includes a processor 6752, a sensor 6754 in communication with the processor 6752, and a display 6756 in communication with the processor 6752.

In the example shown, the sensor 6754 is adapted to sense data regarding a contextual factor, and to sense data regarding the positioning of the eye(s) of a viewer. However this is an example only, and various embodiments may lack such a sensor 6754, for example receiving data regarding contextual factors and/or data regarding eye position from some external source rather than sensing the data. Furthermore, even when the apparatus 6750 relies upon sensor data for contextual factors and/or eye position, it is not necessary that a single sensor 6754 be used to obtain both contextual factor data and eye position data; one sensor may sense data regarding contextual factors, and another data regarding eye position.

Similarly, the sensor 6754 may be, but is not required to be, adapted to generate some or all input data (if any) used by the processor 6752.

As illustrated in FIG. 67 the sensor 6754 is shown as an imaging sensor such as a camera, adapted to capture images and/or video. However, as noted previously with regard for example to FIG. 30, this is an example only, and other sensors may be equally suitable.

The processor 6752 is adapted to perform certain functions as may facilitate aspects of various embodiments. In the example arrangement shown in FIG. 67, the processor is shown having several data entities 6752A through 6752F disposed thereon. The data entities 6752A through 6752F may be and/or include executable instructions, data, etc. instantiated on the processor 6752 and supporting performance of the functions of the processor 6752. However, although data entities 6752A through 6752F are shown for illustrative purposes, embodiments are not limited only to those specific data entities shown, nor are all such data entities necessarily required for all embodiments.

In the example of FIG. 67, the input data obtainer 6752A disposed on the processor is adapted to obtain input data. For example, typically though not necessarily the input data obtainer 6752A may receive input data from the sensor 6754, may receive input data from the processor 6752 and/or other data entities disposed therein (e.g. data determined computationally by the processor), may receive input data from a data store or communicator, etc. Other arrangements also may be equally suitable.

The eye disposition determiner 6752B disposed on the processor is adapted to determine a disposition of a viewer's eye(s). For example, typically though not necessarily the eye disposition determiner 6752B may determine the eye disposition based on data from the sensor 6754, such as images indicating the position of the eye. However, other data also may be considered in determining eye position such as data from other sensors (GPS, accelerometer, gyroscope, etc.). In addition, the eye disposition determiner 6752B itself may include algorithms for interpreting (for example) image data so as to determine the disposition of an eye shown therein. These are examples only, and other arrangements also may be equally suitable.

The contextual factor determiner 6752C disposed on the processor is adapted to determine the presence and/or status of at least one contextual factor, for example as to whether the contextual factor satisfies some standard. As noted previously with regard to other data entities referenced in FIG. 67, typically though not necessarily, the contextual factor determiner 6752C may consider data from the sensor 6754, may include algorithms for interpreting data from the sensor 6754, etc.

The portion definer 6752D disposed on the processor is adapted to define a first portion of the viewer's field of view, and a second portion of the viewer's field of view. The portion definer 6752D may define the first and/or second portions of the viewer's field of view based at least in part on the presence and/or status of a contextual factor (e.g. as determined by the contextual factor determiner 6752C above). For example, the first portion may be defined so as not to include the central vision, if the contextual factor may be taken to indicate that the viewer's central vision is to be kept clear. The portion definer 6752D also may define the first and/or second portions of the viewer's field of view at least in part from the eye disposition of the viewer (e.g. as determined by the eye disposition determiner 6752B), for example where the viewer is looking may reasonably affect a determination of where content is to be displayed. However, other arrangements may be equally suitable.

The output data generator 6752E disposed on the processor is adapted to generate output data from input data (e.g. as acquired by the input data obtainer 6752A). The output data generator 6752E may be adapted to generate such output data so as to conform to the limits of the first portion of the viewer's field of view (e.g. as defined by the portion definer 6752D).

For example, if the first portion has been defined to occupy only a small part of the viewer's field of view, output data may be generated shrunken, truncated, abbreviated, shown only in part (e.g. a "tunnel vision" view of a larger parcel of data), etc. Similarly, if the first portion has been defined to extend only within the peripheral vision, then the output data may be generated with motion added and/or increased brightness contrast but with decreased or no color variation and/or reduced resolution, so as to accommodate the particulars of human peripheral vision (e.g. good sensitivity to motion and bright/dark variations, but poor color detection and limited ability to detect fine detail).

Such variations may be considerable, and are not limited. For example output data may include an animated graphical icon of an envelope to indicate receipt a new email (e.g. if the first portion of the viewer's field of view includes the central vision). However, output data alternately may include a single light blinking in some pattern that also would indicate receipt of a new email (e.g. if the first portion of the viewer's field of view is limited to only the peripheral vision). Either approach or both approaches may be suitable, even in a single embodiment.

In addition, output data as generated by the output data generator 6752E may vary considerably based on the status of the contextual factor. For example, if the contextual factor relates to whether the viewer is operating a motor vehicle, output data may emphasize content that is relevant to operating a motor vehicle, such as showing a "check engine" notification, providing indications that a vehicle is disposed in a blind spot, etc. Similarly, for such a contextual factor certain other content may be made less prominent or even excluded altogether, such as incoming text messages or other potential distractions.

Thus output data for the same input data may vary greatly depending on conditions, and also output data may vary greatly from the input data from which that output data is generated.

Still with reference to FIG. 67, the outputter 6752F disposed on the processor is adapted to output the output data to a first region of the display 6756 and to exclude output from a second region of the display, such that the output data is delivered via the first region of the display 6756 to the first portion of the viewer's field of view, and such that the output data is excluded from the second region of the display 6756 so that the output data does not obstruct the second portion of the viewer's field of view. For example, the outputter 6752F may "map" the output data to appropriate parts of the display 6756, such that when displayed the output data appears in the first portion of the viewer's field of view, and the output data does not obstruct the second portion.

In addition, the data entities 6752A through 6752F are adapted, as necessary, to dynamically update their functions, so as to maintain substantial correspondence between the first region and first portion of the field of view and substantial correspondence between the second region and second portion of the field of view, such that the output data does not perceptibly change (as viewed by the viewer) within the field of view responsive to shifts of the field of view of the viewer.

Figure 68:
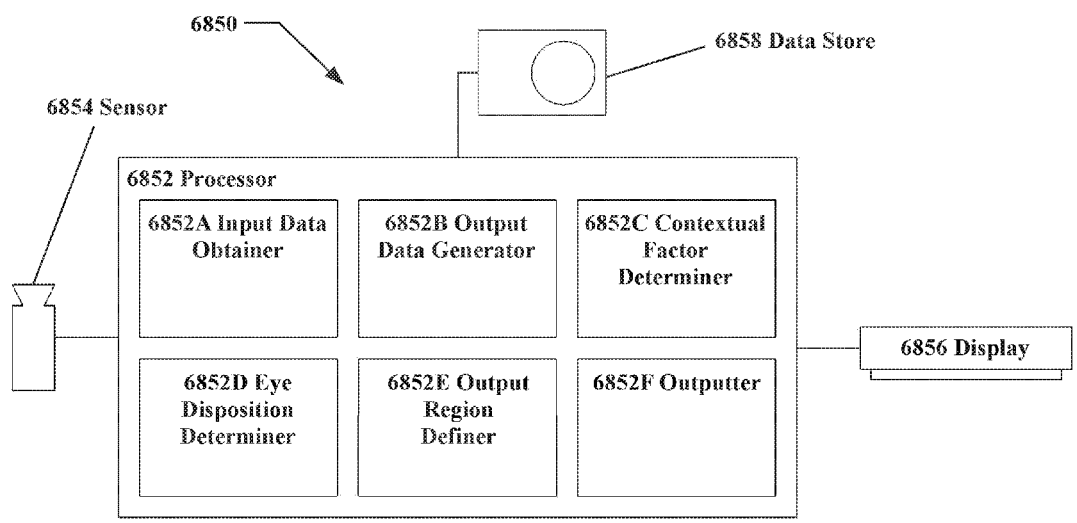
FIG. 68 shows an example embodiment of an apparatus for selectively outputting data to a viewer, including maintaining substantial correspondence between display regions and the retinas a viewer without perceptibly changing responsive to shifts in the viewer's eye disposition.

With reference now to FIG. 68, as noted above embodiments are not limited with regard to the number, nature, and/or configuration of data entities as may carry out or support various functions. (Moreover, it is not required that data entities so perform at all; all-hardware embodiments or other arrangements also may be suitable.) In FIG. 68, an apparatus 6850 at least somewhat similar in overall configuration to that in FIG. 67 is shown, however in FIG. 68 the arrangement of data entities and the functions thereof differs from that in FIG. 67.

In FIG. 68, the example apparatus illustrated includes a processor 6852, a sensor 6854 in communication with the processor 6852, and a display 6856 in communication with the processor 6852. The processor 6852 is shown having several data entities 6752A through 6752F disposed thereon.

The input data obtainer 6852A is adapted to obtain input data. The output data generator 6852B is adapted to generate output data from the input data. The contextual factor determiner 6752C is adapted to determine the presence and/or status of at least one contextual factor, for example as to whether the contextual factor satisfies some standard. The eye disposition determiner 6852D is adapted to determine a disposition of a viewer's eye(s). These functions are at least somewhat similar to functions described above with regard to FIG. 67.

In addition, in FIG. 68 the output region definer 6852E is adapted to define a first output region substantially corresponding with a first portion of the retina of a viewer's eye, and a second output region substantially corresponding with a second portion of the retina of the viewer's eye. This may in some ways be analogous to the function of the portion definer 6752D in FIG. 67; however, where the portion definer 6752D in FIG. 67 defines portions of a field of view, the region definer 6852E in FIG. 68 instead defines regions with respect to the retina. As may be understood, the manner of considering where output data is to go may vary, e.g. whether through considering the field of view with regard to FIG. 67 or the retina in FIG. 68. While the end result may be similar, and indeed the practical approaches may be similar (in some sense, directing content to a portion of the field of view may be considered to be directing content to a portion of the retina, and/or vice versa), the details of how such direction are not limiting. That is, embodiments may address direction of output data based on the field of view, the retina, the eye, the display, or otherwise, so long as the functions described are carried out.

Still with regard to FIG. 68, the outputter 6852F is adapted to output the output data to the first region of the display 6856, and to exclude output from the second region of the display 6856.

In addition, the data entities 6852A through 6852F are adapted, as necessary, to dynamically update their functions, so as to maintain substantial correspondence between the first region and first portion of the retina and substantial correspondence between the second region and second portion of retina, such that the output data does not perceptibly change The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method, comprising:
    obtaining input data;
    determining an eye disposition of a viewer, and determining a field of view of said viewer therefrom;
    defining a first portion of said field of view, based on a status of a contextual factor;
    defining a second portion of said field of view, based on said status of said contextual factor;
    generating visual output data from said input data, based on said status of said contextual factor;
    displaying said visual output data on a first region of a see-through near-eye display, said first region substantially corresponding with said first portion of said field of view such that said visual output data appears in said first portion of said field of view;
    excluding said visual output data from a second region of said display, said second region substantially corresponding with said second portion of said field of view such that said visual output data does not obstruct said second portion of said field of view;
    determining a shift in said eye disposition comprising a shift in eye orientation with respect to said viewer, and determining a shift in said field of view therefrom; and
    updating said first and second regions of said display so as to maintain said substantial correspondence between said first region and said first portion of said field of view and said substantial correspondence between said second region and said second portion of said field of view responsive to said shift in said field of view, such that said visual output data does not perceptibly change within said field of view responsive to said shift in said field of view of said viewer.

2. A method, comprising:
    obtaining input data;
    defining a first portion of a field of view of an eye of a viewer, based on a status of a contextual factor;
    defining a second portion of said field of view, based on said status of said contextual factor;
    generating output data from said input data, based on said status of said contextual factor;
    directing said output data to said first portion of said field of view, such that said second portion of said field of view is unobstructed by said output data; and
    updating directing said output data to said first portion of said field of view responsive to a change in disposition of said field of view corresponding to a shift in eye orientation with respect to said viewer, such that said output data does not perceptibly change as viewed by said viewer responsive to said change in disposition of said field of view.

3. The method of claim 2, wherein:
    generating said output data from said input data comprises applying a transformation to said input data.

4. The method of claim 3, comprising:
    applying a first transformation to said output data if said contextual factor meets a standard; and
    applying a second transformation to said output data if said contextual factor does not meet said standard.

5. The method of claim 2, wherein:
    said contextual factor comprises at least one of a posture of said viewer and a gesture of said viewer.

6. The method of claim 2, wherein:
    said contextual factor comprises at least one of a hand posture, an eye posture, a lip posture, a tongue posture, a jaw posture, a head posture, a body posture, a hand gesture, an eye gesture, a lip gesture, a tongue gesture, a jaw gesture, a head gesture, a body gesture, and a locomotion.

7. The method of claim 2, wherein:
    said contextual factor comprises an environmental feature.

8. The method of claim 2, wherein:
    said contextual factor comprises an action of said viewer.

9. The method of claim 8, wherein:
    said action comprises at least one of said viewer sleeping, sitting, standing, walking, running, conversing, exercising, operating a vehicle, and operating machinery.

10. The method of claim 2, wherein:
    said first portion of said field of view substantially corresponds to at least one of a foveolar region of said field of view of said viewer, a foveal region of said field of view of said viewer, a macular region of said field of view of said viewer, a central region of said field of view of said viewer, and a peripheral region of said field of view of said viewer.

11. The method of claim 2, wherein:
    said first portion of said field of view comprises at least a portion of at least one of a foveolar region of said field of view of said viewer, a foveal region of said field of view of said viewer, a macular region of said field of view of said viewer, a central region of said field of view of said viewer, and a peripheral region of said field of view of said viewer.

12. The method of claim 2, wherein:
    said second portion of said field of view substantially corresponds to at least one of a foveolar region of said field of view of said viewer, a foveal region of said field of view of said viewer, a macular region of said field of view of said viewer, a central region of said field of view of said viewer, and a peripheral region of said field of view of said viewer.

13. The method of claim 2, wherein:
    said second portion of said field of view comprises at least a portion of at least one of a foveolar region of said field of view of said viewer, a foveal region of said field of view of said viewer, a macular region of said field of view of said viewer, a central region of said field of view of said viewer, and a peripheral region of said field of view of said viewer.

14. The method of claim 2, wherein:
directing said output data to said first portion of said field of view comprises displaying said output data on a first region of a display substantially corresponding with said first portion of said field of view; and
leaving said second portion of said field of view unobstructed by said output data comprises excluding said output data from a second region of said display substantially corresponding with said second portion of said field of view.

15. The method of claim 14, wherein:
updating directing said output data comprises updating said first and second regions of said display so as to maintain said substantial correspondence between said first region and said first portion of said field of view and said substantial correspondence between said second region and said second portion of said field of view responsive to a motion of said viewer, such that said output data does not perceptibly change as viewed by said viewer responsive said motion of said viewer.

16. The method of claim 14, wherein:
said display comprises a see-through near-eye display.

17. A method, comprising:
obtaining input data;
generating output data from said input data;
determining a status of a contextual factor;
determining whether said status of said contextual factor meets a standard;
if said status of said contextual factor meets said standard:
    determining a disposition of an eye of a viewer;
    applying a transformation to said output data, said transformation comprising:
        defining a first output region substantially corresponding with a first portion of a retina of said eye;
        defining a second output region substantially corresponding with a second portion of said retina of said eye;
        limiting output of said output data to said first output region;
        excluding output of said output data from said second output region, such that said second output region is unobstructed by said output data;
    outputting said output data;
    determining an update of said disposition of said eye subsequent to a change in said disposition of said eye comprising a change in eye orientation with respect to said viewer;
    maintaining said substantial correspondence between said first output region and said first portion of said retina without perceptibly changing said output data responsive to said change in disposition of said eye; and
    maintaining said substantial correspondence between said second output region and said second portion of said retina.

18. The method of claim 17, wherein:
said contextual factor comprises at least one of a posture of said viewer and a gesture of said viewer.

19. The method of claim 17, wherein:
said contextual factor comprises at least one of a hand posture, an eye posture, a lip posture, a tongue posture, a jaw posture, a head posture, a body posture, a hand gesture, an eye gesture, a lip gesture, a tongue gesture, a jaw gesture, a head gesture, a body gesture, and a locomotion.

20. The method of claim 17, wherein:
said contextual factor comprises an environmental feature.

21. The method of claim 17, wherein:
said contextual factor comprises an action of said viewer.

22. The method of claim 21, wherein:
said action comprises at least one of said viewer sleeping, sitting, standing, walking, running, conversing, exercising, operating a vehicle, and operating machinery.

23. The method of claim 17, wherein:
said first portion of said retina substantially corresponds to at least one of a foveolar region of a field of view of said viewer, a foveal region of said field of view of said viewer, a macular region of said field of view of said viewer, a central region of said field of view of said viewer, and a peripheral region of said field of view of said viewer.

24. The method of claim 17, wherein:
said first portion of said retina comprises at least a portion of at least one of a foveolar region of a field of view of said viewer, a foveal region of said field of view of said viewer, a macular region of said field of view of said viewer, a central region of said field of view of said viewer, and a peripheral region of said field of view of said viewer.

25. The method of claim 17, wherein:
said second portion of said retina substantially corresponds to at least one of a foveolar region of a field of view of said viewer, a foveal region of said field of view of said viewer, a macular region of said field of view of said viewer, a central region of said field of view of said viewer, and a peripheral region of said field of view of said viewer.

26. The method of claim 17, wherein:
said second portion of said retina comprises at least a portion of at least one of a foveolar region of a field of view of said viewer, a foveal region of said field of view of said viewer, a macular region of said field of view of said viewer, a central region of said field of view of said viewer, and a peripheral region of said field of view of said viewer.

27. The method of claim 17, wherein:
said first output region comprises a first region of a see-through display; and
said second output region comprises a second region of said see-through display.

28. The method of claim 27, wherein:
said see-through display comprises a near-eye display.

29. An apparatus comprising:
means for obtaining input data;
means for generating output data from said input data;
means for determining a status of a contextual factor;
means for determining whether said status of said contextual factor meets a standard;
means for determining a disposition of an eye of a viewer with respect to a see-through display if said contextual factor meets said standard;
means for applying a transformation to said output data if said contextual factor meets said standard, said transformation comprising:
    defining a first output region substantially corresponding with a first portion of a retina of said eye;

defining a second output region substantially corresponding with a second portion of said retina of said eye;

limiting output of said output data to said first output region;

excluding output of said output data from said second output region, such that said second output region is unobstructed by said output data;

means for outputting said output data to said see-through display;

means for updating said determination of said disposition of said eye subsequent to a change in disposition of said eye comprising a change in eye orientation with respect to said viewer;

means for maintaining said substantial correspondence between said first output region and said first portion of said retina without perceptibly changing said output data responsive to said change in disposition of said eye; and means for maintaining said substantial correspondence between said second output region and said second portion of said retina.

\* \* \* \* \*